(12) United States Patent
Raleigh et al.

(10) Patent No.: US 8,635,335 B2
(45) Date of Patent: Jan. 21, 2014

(54) SYSTEM AND METHOD FOR WIRELESS NETWORK OFFLOADING

(75) Inventors: Gregory G. Raleigh, Woodside, CA (US); Alireza Raissinia, Monte Sereno, CA (US); James Lavine, Corte Madera, CA (US)

(73) Assignee: Headwater Partners I LLC, Redwood Shores, CA (US)

( * ) Notice: Subject to any disclaimer, the term of this patent is extended or adjusted under 35 U.S.C. 154(b) by 0 days.

(21) Appl. No.: 13/134,005

(22) Filed: May 25, 2011

(65) Prior Publication Data

US 2011/0320588 A1 Dec. 29, 2011
US 2012/0297055 A9 Nov. 22, 2012

Related U.S. Application Data

(63) Continuation-in-part of application No. 12/380,759, filed on Mar. 2, 2009, now Pat. No. 8,270,310, and a continuation-in-part of application No. 12/380,779, filed on Mar. 2, 2009, and a continuation-in-part of application No. 12/380,758, filed on Mar. 2, 2009, and a continuation-in-part of application No. 12/380,778, filed on Mar. 2, 2009, now Pat. No. 8,321,526, and a continuation-in-part of application No. 12/380,768, filed on Mar. 2, 2009, and a continuation-in-part of application No. 12/380,767, filed on Mar. 2, 2009, now Pat. No. 8,355,337, and a continuation-in-part of application No. 12/380,780, filed on Mar. 2, 2009, and a continuation-in-part of application No. 12/380,755, (Continued)

(51) Int. Cl.
*G06F 15/173* (2006.01)
(52) U.S. Cl.
USPC .................... 709/224; 455/456.3

(58) Field of Classification Search
USPC ............... 705/17, 26.1, 26.2, 26.62; 709/217, 709/223, 219, 224; 455/405–409, 422.1, 455/431, 432.1, 456.3; 370/218, 252
See application file for complete search history.

(56) References Cited

U.S. PATENT DOCUMENTS 5,283,904 A 2/1994 Carson et al.
5,577,100 A 11/1996 McGregor et al.
(Continued)

FOREIGN PATENT DOCUMENTS

CN 1538730 A 10/2004
CN 101035308 A 3/2006
(Continued)

OTHER PUBLICATIONS

International Search Report and Written Opinion mailed Oct. 27, 2011 from International Serial No. PCT/US2011/000938 filed May 25, 2011.

(Continued)

*Primary Examiner* — Andrew Joseph Rudy
(74) *Attorney, Agent, or Firm* — Krista S. Jacobsen

(57) ABSTRACT

A method comprising communicating a first set of data communications over a wireless cellular connection of a wireless cellular network to or from an end user device, the first set of data communications associated with one or more service activities the end user device is capable of supporting; identifying an alternative wireless network that can be used to communicate a second set of data communications to or from the end user device; and based on electronically processing an instruction set for offloading from the wireless cellular network to the alternative wireless network, determining whether to communicate the second set of data communications to or from the end user device over the alternative wireless network or over the wireless cellular connection, wherein the instruction set for offloading comprises at least one rule that takes into account at least one state associated with the wireless cellular connection.

97 Claims, 15 Drawing Sheets

Related U.S. Application Data

(63) filed on Mar. 2, 2009, now Pat. No. 8,331,901, and a continuation-in-part of application No. 12/380,756, filed on Mar. 2, 2009, now Pat. No. 8,250,207, and a continuation-in-part of application No. 12/380,770, filed on Mar. 2, 2009, now abandoned, and a continuation-in-part of application No. 12/380,772, filed on Mar. 2, 2009, and a continuation-in-part of application No. 12/380,782, filed on Mar. 2, 2009, now Pat. No. 8,270,952, and a continuation-in-part of application No. 12/380,783, filed on Mar. 2, 2009, and a continuation-in-part of application No. 12/380,757, filed on Mar. 2, 2009, now Pat. No. 8,326,958, and a continuation-in-part of application No. 12/380,781, filed on Mar. 2, 2009, now Pat. No. 8,229,812, and a continuation-in-part of application No. 12/380,774, filed on Mar. 2, 2009, and a continuation-in-part of application No. 12/380,771, filed on Mar. 2, 2009, now Pat. No. 8,023,425, and a continuation-in-part of application No. 12/380,773, filed on Mar. 2, 2009, and a continuation-in-part of application No. 12/380,769, filed on Mar. 2, 2009, and a continuation-in-part of application No. 12/380,777, filed on Mar. 2, 2009, and a continuation-in-part of application No. 12/695,019, filed on Jan. 27, 2010, now Pat. No. 8,275,830, and a continuation-in-part of application No. 12/695,020, filed on Jan. 27, 2010, now Pat. No. 8,406,748, and a continuation-in-part of application No. 12/694,445, filed on Jan. 27, 2010, now Pat. No. 8,391,834, and a continuation-in-part of application No. 12/694,451, filed on Jan. 27, 2010, and a continuation-in-part of application No. 12/694,455, filed on Jan. 27, 2010, now Pat. No. 8,402,111, and a continuation-in-part of application No. 12/695,021, filed on Jan. 27, 2010, now Pat. No. 8,346,225, and a continuation-in-part of application No. 12/695,980, filed on Jan. 28, 2010, now Pat. No. 8,340,634, said application No. 12/695,019 is a continuation-in-part of application No. 12/380,778, and a continuation-in-part of application No. 12/380,771, said application No. 12/695,020 is a continuation-in-part of application No. 12/380,780, said application No. 12/694,445 is a continuation-in-part of application No. 12/380,780, said application No. 12/694,451 is a continuation-in-part of application No. 12/380,780, said application No. 12/694,455 is a continuation-in-part of application No. 12/380,780, said application No. 12/695,021 is a continuation-in-part of application No. 12/380,780, said application No. 12/695,980 is a continuation-in-part of application No. 12/380,780, and a continuation-in-part of application No. 12/695,019, and a continuation-in-part of application No. 12/695,021.

(60) Provisional application No. 61/348,022, filed on May 25, 2010, provisional application No. 61/381,159, filed on Sep. 9, 2010, provisional application No. 61/381,162, filed on Sep. 9, 2010, provisional application No. 61/384,456, filed on Sep. 20, 2010, provisional application No. 61/385,020, filed on Sep. 21, 2010, provisional application No. 61/387,243, filed on Sep. 28, 2010, provisional application No. 61/387,247, filed on Sep. 28, 2010, provisional application No. 61/389,547, filed on Oct. 4, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009, provisional application No. 61/270,353, filed on Jul. 6, 2009, provisional application No. 61/264,126, filed on Nov. 24, 2009, provisional application No. 61/275,208, filed on Aug. 25, 2009, provisional application No. 61/237,753, filed on Aug. 28, 2009, provisional application No. 61/252,151, filed on Oct. 15, 2009, provisional application No. 61/252,153, filed on Oct. 15, 2009, provisional application No. 61/264,120, filed on Nov. 24, 2009.

(56) References Cited

U.S. PATENT DOCUMENTS

| | | |
|---|---|---|
| 5,594,777 A | 1/1997 | Makkonen et al. |
| 5,630,159 A | 5/1997 | Zancho |
| 5,633,484 A | 5/1997 | Zancho et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,983,270 A | 11/1999 | Abraham et al. |
| 6,035,281 A | 3/2000 | Crosskey et al. |
| 6,038,452 A | 3/2000 | Strawczynski et al. |
| 6,047,268 A | 4/2000 | Bartoli et al. |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,141,686 A | 10/2000 | Jackowski et al. |
| 6,148,336 A | 11/2000 | Thomas et al. |
| 6,154,738 A | 11/2000 | Call |
| 6,198,915 B1 | 3/2001 | McGregor et al. |
| 6,226,277 B1 | 5/2001 | Chuah |
| 6,263,055 B1 | 7/2001 | Garland et al. |
| 6,292,828 B1 | 9/2001 | Williams |
| 6,317,584 B1 | 11/2001 | Abu-Amara et al. |
| 6,381,316 B2 | 4/2002 | Joyce et al. |
| 6,418,147 B1 | 7/2002 | Wiedeman |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,532,235 B1 | 3/2003 | Benson et al. |
| 6,532,579 B2 | 3/2003 | Sato et al. |
| 6,539,082 B1 | 3/2003 | Lowe et al. |
| 6,563,806 B1 | 5/2003 | Yano et al. |
| 6,574,321 B1 | 6/2003 | Cox et al. |
| 6,574,465 B2 | 6/2003 | Marsh et al. |
| 6,581,092 B1 | 6/2003 | Motoyama et al. |
| 6,598,034 B1 | 7/2003 | Kloth |
| 6,603,969 B1 | 8/2003 | Vuoristo et al. |
| 6,606,744 B1 | 8/2003 | Mikurak |

(56) References Cited

U.S. PATENT DOCUMENTS

| | | | |
|---|---|---|---|
| 6,631,122 B1 | 10/2003 | Arunachalam et al. | |
| 6,639,975 B1 | 10/2003 | O'Neal et al. | |
| 6,640,097 B2 | 10/2003 | Corrigan et al. | |
| 6,650,887 B2 | 11/2003 | McGregor et al. | |
| 6,651,101 B1 | 11/2003 | Gai et al. | |
| 6,654,814 B1 * | 11/2003 | Britton et al. | 709/246 |
| 6,658,254 B1 | 12/2003 | Purdy et al. | |
| 6,678,516 B2 | 1/2004 | Nordman et al. | |
| 6,683,853 B1 | 1/2004 | Kannas et al. | |
| 6,684,244 B1 | 1/2004 | Goldman et al. | |
| 6,725,031 B2 | 4/2004 | Watler et al. | |
| 6,748,195 B1 | 6/2004 | Phillips | |
| 6,754,470 B2 | 6/2004 | Hendrickson et al. | |
| 6,763,000 B1 | 7/2004 | Walsh | |
| 6,765,864 B1 | 7/2004 | Natarajan et al. | |
| 6,765,925 B1 | 7/2004 | Sawyer et al. | |
| 6,782,412 B2 | 8/2004 | Brophy et al. | |
| 6,785,889 B1 | 8/2004 | Williams | |
| 6,829,596 B1 | 12/2004 | Frazee | |
| 6,829,696 B1 | 12/2004 | Balmer et al. | |
| 6,839,340 B1 | 1/2005 | Voit et al. | |
| 6,873,988 B2 | 3/2005 | Herrmann et al. | |
| 6,876,653 B2 | 4/2005 | Ambe et al. | |
| 6,920,455 B1 | 7/2005 | Weschler | |
| 6,922,562 B2 | 7/2005 | Ward et al. | |
| 6,928,280 B1 | 8/2005 | Xanthos et al. | |
| 6,934,249 B1 * | 8/2005 | Bertin et al. | 370/218 |
| 6,947,723 B1 | 9/2005 | Gurnani et al. | |
| 6,952,428 B1 | 10/2005 | Necka et al. | |
| 6,957,067 B1 * | 10/2005 | Iyer et al. | 455/435.1 |
| 6,965,667 B2 | 11/2005 | Trabandt et al. | |
| 6,965,872 B1 | 11/2005 | Grdina | |
| 6,967,958 B2 | 11/2005 | Ono et al. | |
| 6,996,076 B1 | 2/2006 | Forbes et al. | |
| 6,996,393 B2 | 2/2006 | Pyhalammi et al. | |
| 6,998,985 B2 | 2/2006 | Reisman et al. | |
| 7,002,920 B1 | 2/2006 | Ayyagari et al. | |
| 7,013,469 B2 | 3/2006 | Smith et al. | |
| 7,024,200 B2 | 4/2006 | McKenna et al. | |
| 7,027,408 B2 | 4/2006 | Nabkel et al. | |
| 7,032,072 B1 | 4/2006 | Quinn et al. | |
| 7,039,037 B2 | 5/2006 | Wang et al. | |
| 7,039,403 B2 | 5/2006 | Wong | |
| 7,039,713 B1 | 5/2006 | Van Gunter et al. | |
| 7,042,988 B2 | 5/2006 | Juitt et al. | |
| 7,043,226 B2 | 5/2006 | Yamauchi | |
| 7,043,268 B2 | 5/2006 | Yukie et al. | |
| 7,058,968 B2 | 6/2006 | Rowland et al. | |
| 7,068,600 B2 | 6/2006 | Cain | |
| 7,069,248 B2 | 6/2006 | Huber | |
| 7,092,696 B1 | 8/2006 | Hosain et al. | |
| 7,102,620 B2 * | 9/2006 | Harries et al. | 345/169 |
| 7,113,780 B2 | 9/2006 | Mckenna et al. | |
| 7,113,997 B2 | 9/2006 | Jayapalan et al. | |
| 7,139,569 B2 * | 11/2006 | Kato | 455/432.3 |
| 7,142,876 B2 | 11/2006 | Trossen et al. | |
| 7,158,792 B1 | 1/2007 | Cook et al. | |
| 7,167,078 B2 | 1/2007 | Pourchot | |
| 7,174,174 B2 | 2/2007 | Boris et al. | |
| 7,180,855 B1 | 2/2007 | Lin | |
| 7,181,017 B1 | 2/2007 | Nagel et al. | |
| 7,197,321 B2 | 3/2007 | Erskine et al. | |
| 7,203,169 B1 | 4/2007 | Okholm et al. | |
| 7,212,491 B2 | 5/2007 | Koga | |
| 7,228,354 B2 | 6/2007 | Chambliss et al. | |
| 7,236,780 B2 | 6/2007 | Benco et al. | |
| 7,242,920 B2 | 7/2007 | Morris | |
| 7,245,901 B2 | 7/2007 | McGregor et al. | |
| 7,251,218 B2 | 7/2007 | Jorgensen | |
| 7,280,816 B2 | 10/2007 | Fratti et al. | |
| 7,280,818 B2 | 10/2007 | Clayton | |
| 7,283,561 B1 | 10/2007 | Picher-Dempsey | |
| 7,283,963 B1 | 10/2007 | Fitzpatrick et al. | |
| 7,286,834 B2 | 10/2007 | Walter | |
| 7,286,848 B2 | 10/2007 | Vireday et al. | |
| 7,289,489 B1 | 10/2007 | Kung et al. | |
| 7,290,283 B2 | 10/2007 | Copeland, III | |
| 7,313,237 B2 | 12/2007 | Bahl et al. | |
| 7,317,699 B2 | 1/2008 | Godfrey et al. | |
| 7,322,044 B2 * | 1/2008 | Hrastar | 726/22 |
| 7,324,447 B1 | 1/2008 | Morford | |
| 7,325,037 B2 | 1/2008 | Lawson | |
| 7,336,960 B2 | 2/2008 | Zavalkovsky et al. | |
| 7,346,410 B2 | 3/2008 | Uchiyama | |
| 7,349,695 B2 | 3/2008 | Oommen et al. | |
| 7,353,533 B2 | 4/2008 | Wright et al. | |
| 7,356,337 B2 | 4/2008 | Florence | |
| 7,366,497 B2 | 4/2008 | Nagata | |
| 7,373,136 B2 | 5/2008 | Watler et al. | |
| 7,373,179 B2 | 5/2008 | Stine et al. | |
| 7,388,950 B2 | 6/2008 | Elsey et al. | |
| 7,401,338 B1 | 7/2008 | Bowen et al. | |
| 7,403,763 B2 | 7/2008 | Maes | |
| 7,418,253 B2 | 8/2008 | Kavanagh | |
| 7,418,257 B2 | 8/2008 | Kim | |
| 7,421,004 B2 | 9/2008 | Feher | |
| 7,444,669 B1 | 10/2008 | Bahl et al. | |
| 7,450,591 B2 | 11/2008 | Korling et al. | |
| 7,450,927 B1 | 11/2008 | Creswell et al. | |
| 7,457,265 B2 | 11/2008 | Julka et al. | |
| 7,460,837 B2 | 12/2008 | Diener | |
| 7,472,189 B2 | 12/2008 | Mallya et al. | |
| 7,478,420 B2 * | 1/2009 | Wright et al. | 726/1 |
| 7,486,185 B2 | 2/2009 | Culpepper et al. | |
| 7,493,659 B1 | 2/2009 | Wu et al. | |
| 7,496,652 B2 * | 2/2009 | Pezzutti | 709/223 |
| 7,499,438 B2 * | 3/2009 | Hinman et al. | 370/338 |
| 7,499,537 B2 | 3/2009 | Elsey et al. | |
| 7,502,672 B1 | 3/2009 | Kolls | |
| 7,515,608 B2 | 4/2009 | Yuan et al. | |
| 7,516,219 B2 | 4/2009 | Moghaddam et al. | |
| 7,529,204 B2 * | 5/2009 | Bourlas et al. | 370/328 |
| 7,535,880 B1 * | 5/2009 | Hinman et al. | 370/338 |
| 7,540,408 B2 | 6/2009 | Levine et al. | |
| 7,545,782 B2 | 6/2009 | Rayment et al. | |
| 7,546,629 B2 | 6/2009 | Albert et al. | |
| 7,548,976 B2 | 6/2009 | Bahl et al. | |
| 7,551,922 B2 | 6/2009 | Roskowski et al. | |
| 7,555,757 B2 | 6/2009 | Smith et al. | |
| 7,565,141 B2 | 7/2009 | Macaluso | |
| 7,574,509 B2 | 8/2009 | Nixon et al. | |
| 7,574,731 B2 | 8/2009 | Fascenda | |
| 7,580,356 B1 | 8/2009 | Mishra et al. | |
| 7,580,857 B2 | 8/2009 | VanFleet et al. | |
| 7,583,964 B2 | 9/2009 | Wong | |
| 7,593,417 B2 | 9/2009 | Wang et al. | |
| 7,593,730 B2 | 9/2009 | Khandelwal et al. | |
| 7,596,373 B2 | 9/2009 | McGregor et al. | |
| 7,599,288 B2 | 10/2009 | Cole et al. | |
| 7,609,650 B2 | 10/2009 | Roskowski et al. | |
| 7,609,700 B1 | 10/2009 | Ying et al. | |
| 7,610,328 B2 | 10/2009 | Haase et al. | |
| 7,610,396 B2 | 10/2009 | Taglienti et al. | |
| 7,616,962 B2 | 11/2009 | Oswal et al. | |
| 7,617,516 B2 | 11/2009 | Huslak et al. | |
| 7,620,041 B2 | 11/2009 | Dunn et al. | |
| 7,620,065 B2 | 11/2009 | Falardeau | |
| 7,620,162 B2 | 11/2009 | Aaron et al. | |
| 7,627,314 B2 | 12/2009 | Carlson et al. | |
| 7,633,438 B2 | 12/2009 | Tysowski | |
| 7,634,388 B2 | 12/2009 | Archer et al. | |
| 7,636,574 B2 | 12/2009 | Poosala | |
| 7,644,151 B2 | 1/2010 | Jerrim et al. | |
| 7,644,267 B2 | 1/2010 | Ylikoski et al. | |
| 7,647,047 B2 | 1/2010 | Moghaddam et al. | |
| 7,650,137 B2 | 1/2010 | Jobs et al. | |
| 7,653,394 B2 | 1/2010 | McMillin | |
| 7,668,176 B2 | 2/2010 | Chuah | |
| 7,668,903 B2 | 2/2010 | Edwards et al. | |
| 7,685,131 B2 | 3/2010 | Batra et al. | |
| 7,685,254 B2 | 3/2010 | Pandya | |
| 7,693,720 B2 | 4/2010 | Kennewick et al. | |
| 7,697,540 B2 | 4/2010 | Haddad et al. | |
| 7,710,932 B2 | 5/2010 | Muthuswamy et al. | |

(56) References Cited

U.S. PATENT DOCUMENTS

| | | | |
|---|---|---|---|
| 7,711,848 B2 | 5/2010 | Maes | |
| 7,720,505 B2 | 5/2010 | Gopi et al. | |
| 7,720,960 B2 | 5/2010 | Pruss et al. | |
| 7,725,570 B1 | 5/2010 | Lewis | |
| 7,729,326 B2 | 6/2010 | Sekhar | |
| 7,730,123 B1 | 6/2010 | Erickson et al. | |
| 7,734,784 B1 | 6/2010 | Araujo et al. | |
| 7,742,406 B1 | 6/2010 | Muppala | |
| 7,746,854 B2 | 6/2010 | Ambe et al. | |
| 7,747,240 B1 | 6/2010 | Briscoe et al. | |
| 7,747,699 B2 | 6/2010 | Prueitt et al. | |
| 7,747,730 B1 | 6/2010 | Harlow | |
| 7,756,534 B2 | 7/2010 | Anupam et al. | |
| 7,756,757 B1 * | 7/2010 | Oakes, III | 705/26.1 |
| 7,760,711 B1 | 7/2010 | Kung et al. | |
| 7,760,861 B1 | 7/2010 | Croak et al. | |
| 7,774,323 B2 | 8/2010 | Helfman | |
| 7,774,456 B1 * | 8/2010 | Lownsbrough et al. | 709/224 |
| 7,778,176 B2 | 8/2010 | Morford | |
| 7,778,643 B2 | 8/2010 | Laroia et al. | |
| 7,792,538 B2 | 9/2010 | Kozisek | |
| 7,792,708 B2 | 9/2010 | Alva | |
| 7,797,204 B2 | 9/2010 | Balent | |
| 7,797,401 B2 | 9/2010 | Stewart et al. | |
| 7,801,523 B1 | 9/2010 | Kenderov | |
| 7,801,985 B1 | 9/2010 | Pitkow et al. | |
| 7,802,724 B1 | 9/2010 | Nohr | |
| 7,822,837 B1 | 10/2010 | Urban et al. | |
| 7,826,427 B2 | 11/2010 | Sood et al. | |
| 7,826,607 B1 | 11/2010 | De Carvalho Resende et al. | |
| 7,844,728 B2 | 11/2010 | Anderson et al. | |
| 7,848,768 B2 | 12/2010 | Omori et al. | |
| 7,856,226 B2 | 12/2010 | Wong et al. | |
| 7,865,182 B2 | 1/2011 | Macaluso | |
| 7,868,778 B2 | 1/2011 | Kenwright | |
| 7,873,344 B2 | 1/2011 | Bowser et al. | |
| 7,873,705 B2 | 1/2011 | Kalish | |
| 7,877,090 B2 | 1/2011 | Maes | |
| 7,881,199 B2 | 2/2011 | Krstulich | |
| 7,881,697 B2 | 2/2011 | Baker et al. | |
| 7,882,029 B2 | 2/2011 | White | |
| 7,886,047 B1 | 2/2011 | Potluri | |
| 7,890,084 B1 | 2/2011 | Dudziak et al. | |
| 7,890,111 B2 | 2/2011 | Bugenhagen | |
| 7,899,438 B2 | 3/2011 | Baker et al. | |
| 7,903,553 B2 | 3/2011 | Liu | |
| 7,907,970 B2 | 3/2011 | Park et al. | |
| 7,911,975 B2 | 3/2011 | Droz et al. | |
| 7,912,025 B2 | 3/2011 | Pattenden et al. | |
| 7,912,056 B2 | 3/2011 | Brassem | |
| 7,920,529 B1 | 4/2011 | Mahler et al. | |
| 7,929,959 B2 | 4/2011 | DeAtley et al. | |
| 7,929,960 B2 | 4/2011 | Martin et al. | |
| 7,929,973 B2 | 4/2011 | Zavalkovsky et al. | |
| 7,930,446 B2 * | 4/2011 | Kesselman et al. | 710/30 |
| 7,937,069 B2 | 5/2011 | Rassam | |
| 7,940,685 B1 | 5/2011 | Breslau et al. | |
| 7,941,184 B2 | 5/2011 | Prendergast et al. | |
| 7,944,948 B2 | 5/2011 | Chow et al. | |
| 7,945,238 B2 | 5/2011 | Baker et al. | |
| 7,945,240 B1 | 5/2011 | Klock et al. | |
| 7,945,945 B2 | 5/2011 | Graham et al. | |
| 7,948,952 B2 | 5/2011 | Hurtta et al. | |
| 7,948,953 B2 | 5/2011 | Melkote et al. | |
| 7,948,968 B2 | 5/2011 | Voit et al. | |
| 7,949,529 B2 | 5/2011 | Weider et al. | |
| 7,953,808 B2 | 5/2011 | Sharp et al. | |
| 7,953,877 B2 | 5/2011 | Vemula et al. | |
| 7,957,020 B2 | 6/2011 | Mine et al. | |
| 7,957,381 B2 | 6/2011 | Clermidy et al. | |
| 7,957,511 B2 | 6/2011 | Drudis et al. | |
| 7,958,029 B1 | 6/2011 | Bobich et al. | |
| 7,962,622 B2 | 6/2011 | Friend et al. | |
| 7,965,983 B1 | 6/2011 | Swan et al. | |
| 7,969,950 B2 * | 6/2011 | Iyer et al. | 370/338 |
| 7,970,350 B2 | 6/2011 | Sheynman et al. | |
| 7,970,426 B2 | 6/2011 | Poe et al. | |
| 7,974,624 B2 | 7/2011 | Gallagher et al. | |
| 7,975,184 B2 | 7/2011 | Goff et al. | |
| 7,978,627 B2 | 7/2011 | Taylor et al. | |
| 7,984,130 B2 | 7/2011 | Bogineni et al. | |
| 7,984,511 B2 | 7/2011 | Kocher et al. | |
| 7,986,935 B1 | 7/2011 | D'Souza et al. | |
| 7,987,510 B2 | 7/2011 | Kocher et al. | |
| 8,000,276 B2 | 8/2011 | Scherzer et al. | |
| 8,000,318 B2 | 8/2011 | Wiley et al. | |
| 8,005,009 B2 | 8/2011 | McKee et al. | |
| 8,005,459 B2 | 8/2011 | Balsillie | |
| 8,005,988 B2 | 8/2011 | Maes | |
| 8,010,080 B1 | 8/2011 | Thenthiruperai et al. | |
| 8,010,081 B1 | 8/2011 | Roskowski | |
| 8,015,133 B1 | 9/2011 | Wu et al. | |
| 8,015,234 B2 | 9/2011 | Lum et al. | |
| 8,019,687 B2 | 9/2011 | Wang et al. | |
| 8,019,820 B2 | 9/2011 | Son et al. | |
| 8,019,868 B2 | 9/2011 | Rao et al. | |
| 8,019,886 B2 | 9/2011 | Harrang et al. | |
| 8,023,425 B2 | 9/2011 | Raleigh | |
| 8,024,397 B1 | 9/2011 | Erickson et al. | |
| 8,027,339 B2 | 9/2011 | Short et al. | |
| 8,031,601 B2 | 10/2011 | Feroz et al. | |
| 8,032,409 B1 | 10/2011 | Mikurak | |
| 8,032,899 B2 | 10/2011 | Archer et al. | |
| 8,036,600 B2 | 10/2011 | Garrett et al. | |
| 8,045,973 B2 * | 10/2011 | Chambers | 455/422.1 |
| 8,050,275 B1 | 11/2011 | Iyer | |
| 8,059,530 B1 | 11/2011 | Cole | |
| 8,060,463 B1 | 11/2011 | Spiegel | |
| 8,064,896 B2 | 11/2011 | Bell et al. | |
| 8,068,824 B2 | 11/2011 | Shan et al. | |
| 8,068,829 B2 * | 11/2011 | Lemond et al. | 455/431 |
| 8,073,721 B1 | 12/2011 | Lewis | |
| 8,078,140 B2 | 12/2011 | Baker et al. | |
| 8,078,163 B2 * | 12/2011 | Lemond et al. | 455/431 |
| 8,086,497 B1 * | 12/2011 | Oakes, III | 705/26.1 |
| 8,090,359 B2 * | 1/2012 | Proctor et al. | 455/414.3 |
| 8,090,616 B2 * | 1/2012 | Proctor et al. | 705/21 |
| 8,094,551 B2 | 1/2012 | Huber et al. | |
| 8,095,112 B2 | 1/2012 | Chow et al. | |
| 8,095,666 B2 | 1/2012 | Schmidt et al. | |
| 8,098,579 B2 | 1/2012 | Ray et al. | |
| 8,099,077 B2 | 1/2012 | Chowdhury et al. | |
| 8,099,517 B2 | 1/2012 | Jia et al. | |
| 8,102,814 B2 | 1/2012 | Rahman et al. | |
| 8,108,520 B2 | 1/2012 | Ruutu et al. | |
| 8,116,223 B2 | 2/2012 | Tian et al. | |
| 8,116,749 B2 * | 2/2012 | Proctor et al. | 455/414.3 |
| 8,116,781 B2 * | 2/2012 | Chen et al. | 455/452.2 |
| 8,122,128 B2 | 2/2012 | Burke, II et al. | |
| 8,126,123 B2 | 2/2012 | Cai et al. | |
| 8,126,396 B2 * | 2/2012 | Bennett | 455/41.2 |
| 8,126,476 B2 | 2/2012 | Vardi et al. | |
| 8,126,722 B2 | 2/2012 | Robb et al. | |
| 8,130,793 B2 | 3/2012 | Edwards et al. | |
| 8,131,256 B2 | 3/2012 | Martti et al. | |
| 8,134,954 B2 * | 3/2012 | Godfrey et al. | 370/328 |
| 8,135,388 B1 | 3/2012 | Gailloux et al. | |
| 8,135,392 B2 | 3/2012 | Marcellino et al. | |
| 8,135,657 B2 | 3/2012 | Kapoor et al. | |
| 8,144,591 B2 | 3/2012 | Ghai et al. | |
| 8,149,823 B2 | 4/2012 | Turcan et al. | |
| 8,150,431 B2 * | 4/2012 | Wolovitz et al. | 455/466 |
| 8,155,155 B1 | 4/2012 | Chow et al. | |
| 8,155,620 B2 | 4/2012 | Wang et al. | |
| 8,155,670 B2 | 4/2012 | Fullam et al. | |
| 8,156,206 B2 | 4/2012 | Kiley et al. | |
| 8,160,015 B2 | 4/2012 | Rashid et al. | |
| 8,165,576 B2 | 4/2012 | Raju et al. | |
| 8,166,040 B2 * | 4/2012 | Brindisi et al. | 707/741 |
| 8,166,554 B2 | 4/2012 | John | |
| 8,170,553 B2 | 5/2012 | Bennett | |
| 8,174,970 B2 | 5/2012 | Adamczyk et al. | |
| 8,184,530 B1 | 5/2012 | Swan et al. | |
| 8,184,590 B2 | 5/2012 | Rosenblatt | |

(56) References Cited

U.S. PATENT DOCUMENTS

| | | |
|---|---|---|
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,675 B2 | 5/2012 | Tribbett |
| 8,191,116 B1 | 5/2012 | Gazzard |
| 8,194,549 B2 | 6/2012 | Huber et al. |
| 8,194,553 B2 | 6/2012 | Liang et al. |
| 8,194,572 B2 | 6/2012 | Horvath et al. |
| 8,195,093 B2 | 6/2012 | Garrett et al. |
| 8,195,163 B2 | 6/2012 | Gisby et al. |
| 8,196,199 B2 | 6/2012 | Hrastar et al. |
| 8,200,509 B2 | 6/2012 | Kenedy et al. |
| 8,200,775 B2 | 6/2012 | Moore |
| 8,204,190 B2 | 6/2012 | Bang et al. |
| 8,204,505 B2 | 6/2012 | Jin et al. |
| 8,204,794 B1 | 6/2012 | Peng et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,224,382 B2 | 7/2012 | Bultman |
| 8,224,773 B2 | 7/2012 | Spiegel |
| 8,228,818 B2 | 7/2012 | Chase et al. |
| 8,230,061 B2 | 7/2012 | Hassan et al. |
| 8,233,883 B2 | 7/2012 | De Froment |
| 8,233,895 B2 | 7/2012 | Tysowski |
| 8,238,287 B1 | 8/2012 | Gopi et al. |
| 8,239,520 B2 | 8/2012 | Grah et al. |
| 8,242,959 B2 | 8/2012 | Mia et al. |
| 8,244,241 B2 | 8/2012 | Montemurro |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,265,004 B2 | 9/2012 | Toutonghi |
| 8,266,681 B2 | 9/2012 | Deshpande et al. |
| 8,270,972 B2 | 9/2012 | Otting et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,291,238 B2 | 10/2012 | Ginter et al. |
| 8,296,404 B2 | 10/2012 | McDysan et al. |
| 8,301,513 B1 | 10/2012 | Peng et al. |
| 8,306,518 B1 | 11/2012 | Gailloux |
| 8,307,067 B2 | 11/2012 | Ryan |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 * | 12/2012 | Jin et al. ............ 370/310 |
| 8,326,319 B2 | 12/2012 | Davis |
| 8,326,359 B2 | 12/2012 | Kauffman |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,340,718 B2 | 12/2012 | Colonna et al. |
| 8,347,362 B2 | 1/2013 | Cai et al. |
| 8,350,700 B2 | 1/2013 | Fast et al. |
| 8,351,592 B2 | 1/2013 | Freeny, Jr. et al. |
| 8,351,898 B2 * | 1/2013 | Raleigh ............ 455/405 |
| 8,352,360 B2 | 1/2013 | De Judicibus et al. |
| 8,352,630 B2 | 1/2013 | Hart |
| 8,352,980 B2 | 1/2013 | Howcroft |
| 8,353,001 B2 | 1/2013 | Herrod |
| 8,356,336 B2 | 1/2013 | Johnston et al. |
| 8,358,638 B2 | 1/2013 | Scherzer et al. |
| 8,363,658 B1 | 1/2013 | Delker et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,374,090 B2 | 2/2013 | Morrill et al. |
| 8,374,592 B2 * | 2/2013 | Proctor et al. ............ 455/414.3 |
| 8,379,847 B2 | 2/2013 | Bell et al. |
| 8,385,896 B2 * | 2/2013 | Proctor et al. ............ 455/414.3 |
| 8,385,975 B2 | 2/2013 | Forutanpour et al. |
| 8,386,386 B1 | 2/2013 | Zhu |
| 8,391,262 B2 | 3/2013 | Maki et al. |
| 8,396,929 B2 | 3/2013 | Helfman et al. |
| 8,402,540 B2 | 3/2013 | Kapoor et al. |
| 8,406,427 B2 | 3/2013 | Chand et al. |
| 8,411,587 B2 | 4/2013 | Curtis et al. |
| 8,411,691 B2 | 4/2013 | Aggarwal |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,447,324 B2 | 5/2013 | Shuman et al. |
| 8,447,607 B2 * | 5/2013 | Weider et al. ............ 704/250 |
| 8,447,980 B2 | 5/2013 | Godfrey et al. |
| 8,452,858 B2 | 5/2013 | Wu et al. |
| 8,461,958 B2 | 6/2013 | Saenz et al. |
| 8,463,232 B2 | 6/2013 | Tuli et al. |
| 8,468,337 B2 | 6/2013 | Gaur et al. |
| 8,472,371 B1 * | 6/2013 | Bari et al. ............ 370/328 |
| 8,477,778 B2 | 7/2013 | Lehmann, Jr. et al. |
| 8,483,135 B2 * | 7/2013 | Cai et al. ............ 370/328 |
| 8,483,694 B2 | 7/2013 | Lewis et al. |
| 8,484,327 B2 | 7/2013 | Werner et al. |
| 8,489,720 B1 | 7/2013 | Morford et al. |
| 8,495,227 B2 * | 7/2013 | Kaminsky et al. ............ 709/229 |
| 8,495,360 B2 | 7/2013 | Falk et al. |
| 8,504,729 B2 * | 8/2013 | Pezzutti ............ 709/250 |
| 8,509,082 B2 | 8/2013 | Heinz et al. |
| 8,520,589 B2 | 8/2013 | Bhatt et al. |
| 8,521,110 B2 | 8/2013 | Rofougaran |
| 8,522,039 B2 | 8/2013 | Hyndman et al. |
| 8,526,329 B2 | 9/2013 | Mahany et al. |
| 8,526,350 B2 | 9/2013 | Xue et al. |
| 8,543,265 B2 | 9/2013 | Ekhaguere et al. |
| 8,544,105 B2 | 9/2013 | Mclean et al. |
| 8,561,138 B2 | 10/2013 | Rothman et al. |
| 8,571,474 B2 | 10/2013 | Chavez et al. |
| 8,571,993 B2 | 10/2013 | Kocher et al. |
| 8,583,499 B2 | 11/2013 | De Judicibus et al. |
| 2001/0048738 A1 | 12/2001 | Baniak et al. |
| 2001/0053694 A1 | 12/2001 | Igarashi et al. |
| 2002/0022472 A1 | 2/2002 | Watler et al. |
| 2002/0049074 A1 | 4/2002 | Eisinger et al. |
| 2002/0116338 A1 | 8/2002 | Gonthier et al. |
| 2002/0120540 A1 | 8/2002 | Kende et al. |
| 2002/0131404 A1 | 9/2002 | Mehta et al. |
| 2002/0138601 A1 | 9/2002 | Piponius et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0046396 A1 | 3/2003 | Richter |
| 2003/0050070 A1 | 3/2003 | Mashinsky et al. |
| 2003/0050837 A1 | 3/2003 | Kim |
| 2003/0088671 A1 | 5/2003 | Klinker et al. |
| 2003/0133408 A1 | 7/2003 | Cheng et al. |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0220984 A1 | 11/2003 | Jones et al. |
| 2003/0224781 A1 | 12/2003 | Milford et al. |

(56) References Cited

U.S. PATENT DOCUMENTS

| | | |
|---|---|---|
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah et al. |
| 2004/0044623 A1 | 3/2004 | Wake et al. |
| 2004/0047358 A1 | 3/2004 | Chen et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0132427 A1 | 7/2004 | Lee et al. |
| 2004/0168052 A1 | 8/2004 | Clisham et al. |
| 2004/0198331 A1 | 10/2004 | Coward et al. |
| 2004/0203755 A1 | 10/2004 | Brunet et al. |
| 2004/0236547 A1 | 11/2004 | Rappaport et al. |
| 2004/0249918 A1 | 12/2004 | Sunshine |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0060266 A1 | 3/2005 | DeMello et al. |
| 2005/0097516 A1 | 5/2005 | Donnelly et al. |
| 2005/0107091 A1 | 5/2005 | Vannithamby et al. |
| 2005/0128967 A1 | 6/2005 | Scobbie |
| 2005/0166043 A1 | 7/2005 | Zhang et al. |
| 2005/0183143 A1 | 8/2005 | Anderholm et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1 | 10/2005 | Hassan et al. |
| 2005/0246282 A1 | 11/2005 | Naslund et al. |
| 2005/0250508 A1 | 11/2005 | Guo et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0026679 A1 | 2/2006 | Zakas |
| 2006/0034256 A1 | 2/2006 | Addagatla et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072646 A1 | 4/2006 | Feher et al. |
| 2006/0085543 A1 | 4/2006 | Hrastar et al. |
| 2006/0112016 A1 | 5/2006 | Ishibashi |
| 2006/0135144 A1 | 6/2006 | Jothipragasam |
| 2006/0143098 A1 | 6/2006 | Lazaridis |
| 2006/0165060 A1 | 7/2006 | Dua |
| 2006/0174035 A1 | 8/2006 | Tufail |
| 2006/0178918 A1 | 8/2006 | Mikurak |
| 2006/0183462 A1 | 8/2006 | Kolehainen et al. |
| 2006/0190314 A1 | 8/2006 | Hernandez |
| 2006/0199608 A1 | 9/2006 | Dunn et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0291477 A1 | 12/2006 | Croak et al. |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0061243 A1 | 3/2007 | Ramer et al. |
| 2007/0061878 A1 | 3/2007 | Hagiu et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0104983 A1 | 5/2007 | Shankar et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0147324 A1 | 6/2007 | McGary |
| 2007/0155365 A1 | 7/2007 | Kim et al. |
| 2007/0168499 A1 | 7/2007 | Chu |
| 2007/0198656 A1 | 8/2007 | Mazzaferri et al. |
| 2007/0220251 A1 | 9/2007 | Rosenberg et al. |
| 2007/0226225 A1 | 9/2007 | Yiu et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255848 A1 | 11/2007 | Sewall et al. |
| 2007/0259673 A1 | 11/2007 | Willars et al. |
| 2007/0263558 A1 | 11/2007 | Salomone |
| 2007/0274327 A1 | 11/2007 | Kaarela et al. |
| 2007/0280453 A1 | 12/2007 | Kelley et al. |
| 2007/0282896 A1 | 12/2007 | Wydroug et al. |
| 2007/0294395 A1 | 12/2007 | Strub et al. |
| 2007/0298764 A1 | 12/2007 | Clayton |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010452 A1 | 1/2008 | Holtzman et al. |
| 2008/0022354 A1 | 1/2008 | Grewal et al. |
| 2008/0039102 A1 | 2/2008 | Sewall et al. |
| 2008/0049630 A1 | 2/2008 | Kozisek et al. |
| 2008/0051076 A1 | 2/2008 | O'Shaughnessy et al. |
| 2008/0052387 A1 | 2/2008 | Heinz et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0095339 A1 | 4/2008 | Elliott et al. |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan |
| 2008/0167027 A1 | 7/2008 | Gautier et al. |
| 2008/0167033 A1 | 7/2008 | Beckers |
| 2008/0168523 A1 | 7/2008 | Ansari et al. |
| 2008/0177998 A1 | 7/2008 | Apsangi et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0207167 A1 | 8/2008 | Bugenhagen |
| 2008/0212470 A1 | 9/2008 | Castaneda et al. |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |

(56) References Cited

U.S. PATENT DOCUMENTS

| | | |
|---|---|---|
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg |
| 2008/0262798 A1 | 10/2008 | Kim et al. |
| 2008/0268813 A1 | 10/2008 | Maes |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | Deatley |
| 2008/0319879 A1 | 12/2008 | Carroll et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0013157 A1 | 1/2009 | Beaule |
| 2009/0046723 A1 | 2/2009 | Rahman et al. |
| 2009/0054030 A1 | 2/2009 | Golds |
| 2009/0067372 A1 | 3/2009 | Shah et al. |
| 2009/0068984 A1 | 3/2009 | Burnett |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0157792 A1 | 6/2009 | Fiatal |
| 2009/0172077 A1 | 7/2009 | Roxburgh et al. |
| 2009/0180391 A1 | 7/2009 | Petersen et al. |
| 2009/0197585 A1 | 8/2009 | Aaron |
| 2009/0219170 A1 | 9/2009 | Clark et al. |
| 2009/0248883 A1 | 10/2009 | Suryanarayana et al. |
| 2009/0257379 A1 | 10/2009 | Robinson et al. |
| 2009/0271514 A1 | 10/2009 | Thomas et al. |
| 2009/0286507 A1 | 11/2009 | O'Neal et al. |
| 2009/0287921 A1 | 11/2009 | Zhu et al. |
| 2009/0288140 A1 | 11/2009 | Huber et al. |
| 2009/0299857 A1 | 12/2009 | Brubaker |
| 2009/0307746 A1 | 12/2009 | Di et al. |
| 2009/0315735 A1 | 12/2009 | Bhavani et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0041364 A1 | 2/2010 | Lott et al. |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0131584 A1 | 5/2010 | Johnson |
| 2010/0144310 A1 | 6/2010 | Bedingfield, Sr. et al. |
| 2010/0153781 A1 | 6/2010 | Hanna |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh et al. |
| 2010/0198698 A1 | 8/2010 | Raleigh et al. |
| 2010/0198939 A1 | 8/2010 | Raleigh et al. |
| 2010/0227632 A1 | 9/2010 | Bell et al. |
| 2010/0241544 A1 | 9/2010 | Benson et al. |
| 2010/0325420 A1 | 12/2010 | Kanekar |
| 2011/0013569 A1 | 1/2011 | Scherzer et al. |
| 2011/0081881 A1 | 4/2011 | Baker et al. |
| 2011/0082790 A1 | 4/2011 | Baker et al. |
| 2011/0126141 A1 | 5/2011 | King et al. |
| 2011/0159818 A1 | 6/2011 | Scherzer et al. |
| 2011/0173678 A1 | 7/2011 | Kaippallimalil et al. |
| 2011/0195700 A1 | 8/2011 | Kukuchka et al. |
| 2011/0241624 A1 | 10/2011 | Park et al. |
| 2011/0264923 A1 | 10/2011 | Kocher et al. |
| 2012/0020296 A1 | 1/2012 | Scherzer et al. |
| 2012/0029718 A1 | 2/2012 | Davis |
| 2012/0155296 A1 | 6/2012 | Kashanian |
| 2012/0196644 A1 | 8/2012 | Scherzer et al. |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0084835 A1 | 4/2013 | Scherzer et al. |
| 2013/0095787 A1 | 4/2013 | Kashanian |
| 2013/0117140 A1 | 5/2013 | Kashanian |
| 2013/0144789 A1 | 6/2013 | Aaltonen et al. |

FOREIGN PATENT DOCUMENTS

| | | |
|---|---|---|
| CN | 1802839 A | 7/2006 |
| CN | 1889777 A | 7/2006 |
| CN | 101155343 A | 9/2006 |
| CN | 101115248 A | 1/2008 |
| CN | 101341764 A | 1/2009 |
| EP | 1463238 | 9/2004 |
| EP | 1739518 | 1/2007 |
| EP | 1772988 A1 | 4/2007 |
| EP | 1978772 A1 | 10/2008 |
| WO | 9858505 | 12/1998 |
| WO | WO99/65185 | 12/1999 |
| WO | WO 03/014891 | 2/2003 |
| WO | WO 03/058880 | 7/2003 |
| WO | WO 2004/028070 | 4/2004 |
| WO | 2004064306 | 7/2004 |
| WO | WO 2004/077797 | 9/2004 |
| WO | WO 2004/095753 | 11/2004 |
| WO | 2005008995 | 1/2005 |
| WO | WO 2006/004467 | 1/2006 |
| WO | WO 2006/050758 | 5/2006 |
| WO | WO 2006/073837 | 7/2006 |
| WO | WO 2006/077481 | 7/2006 |
| WO | 2006120558 A1 | 11/2006 |
| WO | WO 2006/130960 | 12/2006 |
| WO | WO 2007/001833 | 1/2007 |
| WO | WO 2007/014630 | 2/2007 |
| WO | WO2007/018363 | 2/2007 |
| WO | WO 2007/053848 | 5/2007 |
| WO | 2007006288 | 6/2007 |
| WO | WO 2007/069245 | 6/2007 |
| WO | 2007097786 A | 8/2007 |
| WO | WO 2007/107701 | 9/2007 |
| WO | 2007124279 | 11/2007 |
| WO | WO 2008/017837 | 2/2008 |
| WO | WO 2008/051379 | 5/2008 |
| WO | WO 2008/066419 | 6/2008 |
| WO | WO 2008/080139 | 7/2008 |
| WO | WO 2008/080430 | 7/2008 |
| WO | WO 2008/099802 | 8/2008 |
| WO | 2010088413 | 8/2010 |

OTHER PUBLICATIONS

Author Unknown, "Data Roaming Tariffs—Transparency Measures." EUROPA—Europe's Information Society Thematic Portal website, date unknown.

Knight et al., Layer 2 and 3 Virtual Private Networks: Taxonomy, Technology, and Standardization Efforts, IEEE Communications Magazine, Jun. 2004.

Koutsopoulou et al., Middleware Platform for the Support of Charging Reconfiguration Actions, 2005.

Nilsson et al., A Novel MAC Scheme for Solving the QoS Parameter Adjustment Problem in IEEE802.11 e EDCA, Feb. 2006.

(56) References Cited

OTHER PUBLICATIONS

Author Unknown, Overview of GSM, GPRS, and UMTS, Chapter 2, Nov. 4, 2008.
Chaouchi et al., Policy Based Networking in the Integration Effort of 4G Networks and Services, 2004 IEEE.
Zhu et al., A Survey of Quality of Service in IEEE 802.11 Networks, IEEE Wireless Communications, Aug. 2004.
Kyriakakos et al., Ubiquitous Service Provision in Next Generation Mobile Networks, Proceedings of the 13th IST Mobile and Wireless Communications Summit, Lyon, France, Jun. 2004.
Farooq et al., An IEEE 802.16 WiMax Module for the NS-3 Simulator, Mar. 2-6, 2009.
Author Unknown, HP, IP Multimedia Services Charging, A White Paper from HP, Jan. 2006.
Author Unknown, Kindle™ User's Guide $_{3rd}$ Edition, Copyright 2004-2009.
Hartmann et al., Agent-Based Banking Transactions & Information Retrieval—What about Performance Issues? 1999.
Van Eijk, et al., GigaMobile, Agent Technology for Designing Personalized Mobile Service Brokerage, Jul. 1, 2002.
Yu Li, Dedicated E-Reading Devices: The State of the Art and Challenges, Scroll, vol. 1, No. 1, 2008.
Dikaiakos et al., A Distributed Middleware Infrastructure for Personalized Services, Nov. 24, 2003.
Rao et al., Evolution of Mobile Location-Based Services, Communication of the ACM, Dec. 2003.
Chandrasekhar et al., Femtocell Networks: A Survey, Jun. 28, 2008.
Hossain et al., Gain-Based Selection of Ambient Media Services in Pervasive Environments, 2008.
Author Unknown, 3GPP TS 23.203, V8.4.0, 3$^{rd}$ Generation Partnership Project; Technical Specification Group Services and System Aspects; Policy and Charging Control Architecture (Release 8), Dec. 2008.
Author Unknown, 3GPP TS 23.401, V8.4.0, 3$^{rd}$ Generation Partnership Project; Technical Specification Group Services and System Aspects; General Packer Radio Service (GPRS) Enhancements for Evolved Universal Terrestrial Radio Access Network (E-UTRAN) Access (Release 8), Dec. 2008.
Stephan Steglich, I-Centric User Interaction, Nov. 21, 2003.
Han et al., Information Collection Services for Qos-Aware Mobile Applications, 2005.
Alonistioti et al., Intelligent Architectures Enabling Flexible Service Provision and Adaptability, 2002.
Rolf Oppliger, Internet Security: Firewalls and Bey, Communications of the ACM, May 1997, vol. 40. No. 5.
Accuris Networks, "The Business Value of Mobile Data Offload—a White Paper", 2010.
Anton, B. et al., "Best Current Practices for Wireless Internet Service Provider (WISP) Roaming"; Release Date Feb. 2003, Version 1.0; VVi-Fi Alliance—Wireless ISP Roaming (WISPr).
Ruckus Wireless—White Paper; "Smarter Wi-Fi for Mobile Operator Infrastructures" 2010.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Wireless Broadband Alliance, "WISPr 2.0, Apr. 8, 2010"; Doc. Ref. No. WBA/RM/WISPr, Version 01.00.
"The Construction of Intelligent Residential District in Use of Cable Television Network," Shandong Science, vol. 13, No. 2, Jun. 2000.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.

\* cited by examiner

1400 ⟶

SYSTEM AND METHOD FOR WIRELESS NETWORK OFFLOADING

PRIORITY CLAIM

This application is a continuation-in-part of and incorporates by reference the following published U.S. pending non-provisional patent applications: U.S. application Ser. No. 12/380,759, published as U.S. publication No. 2010/0188975, filed Mar. 2, 2009, entitled "Verifiable Device Assisted Service Policy Implementation," U.S. application Ser. No. 12/380,779, published as U.S. publication No. 2010/0192170, filed Mar. 2, 2009, entitled "Device Assisted Service Profile Management with User Preference, Adaptive Policy, Network Neutrality, and User Privacy," U.S. application Ser. No. 12/380,758, published as U.S. publication No. 2010/0191612, filed Mar. 2, 2009, entitled "Verifiable Device Assisted Service Usage Monitoring with Reporting, Synchronization, and Notification," U.S. application Ser. No. 12/380,778, published as U.S. publication No. 2010/0191576, filed Mar. 2, 2009, entitled "Verifiable Device Assisted Service Usage Billing with Integrated Accounting, Mediation Accounting, and Multi-Account," U.S. application Ser. No. 12/380,768, published as U.S. publication No. 2010/0188991, filed Mar. 2, 2009, entitled "Network Based Service Policy Implementation with Network Neutrality and User Privacy," U.S. application Ser. No. 12/380,767, published as U.S. publication No. 2010/0188990, filed Mar. 2, 2009, entitled "Network Based Service Profile Management with User Preference, Adaptive Policy, Network Neutrality and User Privacy," U.S. application Ser. No. 12/380,780, published as U.S. publication No. 2010/0192212, filed Mar. 2, 2009, entitled "Automated Device Provisioning and Activation," U.S. application Ser. No. 12/380,755, published as U.S. publication No. 2010/0191604, filed Mar. 2, 2009, entitled "Device Assisted Ambient Services," U.S. application Ser. No. 12/380,756, published as U.S. publication No. 2010/0191575, filed Mar. 2, 2009, entitled "Network Based Ambient Services," U.S. application Ser. No. 12/380,770, published as U.S. publication No. 2010/0188993, filed Mar. 2, 2009, entitled "Network Tools for Analysis, Design, Testing, and Production of Services," U.S. application Ser. No. 12/380,772, published as U.S. publication No. 2010/0190470, filed Mar. 2, 2009, entitled "Roaming Services Network and Overlay Networks," U.S. application Ser. No. 12/380,782, published as U.S. publication No. 2010/0192120, filed Mar. 2, 2009, entitled "Open Development System for Access Service Providers," U.S. application Ser. No. 12/380,783, published as U.S. publication No. 2010/0192207, filed Mar. 2, 2009, entitled "Virtual Service Provider Systems," U.S. application Ser. No. 12/380,757, filed Mar. 2, 2009, and entitled "Service Activation Tracking System," U.S. application Ser. No. 12/380,781, published as U.S. publication No. 2010/0191613, filed Mar. 2, 2009, entitled "Open Transaction Central Billing System," U.S. application Ser. No. 12/380,774, published as U.S. publication No. 2010/0188995, filed Mar. 2, 2009, entitled "Verifiable and Accurate Service Usage Monitoring for Intermediate Networking Devices," U.S. application Ser. No. 12/380,771, published as U.S. publication No. 2010/0188994, filed Mar. 2, 2009, entitled "Verifiable Service Billing for Intermediate Networking Devices," U.S. application Ser. No. 12/380,773, published as U.S. publication No. 2010/0191846, filed Mar. 2, 2009, entitled "Verifiable Service Policy Implementation for Intermediate Networking Devices," U.S. application Ser. No. 12/380,769, published as U.S. publication No. 2010/0188992, filed Mar. 2, 2009, entitled "Service Profile Management with User Preference, Adaptive Policy, Network Neutrality and User Privacy for Intermediate Networking Devices," and U.S. application Ser. No. 12/380,777, published as U.S. publication No. 2010/0191847, filed Mar. 2, 2009, entitled "Simplified Service Network Architecture," which applications claim priority to U.S. provisional application Ser. Nos. 61/207,739 filed Feb. 13, 2009, 61/207,393 filed Feb. 10, 2009, 61/206,944 filed Feb. 4, 2009 and 61/206,354 filed Jan. 28, 2009; U.S. application Ser. No. 12/695,019, published as U.S. publication No. 2010/0197266, filed Jan. 27, 2010, entitled "Device Assisted CDR Creation, Aggregation, Mediation and Billing," which claims priority to U.S. provisional application Ser. Nos. 61/264,126 filed Nov. 24, 2009, 61/270,353 filed Jul. 6, 2009, 61/207,739 filed Feb. 13, 2009, 61/207,393 filed Feb. 10, 2009, 61/206,944 filed Feb. 4, 2009 and 61/206,354 filed Jan. 28, 2009, and which is a continuation-in-part of above-referenced U.S. application Ser. Nos. 12/380,771 and 12/380,778; U.S. application Ser. No. 12/695,020, published as U.S. publication No. 2010/0198698, filed Jan. 27, 2010, entitled "Adaptive Ambient Services," which claims priority to U.S. provisional application Ser. Nos. 61/237,753 filed Aug. 28, 2009, 61/275,208 filed Aug. 25, 2009, 61/207,739 filed Feb. 13, 2009, 61/207,393 filed Feb. 10, 2009, 61/206,944 filed Feb. 4, 2009 and 61/206,354 filed Jan. 28, 2009, and which is a continuation-in-part of above-referenced U.S. application Ser. No. 12/380,780; U.S. application Ser. No. 12/694,445, published as U.S. publication No. 2010/0199325, filed Jan. 27, 2010, entitled "Security Techniques for Device Assisted Services," which claims priority to U.S. provisional application Ser. Nos. 61/252,151 filed Oct. 15, 2009, 61/207,739 filed Feb. 13, 2009, 61/207,393 filed Feb. 10, 2009, 61/206,944 filed Feb. 4, 2009 and 61/206,354 filed Jan. 28, 2009, and which is a continuation-in-part of above-referenced U.S. application Ser. No. 12/380,780; U.S. application Ser. No. 12/694,451, published as U.S. publication No. 2010/0197267, filed Jan. 27, 2010, entitled "Device Group Partitions and Settlement Platform," which claims priority to U.S. provisional application Ser. Nos. 61/252,153 filed Oct. 15, 2009, 61/270,353 filed Jul. 6, 2009, 61/207,739 filed Feb. 13, 2009, 61/207,393 filed Feb. 10, 2009, 61/206,944 filed Feb. 4, 2009 and 61/206,354 filed Jan. 28, 2009, and which is a continuation-in-part of above-referenced U.S. application Ser. No. 12/380,780; U.S. application Ser. No. 12/694,455, published as U.S. application No. 2010/0198939, filed Jan. 27, 2010, entitled "Device Assisted Services Install," which claims priority to U.S. provisional application Ser. Nos. 61/264,120 filed Nov. 24, 2009, 61/207,739 filed Feb. 13, 2009, 61/207,393 filed Feb. 10, 2009, 61/206,944 filed Feb. 4, 2009 and 61/206,354 filed Jan. 28, 2009, and which is a continuation-in-part of above-referenced U.S. application Ser. No. 12/380,780; U.S. application Ser. No. 12/695,021, published as U.S. publication No. 2010/0195503, filed Jan. 27, 2010, entitled "Quality of Service for Device Assisted Services," which claims priority to U.S. provisional application Ser. Nos. 61/252,153 filed Oct. 15, 2009 61/252,151 filed Oct. 15, 2009, 61/207,739 filed Feb. 13, 2009, 61/207,393 filed Feb. 10, 2009, 61/206,944 filed Feb. 4, 2009 and 61/206,354 filed Jan. 28, 2009, and which is a continuation-in-part of above-referenced U.S. application Ser. No. 12/380,780; and U.S. application Ser. No. 12/695,980, published as U.S. publication No. 2010/0197268, filed Jan. 28, 2010, entitled "Enhanced Roaming Services and Converged Carrier Networks with Device Assisted Services and a Proxy," which claims priority to U.S. provisional application Ser. Nos. 61/270,353 filed Jul. 6, 2009, 61/207,739 filed Feb. 13, 2009, 61/207,393 filed Feb. 10, 2009, 61/206,944 filed Feb. 4, 2009 and 61/206,354 filed Jan. 28, 2009, and which is a continuation-in-part of above-referenced U.S. application Ser. Nos. 12/695,021, 12/695,019 and 12/380,780.

The following applications, U.S. Ser. No. 12/380,759 filed Mar. 2, 2009, entitled "Verifiable Device Assisted Service Policy Implementation," U.S. Ser. No. 12/380,779 filed Mar. 2, 2009, entitled "Device Assisted Service Profile Management with User Preference, Adaptive Policy, Network Neutrality, and User Privacy," U.S. Ser. No. 12/380,758 filed Mar. 2, 2009, entitled "Verifiable Device Assisted Service Usage Monitoring with Reporting, Synchronization, and Notification," U.S. Ser. No. 12/380,778 filed Mar. 2, 2009, entitled "Verifiable Device Assisted Service Usage Billing with Integrated Accounting, Mediation Accounting, and Multi-Account," U.S. Ser. No. 12/380,768 filed Mar. 2, 2009, entitled "Network Based Service Policy Implementation with Network Neutrality and User Privacy," U.S. Ser. No. 12/380,767 filed Mar. 2, 2009, entitled "Network Based Service Profile Management with User Preference, Adaptive Policy, Network Neutrality and User Privacy," U.S. Ser. No. 12/380,780 filed Mar. 2, 2009, entitled "Automated Device Provisioning and Activation," U.S. Ser. No. 12/380,755 filed Mar. 2, 2009, entitled "Device Assisted Ambient Services," U.S. Ser. No. 12/380,756 filed Mar. 2, 2009, entitled "Network Based Ambient Services," U.S. Ser. No. 12/380,770 filed Mar. 2, 2009, entitled "Network Tools for Analysis, Design, Testing, and Production of Services," U.S. Ser. No. 12/380,772 filed Mar. 2, 2009, entitled "Roaming Services Network and Overlay Networks," U.S. Ser. No. 12/380,782 filed Mar. 2, 2009, entitled "Open Development System for Access Service Providers," U.S. Ser. No. 12/380,783 filed Mar. 2, 2009, entitled "Virtual Service Provider Systems," U.S. Ser. No. 12/380,757 filed Mar. 2, 2009, entitled "Service Activation Tracking System," U.S. Ser. No. 12/380,781 filed Mar. 2, 2009, entitled "Open Transaction Central Billing System," U.S. Ser. No. 12/380,774 filed Mar. 2, 2009, entitled "Verifiable and Accurate Service Usage Monitoring for Intermediate Networking Devices," U.S. Ser. No. 12/380,771 filed Mar. 2, 2009, entitled "Verifiable Service Billing for Intermediate Networking Devices" (issued as U.S. Pat. No. 8,023,425 on Sep. 20, 2011), U.S. Ser. No. 12/380,773 filed Mar. 2, 2009, entitled "Verifiable Service Policy Implementation for Intermediate Networking Devices," U.S. Ser. No. 12/380,777 filed Mar. 2, 2009, entitled "Simplified Service Network Architecture," U.S. Ser. No. 12/695,019 filed Jan. 27, 2010, entitled "Device Assisted CDR Creation, Aggregation, Mediation, and Billing," U.S. Ser. No. 12/695,020 filed Jan. 27, 2010, entitled "Adaptive Ambient Services," U.S. Ser. No. 12/694,445 filed Jan. 27, 2010, entitled "Security Techniques for Device Assisted Services," U.S. Ser. No. 12/694,451 filed Jan. 27, 2010, entitled "Device Group Partitions and Settlement Platform," U.S. Ser. No. 12/694,455 filed Jan. 27, 2010, entitled "Device Assisted Services Install," U.S. Ser. No. 12/695,021 filed Jan. 27, 2010, entitled "Quality of Service for Device Assisted Services," U.S. Ser. No. 12/695,980 filed Jan. 28, 2010, entitled "Enhanced Roaming Services and Converged Carrier Networks with Device Assisted Services and a Proxy" claim priority to U.S. provisional Ser. No. 61/206,944 filed Feb. 4, 2009, entitled "Services Policy Communication System and Method." The following applications, U.S. Ser. No. 12/380,759 filed Mar. 2, 2009, entitled "Verifiable Device Assisted Service Policy Implementation," U.S. Ser. No. 12/380,779 filed Mar. 2, 2009, entitled "Device Assisted Service Profile Management with User Preference, Adaptive Policy, Network Neutrality, and User Privacy," U.S. Ser. No. 12/380,758 filed Mar. 2, 2009, entitled "Verifiable Device Assisted Service Usage Monitoring with Reporting, Synchronization, and Notification," U.S. Ser. No. 12/380,778 filed Mar. 2, 2009, entitled "Verifiable Device Assisted Service Usage Billing with Integrated Accounting, Mediation Accounting, and Multi-Account," U.S. Ser. No. 12/380,768 filed Mar. 2, 2009, entitled "Network Based Service Policy Implementation with Network Neutrality and User Privacy," U.S. Ser. No. 12/380,767 filed Mar. 2, 2009, entitled "Network Based Service Profile Management with User Preference, Adaptive Policy, Network Neutrality and User Privacy," U.S. Ser. No. 12/380,780 filed Mar. 2, 2009, entitled "Automated Device Provisioning and Activation," U.S. Ser. No. 12/380,755 filed Mar. 2, 2009, entitled "Device Assisted Ambient Services," U.S. Ser. No. 12/380,756 filed Mar. 2, 2009, entitled "Network Based Ambient Services," U.S. Ser. No. 12/380,770 filed Mar. 2, 2009, entitled "Network Tools for Analysis, Design, Testing, and Production of Services," U.S. Ser. No. 12/380,772 filed Mar. 2, 2009, entitled "Roaming Services Network and Overlay Networks," U.S. Ser. No. 12/380,782 filed Mar. 2, 2009, entitled "Open Development System for Access Service Providers," U.S. Ser. No. 12/380,783 filed Mar. 2, 2009, entitled "Virtual Service Provider Systems," U.S. Ser. No. 12/380,757 filed Mar. 2, 2009, entitled "Service Activation Tracking System," U.S. Ser. No. 12/380,781 filed Mar. 2, 2009, entitled "Open Transaction Central Billing System," U.S. Ser. No. 12/380,774 filed Mar. 2, 2009, entitled "Verifiable and Accurate Service Usage Monitoring for Intermediate Networking Devices," U.S. Ser. No. 12/380,771 filed Mar. 2, 2009, entitled "Verifiable Service Billing for Intermediate Networking Devices" (issued as U.S. Pat. No. 8,023,425 on Sep. 20, 2011), U.S. Ser. No. 12/380,773 filed Mar. 2, 2009, entitled "Verifiable Service Policy Implementation for Intermediate Networking Devices," U.S. Ser. No. 12/380,777 filed Mar. 2, 2009, entitled "Simplified Service Network Architecture," U.S. Ser. No. 12/695,019 filed Jan. 27, 2010, entitled "Device Assisted CDR Creation, Aggregation, Mediation, and Billing," U.S. Ser. No. 12/695,020 filed Jan. 27, 2010, entitled "Adaptive Ambient Services," U.S. Ser. No. 12/694,445 filed Jan. 27, 2010, entitled "Security Techniques for Device Assisted Services," U.S. Ser. No. 12/694,451 filed Jan. 27, 2010, entitled "Device Group Partitions and Settlement Platform," U.S. Ser. No. 12/694,455 filed Jan. 27, 2010, entitled "Device Assisted Services Install," U.S. Ser. No. 12/695,021 filed Jan. 27, 2010, entitled "Quality of Service for Device Assisted Services," and U.S. Ser. No. 12/695,980 filed Jan. 28, 2010, entitled "Enhanced Roaming Services and Converged Carrier Networks with Device Assisted Services and a Proxy," claim priority to U.S. provisional Ser. No. 61/207,393 filed Feb. 10, 2009, entitled "Services Policy Communication System and Method." The following applications, U.S. Ser. No. 12/380,759 filed Mar. 2, 2009, entitled "Verifiable Device Assisted Service Policy Implementation," U.S. Ser. No. 12/380,779 filed Mar. 2, 2009, entitled "Device Assisted Service Profile Management with User Preference, Adaptive Policy, Network Neutrality, and User Privacy," U.S. Ser. No. 12/380,758 filed Mar. 2, 2009, entitled "Verifiable Device Assisted Service Usage Monitoring with Reporting, Synchronization, and Notification," U.S. Ser. No. 12/380,778 filed Mar. 2, 2009, entitled "Verifiable Device Assisted Service Usage Billing with Integrated Accounting, Mediation Accounting, and Multi-Account," U.S. Ser. No. 12/380,768 filed Mar. 2, 2009, entitled "Network Based Service Policy Implementation with Network Neutrality and User Privacy," U.S. Ser. No. 12/380,767 filed Mar. 2, 2009, entitled "Network Based Service Profile Management with User Preference, Adaptive Policy, Network Neutrality and User Privacy," U.S. Ser. No. 12/380,780 filed Mar. 2, 2009, entitled "Automated Device Provisioning and Activation," U.S. Ser. No. 12/380,755 filed Mar. 2, 2009, entitled "Device Assisted Ambient Services," U.S. Ser. No. 12/380,756 filed Mar. 2, 2009, entitled "Network Based Ambient Services," U.S. Ser. No. 12/380,770 filed Mar. 2, 2009, entitled "Network Tools for Analysis, Design, Testing, and Production of Services," U.S. Ser. No. 12/380,772 filed Mar. 2, 2009, entitled "Roaming Services Network and Overlay Networks," U.S. Ser. No. 12/380,782 filed Mar. 2, 2009, entitled "Open Development System for Access Service Providers," U.S. Ser. No. 12/380,783 filed Mar. 2, 2009, entitled "Virtual Service Provider Systems," U.S. Ser. No. 12/380,757 filed Mar. 2, 2009, entitled "Service Activation Tracking System," U.S. Ser. No. 12/380,781 filed Mar. 2, 2009, entitled "Open Transaction Central Billing System," U.S. Ser. No. 12/380,774 filed Mar. 2, 2009, entitled "Verifiable and Accurate Service Usage Monitoring for Intermediate Networking Devices," U.S. Ser. No. 12/380,771 filed Mar. 2, 2009, entitled "Verifiable Service Billing for Intermediate Networking Devices" (issued as U.S. Pat. No. 8,023,425 on Sep. 20, 2011), U.S. Ser. No. 12/380,773 filed Mar. 2, 2009, entitled "Verifiable Service Policy Implementation for Intermediate Networking Devices," U.S. Ser. No. 12/380,777 filed Mar. 2, 2009, entitled "Simplified Service Network Architecture," U.S. Ser. No. 12/695,019 filed Jan. 27, 2010, entitled "Device Assisted CDR Creation, Aggregation, Mediation, and Billing," U.S. Ser. No. 12/695,020 filed Jan. 27, 2010, entitled "Adaptive Ambient Services," U.S. Ser. No. 12/694,445 filed Jan. 27, 2010, entitled "Security Techniques for Device Assisted Services," U.S. Ser. No. 12/694,451 filed Jan. 27, 2010, entitled "Device Group Partitions and Settlement Platform," U.S. Ser. No. 12/694,455 filed Jan. 27, 2010, entitled "Device Assisted Services Install," U.S. Ser. No. 12/695,021 filed Jan. 27, 2010, entitled "Quality of Service for Device Assisted Services," and U.S. Ser. No. 12/695,980 filed Jan. 28, 2010, entitled "Enhanced Roaming Services and Converged Carrier Networks with Device Assisted Services and a Proxy," claim priority to U.S. provisional Ser. No. 61/207,739 filed Feb. 13, 2009, entitled "Services Policy Communication System and Method." The following applications, U.S. Ser. No. 12/695,019 filed Jan. 27, 2010, entitled "Device Assisted CDR Creation, Aggregation, Mediation, and Billing," U.S. Ser. No. 12/694,451 filed Jan. 27, 2010, entitled "Device Group Partitions and Settlement Platform," and U.S. Ser. No. 12/695,980 filed Jan. 28, 2010, entitled "Enhanced Roaming Services and Converged Carrier Networks with Device Assisted Services and a Proxy," claim priority to U.S. provisional Ser. No. 61/270,353 filed Jul. 6, 2009, entitled "Device Assisted CDR Creation, Aggregation, Mediation and Billing." The following application, U.S. Ser. No. 12/695,020 filed Jan. 27, 2010, entitled "Adaptive Ambient Services," claims priority to U.S. provisional Ser. No. 61/275,208 filed Aug. 25, 2009, entitled "Adaptive Ambient Services." The following application, U.S. Ser. No. 12/695,020 filed Jan. 27, 2010, entitled "Adaptive Ambient Services," claims priority to U.S. provisional Ser. No. 61/237,753 filed Aug. 28, 2009, entitled "Adaptive Ambient Services." The following applications, U.S. Ser. No. 12/694,445 filed Jan. 27, 2010, entitled "Security Techniques for Device Assisted Services," and U.S. Ser. No. 12/695,021 filed Jan. 27, 2010, entitled "Quality of Service for Device Assisted Services," claim priority to U.S. provisional Ser. No. 61/252,151 filed Oct. 15, 2009, entitled "Security Techniques for Device Assisted Services." The following applications, U.S. Ser. No. 12/694,451 filed Jan. 27, 2010, entitled "Device Group Partitions and Settlement Platform," and U.S. Ser. No. 12/695,021 filed Jan. 27, 2010 entitled "Quality of Service for Device Assisted Services," claim priority to U.S. provisional Ser. No. 61/252,153 filed Oct. 15, 2009, entitled "Device Group Partitions and Settlement Platform." The following application, U.S. Ser. No. 12/694,455 filed Jan. 27, 2010, entitled "Device Assisted Services Install," claims priority to U.S. provisional Ser. No. 61/264,120 filed Nov. 24, 2009, entitled "Device Assisted Services Install." The following application, U.S. Ser. No. 12/695,019 filed Jan. 27, 2010, entitled "Device Assisted CDR Creation, Aggregation, Mediation, and Billing," claims priority to U.S. provisional Ser. No. 61/264,126 filed Nov. 24, 2009, entitled "Device Assisted Services Activity Map."

Further, this application incorporates by reference the following U.S. provisional patent applications, which are also included in paragraph [0001] above: U.S. provisional application Ser. No. 61/206,354, filed Jan. 28, 2009, entitled "Services Policy Communication System and Method," U.S. provisional application Ser. No. 61/206,944, filed Feb. 4, 2009, entitled "Services Policy Communication System and Method," U.S. provisional application Ser. No. 61/207,393, filed Feb. 10, 2009, entitled "Services Policy Communication System and Method," U.S. provisional application Ser. No. 61/207,739, filed Feb. 13, 2009, entitled "Services Policy Communication System and Method," U.S. provisional application Ser. No. 61/270,353, filed Jul. 6, 2009, entitled "Device Assisted CDR Creation, Aggregation, Mediation and Billing," U.S. provisional application Ser. No. 61/275,208, filed Aug. 25, 2009, entitled "Adaptive Ambient Services," U.S. provisional application Ser. No. 61/237,753, filed Aug. 28, 2009, entitled "Adaptive Ambient Services," U.S. provisional application Ser. No. 61/252,151, filed Oct. 15, 2009, entitled "Security Techniques for Device Assisted Services," U.S. provisional application Ser. No. 61/252,153, filed Oct. 15, 2009, entitled "Device Group Partitions and Settlement Platform," U.S. provisional application Ser. No. 61/264,120, filed Nov. 24, 2009, entitled "Device Assisted Services Install," and U.S. provisional application Ser. No. 61/264,126, filed Nov. 24, 2009, entitled "Device Assisted Services Activity Map."

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Wireless networks, such as Wi-Fi, 2G, 3G, 4G and WiMAX, whether governed by standards or proprietary protocols, often overlap with one another. Multiple wireless networks of the same type, perhaps with configuration-specific differences, also often overlap with one another.

A wireless device chooses an available wireless network to associate with. The choice is generally made based on user selection, whether or not a better selection is available for a given situation.

DETAILED DESCRIPTION

Figure 1:
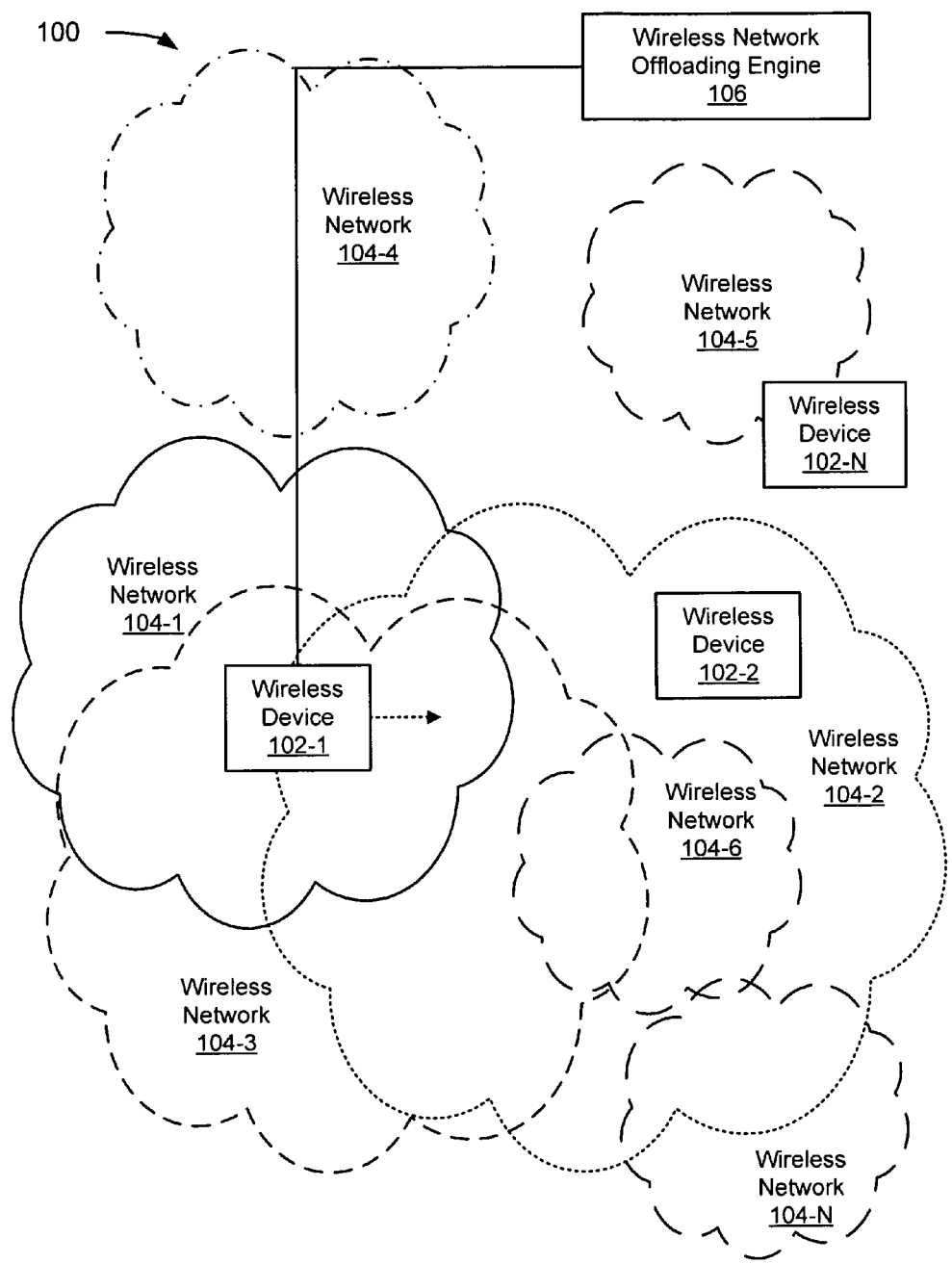
FIG. 1 depicts a diagram of an example of a system including a wireless network offloading engine.

In the following description, several specific details are presented to provide a thorough understanding of embodiments of the invention. One skilled in the relevant art will recognize, however, that embodiments of the invention can be practiced without one or more of the specific details, or in combination with other components, etc. In other instances, well-known implementations or operations are not shown or described in detail to avoid obscuring aspects of various embodiments.

A technique for wireless offloading provides tools to a service provider to encourage or direct a subscriber to offload from a first network to a second network. For the purposes of this introductory example, the service provider may be referred to as a cellular service provider, the first network may be referred to as a cellular network, and the second network may be referred to as a Wi-Fi network.

The cellular service provider can use network data to determine wireless offloading priorities for cellular subscribers on an individual or group basis. In order to determine wireless offloading priorities, the cellular service provider may use wireless network data it has and/or wireless network data it learns about networks from the wireless devices (which may obtain Wi-Fi network data from beacon frames of Wi-Fi networks or active scanning and which may report to the cellular service provider). Each wireless device can be given scanning assignments to ensure that the reporting task is shared among subscribers or adjusted to fill in gaps in data. With the network data, the cellular service provider is capable of generating useful prioritized network lists for wireless devices, either individually or as a group. These prioritized network lists can be represented as a network map.

The cellular service provider can obtain more than just network data. For example, wireless devices can provide connection data, such as the probability that an authentication request will result in an eventual connection or the delay in the access grant. The wireless device can timestamp certain data to enable the service provider to determine how network or otherwise relevant characteristics can vary by, for example, time of day or day of the week. Other data can include the location of the wireless device, which can provide data useful for determining zones of coverage for a service area with different performance or other characteristics. Using a combination of the timestamp and location data, the server can derive a motion trace, or the motion trace can be explicitly provided by subscribers, that is representative of the velocity at which a subscriber is moving. All of this data can be useful for generating more useful prioritized lists for the wireless devices.

The cellular service provider can also obtain subscriber-specific data. Some such data may be available from a subscriber account or the parameters of a service plan. Other such data can be in the form of user preferences or performance history for a wireless device. Rules for adjusting network priorities can take into account a cost function with parameters that may vary by implementation, configuration, or preference. Preferences can be encouraged in the form of incentive offers to subscribers to, e.g., offload from the cellular network to a Wi-Fi network. Incentive offers can include offers to lower service costs or provide additional or improved services.

FIG. 1 depicts a diagram of a system 100 including a wireless network offloading engine 106. The system 100 includes wireless devices 102-1 to 102-N (referred to collectively as the wireless devices 102), wireless networks 104-1 to 104-N (referred to collectively as the wireless networks 104), and a wireless network offloading engine 106.

The wireless devices 102 will at a minimum include a processor, memory (though the memory could be implemented in the processor), a radio, and a radio interface (though the radio interface could be implemented as "part of" the radio). The wireless devices 102 will typically have at least one input device and at least one output device, including input and output interfaces, if applicable.

The wireless devices 102 can be implemented as stations. A station, as used herein, may be referred to as a device with a media access control (MAC) address and a physical layer (PHY) interface to the wireless medium that comply with, e.g., the IEEE 802.11 standard. A station can be described as "IEEE 802.11-compliant" when compliance with the IEEE 802.11 standard is intended to be explicit (i.e, a device acts as described in at least a portion of the IEEE 802.11 standard.) One of ordinary skill in the relevant art would understand what the IEEE 802.11 standard comprises today and that the IEEE 802.11 standard can change over time, and would be expected to apply techniques described in this paper in compliance with future versions of the IEEE 802.11 standard if an applicable change is made. IEEE Std 802.11™-2007 (Revision of IEEE Std 802.11-1999) is incorporated by reference. IEEE 802.11k-2008, IEEE 802.11n-2009, IEEE 802.11p-2010, IEEE 802.11r-2008, IEEE 802.11w-2009, and IEEE 802.11y-2008 are also incorporated by reference.

In alternative embodiments, one or more of the wireless devices 102 may comply with some other standard or no standard at all, and may have different interfaces to a wireless or other medium. It should be noted that not all standards refer to wireless devices as "stations," but where the term is used in this paper, it should be understood that an analogous unit will be present on all applicable wireless networks. Thus, use of the term "station" should not be construed as limiting the scope of an embodiment that describes wireless devices as stations to a standard that explicitly uses the term, unless such a limitation is appropriate in the context of the discussion.

The wireless networks 104 will typically include an internetworking unit (IWU) that interconnects wireless devices on the relevant one of the wireless networks 104 with another network, such as a wired LAN. The IWU is sometimes referred to as a wireless access point (WAP). In the IEEE 802.11 standard, a WAP is also defined as a station. Thus, a station can be a non-WAP station or a WAP station. In a cellular network, the WAP is often referred to as a base station.

The wireless networks 104 can be implemented using any applicable technology, which can differ by network type or in other ways. The wireless networks 104 can be of any appropriate size (e.g., metropolitan area network (MAN), personal area network (PAN), etc.). Broadband wireless MANs may or may not be compliant with IEEE 802.16, which is incorporated by reference. Wireless PANs may or may not be compliant with IEEE 802.15, which is incorporated by reference. The wireless networks 104 can be identifiable by network type (e.g., 2G, 3G, 4G, and Wi-Fi), service provider, WAP/base station identifier (e.g., Wi-Fi SSID, base station and sector ID), geographic location, or other identification criteria.

The wireless networks 104 may or may not be coupled together via an intermediate network. The intermediate network can include practically any type of communications network, such as, by way of example but not limitation, the Internet, a public switched telephone network (PSTN), or an infrastructure network (e.g., private LAN). The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web).

In the example of FIG. 1, the wireless network offloading engine 106 is coupled to the wireless device 102-1. In a specific implementation, the wireless network offloading engine 106 is implemented on a server and is coupled to the wireless device 102-1 through the Internet. However, at least a portion of the wireless network offloading engine 106, described in more detail later with reference to FIG. 2, can alternatively be implemented on the wireless device 102-1, with or without a connection to a server that includes another portion (e.g., a server portion) of the wireless network offloading engine 106.

In an example of operation, periodically, occasionally, or when instructed, the wireless device 102-1 performs an available network characterization scan (ANCS) on one or more of the wireless networks 104. Other devices, such as the wireless device 102-2 or some other station, may or may not also perform an ANCS. The ANCS can be used to characterize available performance for each network (e.g., data rate, bit rate variability, latency, latency jitter, quality of service (QoS), response time, etc.).

Some objective criteria for measuring performance exist (e.g., throughput). Intelligent network monitoring can enable real-time monitoring of network service usage (e.g., at the packet level/layer, network stack application interface level/layer, and/or application level/layer) of the wireless network (e.g., radio access networks and/or core networks) and to effectively manage the network service usage for protecting network capacity (e.g., while still maintaining an acceptable user experience). Using Device Assisted Services (DAS) techniques, and in some cases, network assisted/based techniques, to provide for network service usage monitoring of devices, network carriers/operators would be provided greater insight into what devices, which users and what applications, and when and where network congestion problems occur, enabling operators to intelligently add additional resources to certain areas when necessary (e.g., offloading data traffic onto femto cells or WiFi hotspots and adding more network resources), to differentially control network service usage, and/or to differentially charge for network service usage based on, for example, a network busy state, for protecting network capacity.

Performance need not be based on network performance alone. For example, a subscriber may be interested in economic performance (e.g., price). Accordingly, in this paper, performance is sometimes characterized using a cost function that can include various parameters, including network performance, economic performance, reliability, and/or other parameters that are indicative of preferences of a user or service provider. Where a particular type of performance is applicable, the meaning can be made explicit (e.g., by making reference to "network performance" as opposed to simply "performance") or can be derived from context.

The wireless device 102-1 generates an ANCS report using results of the ANCS in order to characterize available performance for each scanned network of the wireless networks 104. The ANCS report can also include an identification of currently available networks for the wireless device 102-1, location, time, and potentially some performance characterization. The wireless device 102-1 makes the ANCS report available to the wireless network offloading engine 106. The wireless device 102-1 can also make device-specific information available, such as location, performance thresholds, a motion trace, knowledge about other devices or interference, a performance history, applications (e.g., a VoIP or streaming media application), device-specific rules related to when the device will link to a network or offload (e.g., based on reliability, performance state, congestion state, QoS, incentive state, et al.), or a cost function (e.g., based on signal strength, channel strength, basic radio bit rate, network speed, network throughput, speed jitter, throughput jitter, network delay, delay jitter, network availability, network reliability in access grant percentage, network reliability in delay in access grant, variation in performance as a function of position, et al.). Alternatively, some device-specific information may or may not be shared with the wireless network offloading engine 106, and used to customize a priority list or multi-dimensional network map that is generated or received at the wireless device 102-1.

The wireless network offloading engine 106 generates a multi-dimensional network map from the ANCS report and/or other data that is known to the wireless network offloading engine 106. The wireless network offloading engine 106 can provide the multi-dimensional network map to the wireless device 102-1, from which the wireless device 102-1 can generate or modify a wireless operation instruction set. Alternatively, the wireless network offloading engine 106 can generate an instruction set from the multi-dimensional map, which it makes available to the wireless device 102. The instruction set can be an implementation of a general algorithm that is customized by the wireless device 102-1 after it is received, or the instruction set can be generated specifically for the wireless device 102-1 or a set of devices that includes the wireless device 102-1, to be executed on-device in accordance with device-specific parameters (e.g., power saving settings, location, time of day, etc.). Advantageously, the wireless device 102-1 is able to use the instruction set to enable intelligent offloading of the wireless device 102-1 from one of the wireless networks 104 to another. In some embodiments, the wireless device 102-1 is capable of modifying the multi-dimensional network map before making a network selection decision. The wireless network offloading engine may provide one or more parameters and/or algorithms to the wireless device 102-1 for making the network selection decision.

Differential network access control for protecting network capacity includes applying policies to determine which network a service activity should be connected to (e.g., 2G, 3G, 4G, home or roaming, WiFi, cable, DSL, fiber, wired WAN, and/or another wired or wireless or access network), and applying differential network access control rules (e.g., traffic control rules) depending on which network to which the service activity is connected. In some embodiments, differential network access control for protecting network capacity includes differentially controlling network service usage activities based on the service usage control policy and a user input (e.g., a user selection or user preference). Depending upon the implementation, network service usage control policy can consider availability of alternative networks, policy rules for selecting alternative networks, network busy state or availability state for alternative networks, specific network selection or preference policies for a given network service activity or set of network service activities, to name several.

In a specific implementation, the wireless device 102 aids in determining (e.g., measuring and/or characterizing) a network busy state experienced by the device (e.g., which can be used to determine the network access control policy for one or more network capacity controlled services). For example, the network busy state experienced by the device can be recorded by the device and included in a network busy state report that is sent to a network element/function (e.g., a wireless network offloading engine 106 as described herein). The network busy state report can include, for example, data rate, average throughput, minimum throughput, throughput jitter, latency, latency jitter, bit error rate, data error rate, packet error rate, packet drop rate, number of access attempts, number of access successes, number of access failures, QoS level availability, QoS level performance, variability in any of the preceding parameters, and/or the historic statistics of any of the preceding parameters, to name several by way of example. The network busy state report can include, for example, 2G, 3G, 4G or WiFi base station ID, SSID, cell sector ID, CDMA ID, FDMA channel ID, TDMA channel ID, GPS location, and/or physical location to identify the edge network element that is associated with the network busy state report to a network element, to name several by way of example. In a specific implementation, the network busy state is monitored by one or more network elements that can measure and/or report network busy state (e.g., wireless network offloading engine 106, BTS, BTSC, access point, base station monitor, and/or airwave monitor).

As a clarifying example embodiment, the wireless device 102 (e.g. a network performance characterization software or hardware agent on the device) acts in conjunction with a network element (e.g. a wireless network offloading engine 106) to characterize the network busy state of an alternative network access point or base station resource. In such embodiments the device can sense an available alternative network, connect to a network element (e.g. a wireless network offloading engine 106) through the alternative network, conduct a download and/or upload sequence during which the network performance is monitored, and then cause the performance to be characterized and recorded. The performance can be characterized by the network element (e.g. a wireless network offloading engine 106), by the wireless device 102 (e.g. a network performance characterization software or hardware agent) or by both.

As another clarifying embodiment, the wireless device 102 (e.g. a network performance characterization software or hardware agent on the device) can sense an available alternative network, connect to the alternative network, allow the user to use the network connection services, monitor the resulting network performance and record the performance results.

In a specific implementation, one or more of the wireless devices that use wireless services on the one or more main networks and/or alternative networks are used as described herein to collect alternative network performance, busy state and/or QoS state information.

In a specific implementation, the main networks and/or alternative networks can be monitored and characterized by devices that are permanently located in the vicinity of one or more alternative network base stations or access points and configured to communicate with a wireless network offloading engine 106. A permanently located mobile terminal can provide network monitors for reporting, for example, network busy state, to a central network element, such as the wireless network offloading engine 106, which can, for example, aggregate such network busy state information to determine network busy state for one or more network coverage areas.

For example, airwave monitors and/or base station monitors can be provided to facilitate a reliable characterization of network busy state in a coverage area of one or more base stations and/or base station sectors and/or WiFi access points, such as affixed mobile terminals (e.g., trusted terminals that can include additional network busy state monitoring and/or reporting functionality) installed (e.g., temporarily or permanently) in the coverage area of one or more base stations and/or base station sectors (e.g., in which a sector is the combination of a directional antenna and a frequency channel) so that the mobile terminals perform network busy state monitoring and reporting to the wireless network offloading engine 106, the local base station, and/or other network element(s)/function(s). In some embodiments, the permanently affixed mobile terminals provide network monitors for reporting, for example, network busy state (or performance, reliability or QoS), to a central network element, such as the wireless network offloading engine 106, which can, for example, aggregate such network busy state information to determine network busy state for one or more network coverage areas. In some embodiments, the mobile terminals are always present in these locations where installed and always on (e.g., performing network monitoring), and can be trusted (e.g., the mobile terminals can be loaded with various hardware and/or software credentials). For example, using the mobile terminals, a reliable characterization of network busy state can be provided, which can then be reported to a central network element and aggregated for performing various network busy state related techniques as described herein with respect to various embodiments.

In a specific implementation, the wireless network offloading engine 106 uses the network busy state reports (or performance reports or QoS reports) from user devices and/or permanent mobile terminals connected to the same alternative network to determine the network busy state for an alternative network edge element connected to the device.

In some embodiments, a network element/function (e.g., a wireless access point or base station) sends a busy state report for the network edge element to the device (e.g., and to other devices connected to the same network edge element), which the device can then use to implement differential network access control policies (e.g., for network capacity controlled services) based on the network busy state. In some embodiments, a network busy state is provided by a network element (e.g., wireless network offloading engine 106 or service cloud) and broadcast to the device (e.g., securely communicated to the wireless device 102).

In some embodiments, the wireless device 102 (e.g. a network performance characterization software or hardware agent) selects the access network connection in accordance with a network service profile setting that determines which network the device should choose between available alternative WWAN, WLAN, WPAN, Ethernet and/or DSL network connections. This choice can be based on the performance, reliability, busy state or QoS capability of one or more alternative networks. The characterization of the alternative networks can be based on an end to end performance, and not just the over the air or radio frequency performance. For example, service profile settings can be based on the performance of the actual access network (e.g., home DSL/cable, coffee shop, shopping center, public WiFi hot spot or work network) behind the Wi-Fi not the fact that it is Wi-Fi (e.g., or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the wireless network offloading engine 106 can sit in a service provider cloud or an MVNO cloud, the service controls can be provided by a VSP capability offered by the service provider or the wireless network offloading engine 106 can be owned by the hotspot service provider that uses the wireless network offloading engine 106 on their own without any association with an access network service provider.

Figure 2:
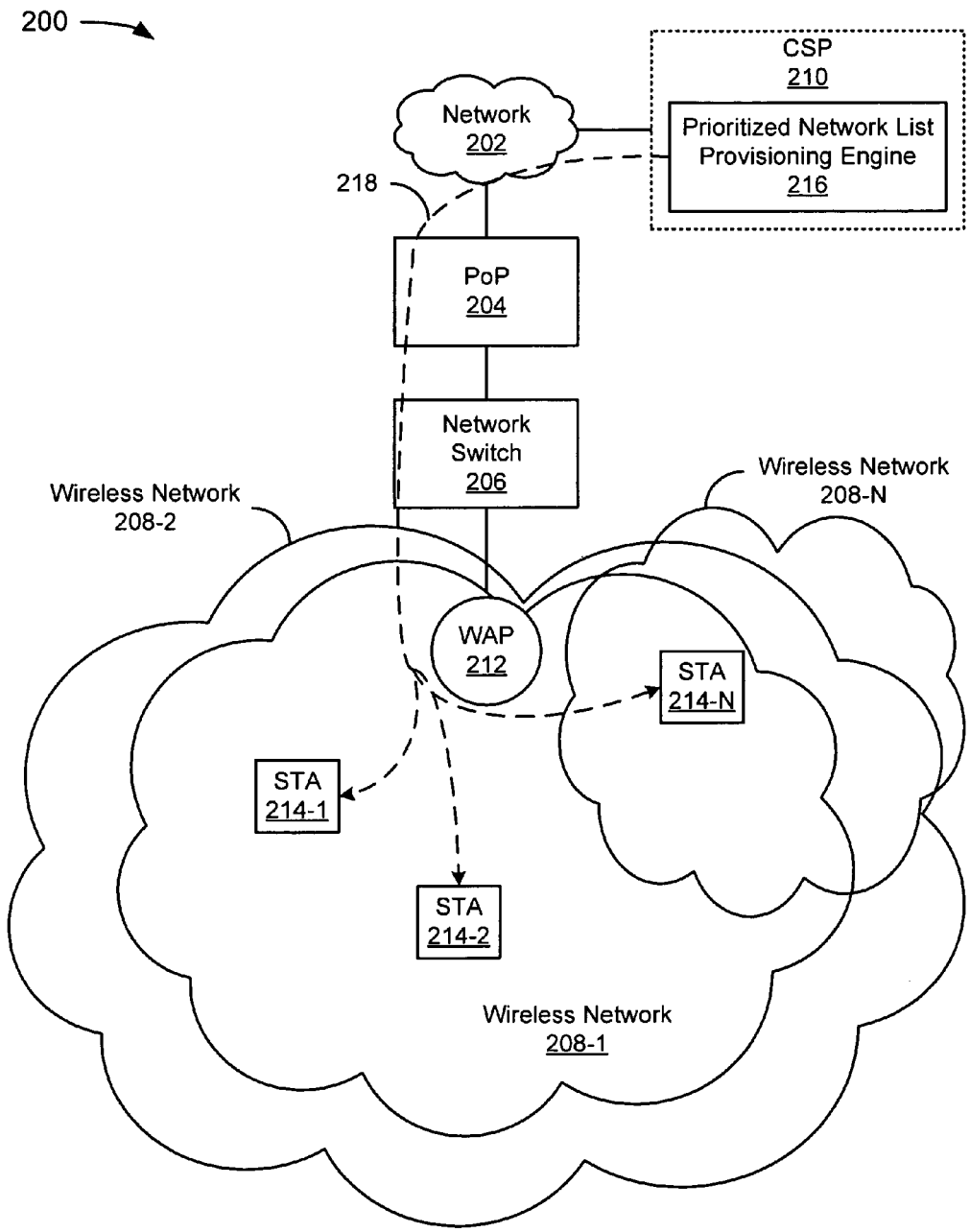
FIG. 2 depicts a diagram of an example of a system for providing a prioritized network list to stations on a wireless network.

FIG. 2 depicts a diagram an example of a system 200 for providing a prioritized network list to stations on a wireless network. In the example of FIG. 2, the system 200 includes a network 202, a point-of-presence (PoP) 204, a network switch 206, wireless networks 208-1 to 208-N (collectively referred to as wireless networks 208), and a communications service provider (CSP) 210. The wireless network 208-1 includes a WAP 212 and, in operation, stations 214-1 to 214-N (collectively referred to as stations 214). The CSP 210 includes a prioritized network list provisioning engine 216.

The network 202 can include any applicable network that is capable of coupling the station 214-1 to the CSP 210. The PoP 204 is coupled to the network 202. The term "PoP" is often used to refer to a PoP on the Internet. However, the term as used with reference to FIG. 2 is intended to mean a PoP on the network 202, regardless of the type of network. The network switch 206 can be referred to as a wireless network switch because it couples the WAP 212 to a (typically) wired network, such as a LAN. The term "WAP" is often used with reference to AP stations in an IEEE 802.11-compatible network. However, the term should be construed to include the relevant node when the wireless network makes use of some other access technology (e.g., the term "base station" is often used to refer to the access node of a cellular network). In some cases, one or more of the PoP 204, network switch 206, and WAP 212 can be co-located.

The wireless networks 208 can be of an applicable known or convenient wireless network type. The basic service set (BSS) is a term used in IEEE 802.11 to refer to a group of stations that communicate with one another. The basic service area is defined by the propagation characteristics of the wireless medium. (Note: the term "area" is typically used to describe the three-dimensional space of a basic service area.) A station in the basic service area can communicate with other stations in the BSS. A BSS with a WAP, as is depicted in the example of FIG. 2 for the wireless network 208-1, can be referred to as an infrastructure BSS. To avoid confusion with the acronym IBSS, which refers to an independent BSS (also known as an ad hoc BSS), an infrastructure BSS is not referred to as an IBSS. An infrastructure BSS is defined by the distance from the WAP; so the stations 214, which are all on the wireless network 208-1, are within reach of the WAP 212 (as illustrated by the stations 214 being depicted as inside the cloud associated with the wireless network 208-1). In an infrastructure BSS, stations must associate with a WAP to obtain network services. The stations typically initiate the process and the WAP decides whether to grant or deny access based on the contents of an association request. Although this process is described in the context of IEEE 802.11 language, a similar description is applicable to other wireless network technologies.

The wireless network 208-1 is constrained in size by the range of the WAP 212, though multiple WAPs (not shown) could be used to increase the size of the wireless network 208-1. An extended service set (ESS) can comprise multiple BSSs, each connected to a backbone network. All of the WAPs in an ESS are given the same service set identifier (SSID), which is can be considered to be the "name" of the wireless network. The degree to which basic service areas overlap in an extended service area is implementation- and/or technology-specific.

The WAP 212 may or may not support multiple wireless networks with the same radio. Within the WAP 212, each SSID would be associated with a virtual LAN (VLAN). A relatively common implementation of this is when the WAP 212 supports a guest network (a first VLAN) and an internal network (a second VLAN). The stations 214 would likely see two separate networks in the radio domain. Thus, the wireless networks 208 may or may not have separate WAPs. A WAP that supports multiple networks may or may not have the same range for each network, particularly if the broadcast power or frequency bands are different (e.g., a WAP could be 802.11a and 802.11b/g-compatible).

In the example of FIG. 2, the stations 214 are within a service area of the wireless networks 208. As is shown by way of example, some of the stations, e.g., station 214-N, can be within the service area of a different wireless network, e.g., wireless network 208-N, than the other stations 214. The stations 214 can send information about a subset of the wireless networks 208 if the stations 214 are in the respective service areas of the wireless networks 208. By subset, it is intended that, depending upon the implementation or station capabilities, a station may or may not send information about all of the wireless networks 208 if in the respective service areas, and may or may not send information about any of the wireless networks 208. Depending upon the implementation or station capabilities, a station may or may not send information about a network when no longer in a service area of the wireless network, such as, e.g., when a WAP fails or the station is moved out of the service area. As shown by way of example, the station 214-1 is in the service area of wireless networks 208-1 and 208-2. So the station 214-1 can send information about the wireless networks 208-1 and 208-2, either the wireless network 208-1 or the wireless network 208-2, or neither of the wireless networks 208-1 and 208-2; the station 214-1 may or may not also send information about the wireless network 208-N, e.g., based on historical data, data received from station 214-N, or data received from another source, even though the station 214-1 is not currently within the service area of the wireless network 208-N.

The stations 214 are operationally connected to the CSP 210 through the WAP 212. Where the CSP 210 is part of an enterprise network that includes the wireless network 208-1, the stations 214 may or may not actually be coupled to the CSP 210 through the PoP 204 because the CSP 210 could be on the wired backbone network to which the WAP 212 is connected. However, this observation does not make an understanding of the example of FIG. 2 difficult to one of ordinary skill in the relevant art.

The CSP 210 can be part of a public or private entity in, e.g., telecom (landline or wireless), Internet, cable, satellite, and/or managed services businesses. CSPs often specialize in an industry, such as telecommunications, entertainment and media, and Internet/Web services, though service providers can operate in multiple areas. While it is likely that a CSP would be able to best implement the prioritized network list provisioning engine 216 due to the data available to the CSP, it is also possible to offer the prioritized network list provisioning engine 216 through an application service provider (ASP), if the ASP is given sufficient data either from stations or CSPs, or perhaps a managed service provider (MSP) providing services on behalf of the CSP or some other entity. Alternatively, the prioritized network list provisioning engine 216 could be implemented on a private network, or on some other server.

In the example of FIG. 2, it is assumed that the stations 214 are known to the CSP 210. If the CSP 210 provides services to each of the stations 214, the CSP 210 can have account information associated with each of the stations 214, can be made aware of device-specific data (e.g., roaming, bandwidth consumption, application use, etc.), and can receive additional information associated with the stations 214 and/or networks near the stations 214 over time. How the stations 214 are known and what information is made available to the CSP 210 can depend upon the implementation. For example, the CSP 210 could be controlled by a mobile wireless communication company that provides cellular services to the stations 214 on, e.g., a 4G network. (As was previously mentioned, some services could be provided through an ASP; so it should be borne in mind that this is simply one example and other applicable implementations should be understood to have appropriate variations.)

In the example of FIG. 2, the prioritized network list provisioning engine 216 provides a prioritized network list to the stations 214, which is represented in the example of FIG. 2 as a dashed line 218. The list need not be identical for each of the stations 214. For example, the prioritized network list provisioning engine 216 could customize the list sent to the station 214-1 based upon account parameters, current device-specific parameters, or historical device-specific parameters. Alternatively, the list sent to each of the stations 214 could be customized (or not) at the stations 214.

The prioritized list can be provided through an applicable channel. For example, the prioritized network list provisioning engine 216 could push the prioritized list to a station through a cellular network provided by a company that controls the CSP 210, through a public network out of the control of the company, through a private network, or through some other channel. The station could also pull the prioritized list from the prioritized network list provisioning engine 216. While it is likely the prioritized list will be provided on a wireless network periodically or as needed, it is also possible to provide the prioritized list in advance, which means it could be, for example, provided when a wireless device is wire-connected to a computer that has been provided or can obtain the prioritized list.

Advantageously, the prioritized list can include information that is not available to the stations 214 at a given point in time. For example, the stations 214 can perform a passive scan of nearby network service areas. The stations 214 can sort the list of applicable wireless networks based on, for example, a received signal strength indicator (RSSI) for each of the wireless networks. This type of list is referred to in this paper as a "sorted list," which is intended to mean a list that has been sorted in accordance with a current key value. However, certain data is not used when sorting the list of wireless networks. The certain data can be categorized as "historical data," which is previously obtained data about characteristics of a subset of the wireless networks, and "remotely obtained data," which is data of which one or more of the stations 214 did not collect on their own. (Data collected by a station can be referred to as "locally obtained data.") A "prioritized list" is defined as a sorted list that is further sorted using historical and/or remotely obtained data. Where it is desirable to explicitly indicate the type of prioritized list, the prioritized list can be referred to as a historically and contemporaneously prioritized list, a remotely and locally prioritized list, or (where both types of data are used to create the prioritized list) a historically and contemporaneously, remotely and locally prioritized list. A prioritized list that can include any of these types is referred to as a "prioritized list." Advantageously, the stations 214 can use a prioritized list that is provided from the prioritized network list provisioning engine 216 to guide network association behavior.

The stations 214 can obtain data by scanning. Passive scans can identify wireless networks that use beacon frames, which will include some information about the wireless network. Active scans can generally obtain more data than a passive scan. The data obtained can be used to modify the prioritized list. In an embodiment in which a station can generate its own prioritized list (in addition to or instead of receiving the prioritized list from the prioritized network list provisioning engine 216 on the CSP 210, for example) the station will use historical data accumulated with scans, and additional historical and/or remotely obtained data could be provided from a server or other source.

In an example in which the stations 214 are serviced by the CSP 210 or other communication service provider, the CSP 210 can optimize capacity for the stations 214 as a group. Capacity for the stations 214 can be optimized for the stations as a group by the CSP 210 having information about the networks 208 and deciding a prioritized list for each of the stations 214 that results in the stations 214 choosing to associate with the networks 208 such that the stations 214 have, in the aggregate, greater performance. The CSP 210 can take into account network loading on the networks 208 when generating the prioritized lists provided by the prioritized network list provisioning engine 216 to the stations 214. In this way, the CSP 210 can determine which of the networks 208 have more available bandwidth, and can optionally determine what the loading of the networks 208 will be after the stations 214 make use of the prioritized lists. Advantageously, the CSP 210 can use the current network load to predict load on the networks 208 based upon data provided by the stations, historical data, and prioritized lists that have not yet been sent. The CSP 210 can also consider station-specific data, such as applications that are being used, QoS requirements, historical bandwidth consumption, a cost function, etc., when determining how to generate the prioritized lists.

The stations 214 can have a network optimization engine (not shown) in which an algorithm is implemented to optimize capacity. The network optimization engine can reorganize a prioritized list based upon device-specific parameters and/or user preferences.

Figure 3:
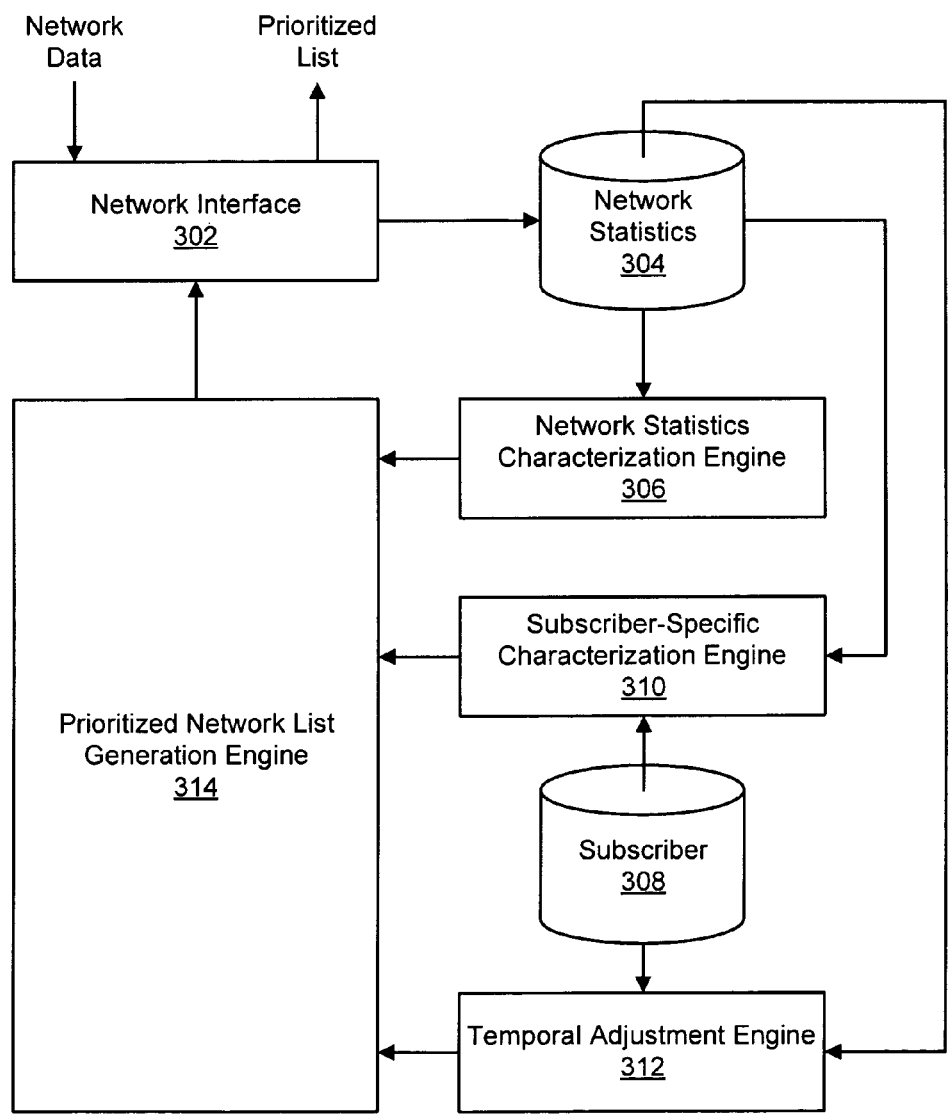
FIG. 3 depicts a diagram of an example of a system for generating temporally adjusted prioritized network lists.

FIG. 3 depicts a diagram of an example of a system 300 for generating temporally adjusted prioritized network lists. In the example of FIG. 3, the system 300 includes a network interface 302, a network statistics datastore 304, a network statistics characterization engine 306, a subscriber datastore 308, a subscriber-specific characterization engine 310, a temporal adjustment engine 312, and a prioritized network list generation engine 314.

The network interface 302 is intended to include an applicable known or convenient interface to a network. The network interface 302 can have a variety of implementations, including a network interface card (NIC), a modem, or some other technology that facilitates interconnection with a network.

The network statistics datastore 304, and other datastores described in this paper, can be implemented, for example, as software embodied in a physical computer-readable medium on a general-purpose or specific-purpose machine, in firmware, in hardware, in a combination thereof, or in an applicable known or convenient device or system. Datastores in this paper are intended to include any organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

The network statistics datastore 304 can store network statistics data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

The network statistics datastore 304 can store data structures having data that is received or derived from stations on a network. The amount of data that a station can obtain and provide to the system 300 will depend upon the capabilities of the station, the type of network, device-specific settings (e.g., active scan settings), and other factors. Data can include such values as RSSI, channel strength, basic radio bit rate, loading, network speed, network throughput, speed jitter, throughput jitter, network delay, delay jitter, network availability, successful network access grant, delay in access grant, location, to name several. The network statistics datastore 304 can store data from a plurality of stations to create a store of remotely obtained data. Over time, the network statistics datastore 304 can obtain a large store of historical data.

The network statistics characterization engine 306 can use network statistics to characterize networks. For example, the network statistics characterization engine 306 can, e.g., analyze location and RSSI for stations to determine a variation in performance as a function of position, analyze access grant data to determine an access grant likelihood, analyze number of stations associated to a network, applications in use at the stations, and the capacity of a network to determine available capacity for the network, or the like. Thus, the network statistics characterization engine 306 can take standard network measurements, combine the network measurements with historical network data and network data that is remotely obtained relative to a particular station, and transform the network statistics into a more useful form. Characterized network statistic data structures can be stored in the network statistics datastore 304 (an arrow indicating such storage is not shown in the example of FIG. 3 in order to avoid disrupting the illustrative flow).

Where the system 300 is on a private network managed by a service provider (e.g., a mobile service provider), subscribers will typically have an account. The subscriber datastore 308 can store account data structures (or subscriber data structures). Advantageously, the account data structures can include data that is useful for generating prioritized lists. For example, an account could include cost function parameters that are indicative of when a subscriber would wish to offload from one network to another. Such data can be used to customize a prioritized network list for a particular subscriber. As another example, an account could include performance or favored network preferences that enable prioritizing networks based upon subscriber preferences. As another example, the subscriber datastore 308 could include a motion trace useful to predict movement between coverage areas. It should be noted that some or all of the contents of the subscriber datastore 308 could instead be stored on a device, and a prioritized list could be customized based on the device-specific settings, movement (e.g., the motion trace), or the environment.

The subscriber-specific characterization engine 310 can use subscriber-specific data to modify network list priorities. For example, a subscriber can indicate what applications are used on a mobile device. The subscriber-specific characterization engine 310 can determine from the applications which networks are more desirable given the operational parameters of the application.

As another example, if a motion trace suggests that a subscriber is on a train because it is moving relatively fast, the subscriber-specific characterization engine 310 may strongly prioritize a cellular network over a shorter-range network (e.g., Wi-Fi). By "relatively fast," what is meant is that the subscriber is moving at a rate that suggests hand-off from one network to another will be required with relatively high probability due to the subscriber's motion. It is possible for a motion trace to show relatively high velocity, but relatively low risk of hand-off (e.g., if a subscriber is riding a carousel). Hand-off from one access point of a network to another access point of the same network is likely not as large a concern as hand-off from one network type (e.g., Wi-Fi) to another network type (e.g., cellular) or from two different networks of the same type (e.g., a first private Wi-Fi network and a second private Wi-Fi network). The motion trace itself can be considered a subscriber-specific characterization in the sense that the subscriber datastore 308 can receive location data from, e.g., a mobile device of the subscriber, and the subscriber-specific characterization engine 310 can determine velocity from the change in location over time to establish that a subscriber is moving relatively fast.

The temporal adjustment engine 312 can adjust network priorities based on, e.g., time of day. For example, if the networks statistics datastore 304 has historical data that shows certain networks have high loads at certain times of day, the temporal adjustment engine 312 can prioritize networks that have lower loads in the near future. The temporal adjustment engine 312 can also change priorities using data from the subscriber datastore 308. For example, if a subscriber indicates they have a preference for not switching networks once associated, the temporal adjustment engine 312 can use subscriber historical activity to determine a likely amount of time the subscriber will be connected to a network and network historical data to determine likely loads on various networks during that time, and prioritize networks such that the subscriber can be connected to a network that will meet minimal performance preferences for the duration of the connection.

To the extent the subscriber datastore 308 is on a client device, the temporal adjustment engine 312 could provide priorities based upon time, and the client device could customize the prioritized network list. In an alternative implementation, the temporal adjustment engine 312 is on the client device and the client device receives prioritized lists that are different at different times, then the temporal adjustment engine 312 customizes (or picks the appropriate) prioritized list based upon the current time.

The prioritized network list generation engine 314 generates a network list in accordance with the network statistics characterization engine 306 and, if applicable, the subscriber-specific characterization engine 310 and temporal adjustment engine 312. The prioritized network list can be provided to devices through the network interface 302.

Advantageously, the system 300 can characterize the statistics of available capacity for a network and determine how much if any reliable capacity is typically available on that network. This is accomplished by having devices report network data, e.g., how many devices are connected to the network, and prioritizes the network such that one or more devices will connect to or disconnect from the network based on an algorithm to optimize the (e.g., average, worst case, median, etc.) capacity offered to a group of devices serviced by the system 300. The algorithm can take into account loading of one or more alternative networks before sending the prioritized network list or otherwise communicating with a device to connect to or disconnect from the network. The system 300 can thereby characterize statistics of available capacity and provide prioritized network lists with reliable capacity as a function of time to adjust an available capacity factor. This technique is applicable to one or more devices optimized in the aggregate.

Figure 4:
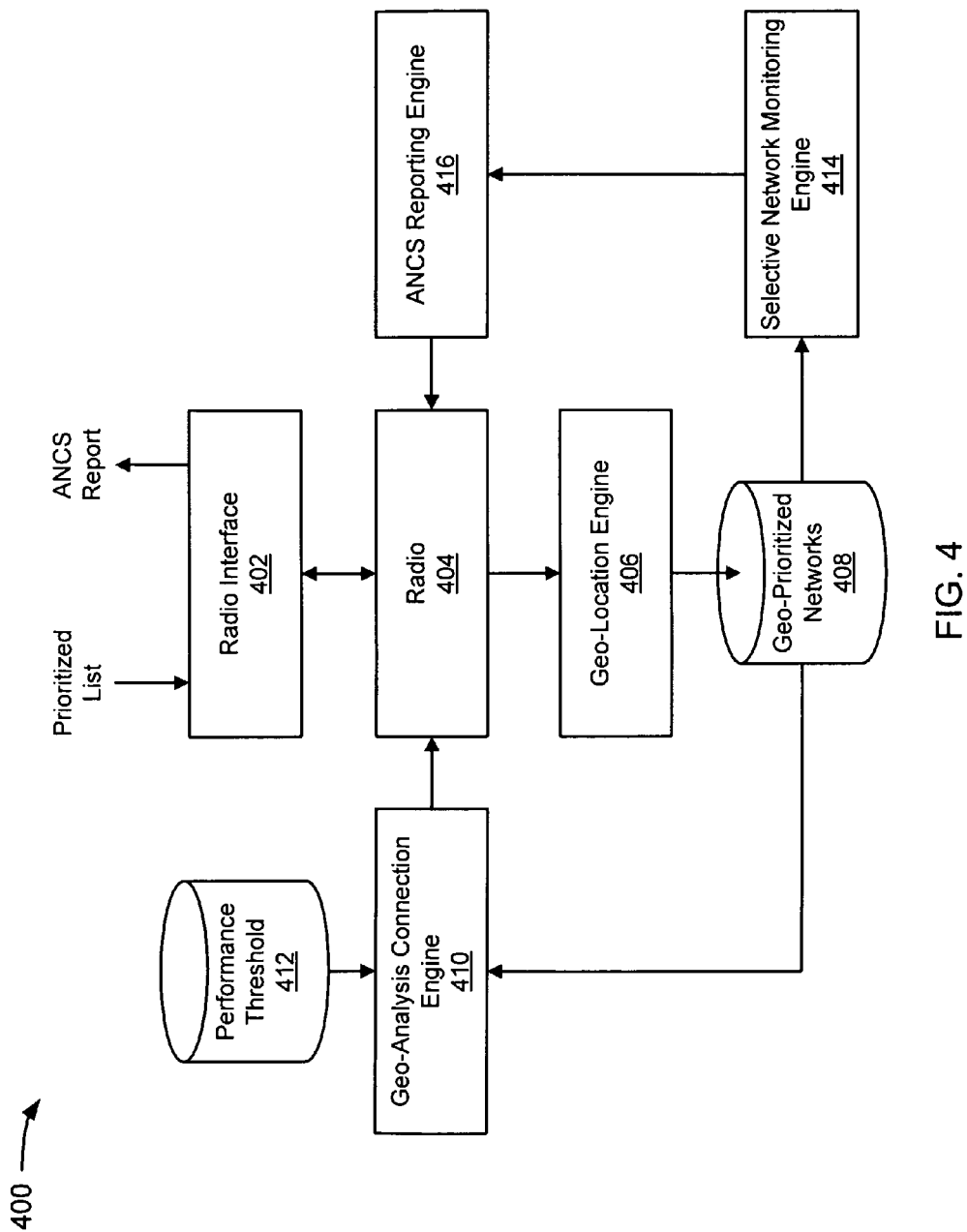
FIG. 4 depicts a diagram of an example of a system for monitoring performance of networks on a prioritized network list.

FIG. 4 depicts a diagram of an example of a system 400 for monitoring performance of prioritized network lists. In the example of FIG. 4, the system 400 includes a radio interface 402, a radio 404, a geo-location engine 406, a geo-prioritized networks datastore 408, a geo-analysis connection engine 410, a performance threshold datastore 412, a selective network monitoring engine 414, and an ANCS reporting engine 416.

In the example of FIG. 4, the radio interface 402 includes applicable known or convenient technology sufficient to enable a wireless device to use a radio to connect to a wireless network. Devices that use something other than a radio are theoretically possible; the term "radio interface" is used with the understanding that the communication device may or may not be limited to a specific subset of the electromagnetic (EM) spectrum, i.e., radio waves. The radio interface 402 can include multiple interfaces for use with multiple radios and/or different radio frequencies or wireless protocols.

In the example of FIG. 4, the radio interface 402 is coupled to a radio 404. The radio 404 can include multiple radios for use with different radio frequencies or wireless protocols. For illustrative simplicity, the radio 404 will generally be treated as if operating consistently over one channel (potentially with multiple subchannels). In an alternative, the radio 404 can send reports or scan on one frequency, and send/receive other communications on another frequency.

In the example of FIG. 4, the geo-location engine 406 receives a prioritized list and modifies the list using device location. The geo-location engine 406 can use location to determine what networks should be included on the network list and what priorities of the networks should be. In a specific implementation, the geo-location engine 406 can be used in conjunction with a server that sends a geo-prioritized list that the geo-location engine 406 customizes at the device. For example, the server could send a geo-prioritized list for a geographical area that the geo-location engine 406 can adjust or use in accordance with current device location and/or a motion trace. Geo-prioritization can be in accordance with a cost function, where parameters of the cost function vary depending upon location (e.g., network performance can vary as a function of position).

In an alternative, the geo-location engine 406 could be implemented on a server, and used to generate geo-prioritized network lists for provisioning to subscribers. Using known locations of devices, the server can, depending upon the implementation, send a geo-prioritized network list for a local geographical area near the device or for geographical areas that have historically been frequented by the device.

In the example of FIG. 4, the geo-prioritized networks datastore 408 includes network data structures that are organized by priority, where the determination of priority includes a consideration of device location. A prioritized list could be stored as data structures in the geo-prioritized networks datastore 408 initially, and the data structures transformed later in accordance with geo-location data, or the data structures could be generated with the relevant priority. In either case, when device location changes enough, the geo-priority will change, and the data structures can be transformed (or new data structures generated) to have the updated geo-priority.

In the example of FIG. 4, the geo-analysis connection engine 410 uses the geo-prioritized network list stored in the geo-prioritized networks datastore 408 to instruct the radio 404 to connect to a highest priority network that is available. Alternatively, the geo-analysis connection engine 410 could form a connection using the prioritized list as received from a server and use the geo-prioritized network list for subsequent connection determinations. As was previously noted, it is also possible that the geo-location engine 406 could be at least partially located at a server, and the prioritized list could include device location when prioritizing the network list.

As device location changes, performance of network can also change. The geo-analysis connection engine 410 can determine whether performance has dropped below a performance threshold using the performance threshold datastore 412. When performance drops below the performance threshold, the geo-analysis connection engine 410 can connect to a second network. The second network can be the next network on the geo-prioritized network list. It may be noted that the geo-location engine 406 can update the geo-prioritized networks datastore 408 so that network priorities change while a device is connected to a first network. So when performance drops below the performance threshold, the geo-analysis connection engine 410 can use the updated geo-prioritized network list to find a highest priority network that is available and instruct the radio 404 to connect to it. So the second network may or may not be the next highest priority network in the geo-prioritized list that was used when a connection to the first network was established.

Advantageously, the performance threshold setting can avoid frequent hopping between networks. Even if a second network has a higher geo-priority than a first network for which a device has a current connection, it may not be desirable to switch because of the risk of switching back and forth as performance fluctuates for the first and second (or other) networks. Thus, the performance threshold can be indicative of a performance that is "good enough" even if predicted performance of a second network exceeds the performance of the first network.

The performance threshold can be dynamically adjusted. While it is desirable to avoid frequent hopping between networks, a change in location can result in significantly higher performance on a second network. Even if the performance on the first network is "good enough," the predicted performance of the second network may be sufficiently superior that the desire to avoid frequent hopping is eclipsed by the potential improved performance of the second network. Thus, the performance threshold can be a function of current performance on a first network and a predicted performance of a second network in addition to or instead of a performance threshold network switching preference.

When the performance threshold takes into account the performance of a first network to which a device is connected and a performance of a second network, the performance parameters of the first network and the second network need not be the same. For example, performance of the second network could include an access grant reliability parameter and a predicted delay in access grant parameter, while no such parameters are used to characterize performance of the first network. Other parameters may or may not be considered for characterizing both networks (e.g., post-connection network performance parameters or economic performance parameters).

In the example of FIG. 4, the selective network monitoring engine 414 can monitor networks other than a first network to which a subscriber is connected. Monitoring can include passive scans, which entail listening for beacon frames (or equivalent transmissions) from a WAP. The information available from beacon frames can vary depending upon network-specific variables. Active scanning typically produces more network information, but consumes more resources (e.g., wireless bandwidth, battery power, etc.).

The selective network monitoring engine 414 can monitor networks that are on the geo-prioritized networks list. Not all networks are necessarily treated equally when determining which to monitor, which is why the selective network monitoring engine 414 is called "selective." For example, a prioritized list could indicate a preference for monitoring certain networks (not necessarily based upon the priority of the network). The selective monitoring of certain networks can be in order to limit the number of networks scanned by each of a plurality of devices that are relatively close to one another, to check on a network that has been flagged as a poor performer to see if performance has changed, to keep the device aware of relatively high priority networks in case performance of a current network dips below a performance threshold, to obtain additional information about a network, or the like.

The selective network monitoring engine 414 can work in coordination with the geo-analysis connection engine 410. For example, the selective monitoring can be of networks that are high on the geo-prioritized networks list in order to keep network priorities as up-to-date as possible. The selective network monitoring engine 414 can also ensure that a dynamic performance threshold is updated with the most current network data. Data from selective network monitoring can be used at the device or sent to a server and provided in the form of a prioritized list after processing at the server.

The ANCS reporting engine 416 generates reports from ANCS of the selective network monitoring engine 414. The ANCS reporting engine 416 provides the ANCS reports to the radio 404 for transmission through the radio interface 402 to a server. The server can ensure that future prioritized lists are relatively current and, assuming an indication is provided by the server rather than derived from rules at the device, that selective network scanning indicators enable the device to scan networks in coordination with other devices or at least without wastefully consuming resources by providing less useful data regarding networks compared to more useful data that the server could use to more effectively prepare prioritized network lists for subscribers.

Advantageously, the system 400 provides location data and ANCS reports to a server to enable the server to generate prioritized network lists using the location and ANCS reports for the device sending the ANCS report and other subscribers (regardless of whether the other subscribers also send ANCS reports). The CSP 210 of FIG. 2 could, for example, include such a server.

Advantageously, the system 400 can customize prioritized network lists using a device's current location. For example, the geo-location engine 406 can customize prioritized network lists for a large geographic area in accordance with a device's current location, a motion trace (e.g., predictor of future location), or knowledge regarding historical network connection preferences. Alternatively, the geo-location engine 406 can receive a prioritized network list for a local geographic area dependent on a device's current location and/or historical network connection preferences. Alternatively, the geo-location engine 406 can choose between multiple local geographic area network maps in accordance with a device's current location and/or historical network connection preferences.

Advantageously, the system 400 enables selective monitoring of networks on a prioritized network list to identify networks for which it is most optimal for a device to connect in a given geographic area. A device can apply implemented rules to determine an optimal network using a prioritized network list. The device can also selectively scan other networks to update the prioritized network list in accordance with what is discovered. This can benefit both the device and other subscribers.

Advantageously, the system 400 can reduce the likelihood of frequent jumping from one network to another as the network priority list changes or the performance on a given network fluctuates over time. The geo-analysis connection engine 410 can ensure a device remains connected to a network until performance drops below a minimum performance threshold.

Figure 5:
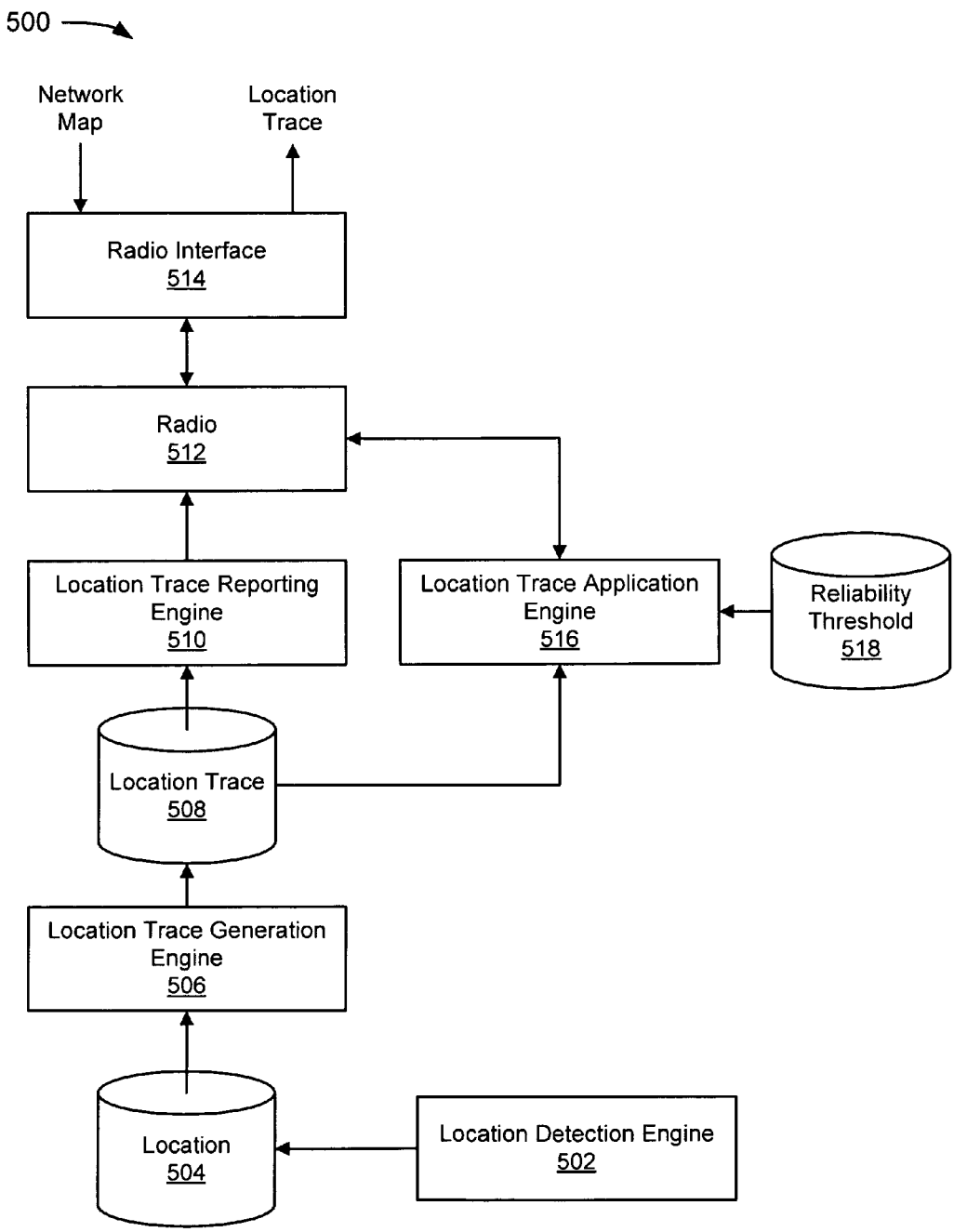
FIG. 5 depicts a diagram of an example of a system for using a motion trace to prioritize networks on a network map.

FIG. 5 depicts a diagram of an example of a system 500 for using a motion trace to prioritize networks on a network map. In the example of FIG. 5, the system 500 a location detection engine 502, a location datastore 504, a location trace generation engine 506, a location trace datastore 508, a location trace reporting engine 510, a radio 512, a radio interface 514, and a location trace application engine 516.

In the example of FIG. 5, the location detection engine 502 is capable of determining a current location of a device. Although in this paper the location of the device is treated as a known value, it should be understood that location detection is often an estimate of current location. For example, a GPS system is not always capable of pinpoint accuracy. As another example, three WAPs could detect three signals having three different signal strengths from the device and determine location based on the distance, e.g., RSSI seems to indicate, but this triangulation technique is typically fairly inaccurate. However, any applicable known or convenient location estimation technique, regardless of its accuracy, can be sufficient if it sufficiently accurate to enable application of techniques described in association with location detection in this paper.

In the example of FIG. 5, the location detection engine 502 stores the detected location in the location datastore 504. The data structures of the location datastore 504 can be as simple as coordinates in two-dimensional or three-dimensional space. It may be noted that while networks have ranges that extend into three-dimensional space, it may be useful to simplify to two-dimensional space (typically as an overlay over the ground or a floor of a building). More important than whether a z-axis component (altitude) is recorded is a timestamp for a given location. Thus, a minimalist location data structure will include an x-axis component (e.g., longitude), a y-axis component (e.g., latitude), and a timestamp, and a useful variant can include a z-axis component (e.g., altitude). The units of the axis components need not be the same. For example, the x- and y-axis components could be GPS coordinates and the x-axis component could be in feet (or meters) or a more abstract value, such as floors of a building.

In the example of FIG. 5, the location trace generation engine 506 can use historical location data to determine changes in location over time. By comparing the location associated with a first timestamp to a location associated with a second timestamp, it is possible to determine velocity as well as distance.

Velocity can be recorded in a vector data structure in the location trace datastore 508. As is true for datastores described in this paper in general, the location datastore 504 and the location trace datastore 508 can be implemented as the same datastore. For example, locations estimated by the location detection engine 502 could be stored as nodes and vectors calculated by the location trace generation engine 506 could be stored as edges between temporally adjacent nodes, in a single datastore. Alternatively, edges could be calculated on the fly such that only the nodes, with timestamps, are stored in non-volatile memory.

The location trace reporting engine 510 can generate a report for a server. The contents of the report can vary somewhat based upon implementation, but a minimal report will include at least the current location of the device and a timestamp. The server may or may not be capable of generating a location trace, which means in an alternative at least a portion of the location trace generation engine 506 can be located at a server.

The radio 512 can send the location trace report through the radio interface 514 to a server. In response to receiving the location trace report, the server can provide a network map. In an alternative, the server need not receive the location trace in order to provide the network map; so the network map is not provided in response to receiving the location trace. The network map can be generated using ANCS reports from the device or from other devices. The network map may or may not be customized at the server using the location trace of the device.

The network map is a multi-dimensional map of networks to which the device can connect. The dimensions can include two or three spatial dimensions, time, network continuity, station velocity, device-specific history, or other parameters. Advantageously, the network map can be combined with device-specific characteristics to enable intelligent and reliable switching to or from wireless networks represented in the network map.

In the example of FIG. 5, the location trace application engine 516 can use the network map and location traces to choose a network for connection from the network map. Specifically, the location trace application engine 516 can use the motion trace to predict movement into or out of network service areas, and select networks that are appropriate for the predicted movement. Further processing of location traces beyond a determination of velocity can be useful. For example, high velocity followed by a short period of rest can be indicative of travel in a car, followed by stopping at a stoplight. In such a case, it may be desirable to avoid offloading even while the subscriber is stationary. As another example, a connection history could be used to show that some locations are typically passed through fairly quickly (e.g., a subscriber might walk to work through certain areas, making certain networks unappealing targets for offloading due to the likelihood that the subscriber will continue through the network relatively soon).

In a specific implementation, the network map can include zones of reliable coverage, which may be contiguous or disjoint. Thus, the location trace application engine 516 can use a network map of reliable networks and the location (or location trace) of the device to remove networks that the device is likely to move in and out of coverage faster than a reliability threshold. The reliability threshold datastore 518 can store a data structure can include subscriber or service provider preferences for how quickly after a pause or slow movement to offload to another network. If the location trace velocity exceeds the reliability threshold, the device will not offload to certain networks (e.g., shorter-range networks).

As was mentioned previously, the location trace application engine 516 can make use of other information, such as connection history for a subscriber, activity that is indicative of being in a car or on public transportation, etc. to use a constructive velocity in the determination. Thus, even if the actual velocity of a subscriber is zero (e.g., when the subscriber is at a stop sign), the constructive velocity can have a higher value representative of the predicted future velocity. Constructive velocity can also be "net velocity" found by adding vectors over a period of time such that movement back- and forth (e.g., if a subscriber is pacing). That is absolute velocity, or speed, of a subscriber over a relatively short period of time may not be as significant as the net velocity for the purpose of comparison to the reliability threshold.

When the location trace is applied to the network map to find a highest priority network to which the device can connect, the radio 512 can be instructed to authenticate and associate with the chosen network. Thus, offloading from one network to another can be achieved using a location trace of the device and a multi-dimensional network map.

Figure 6:
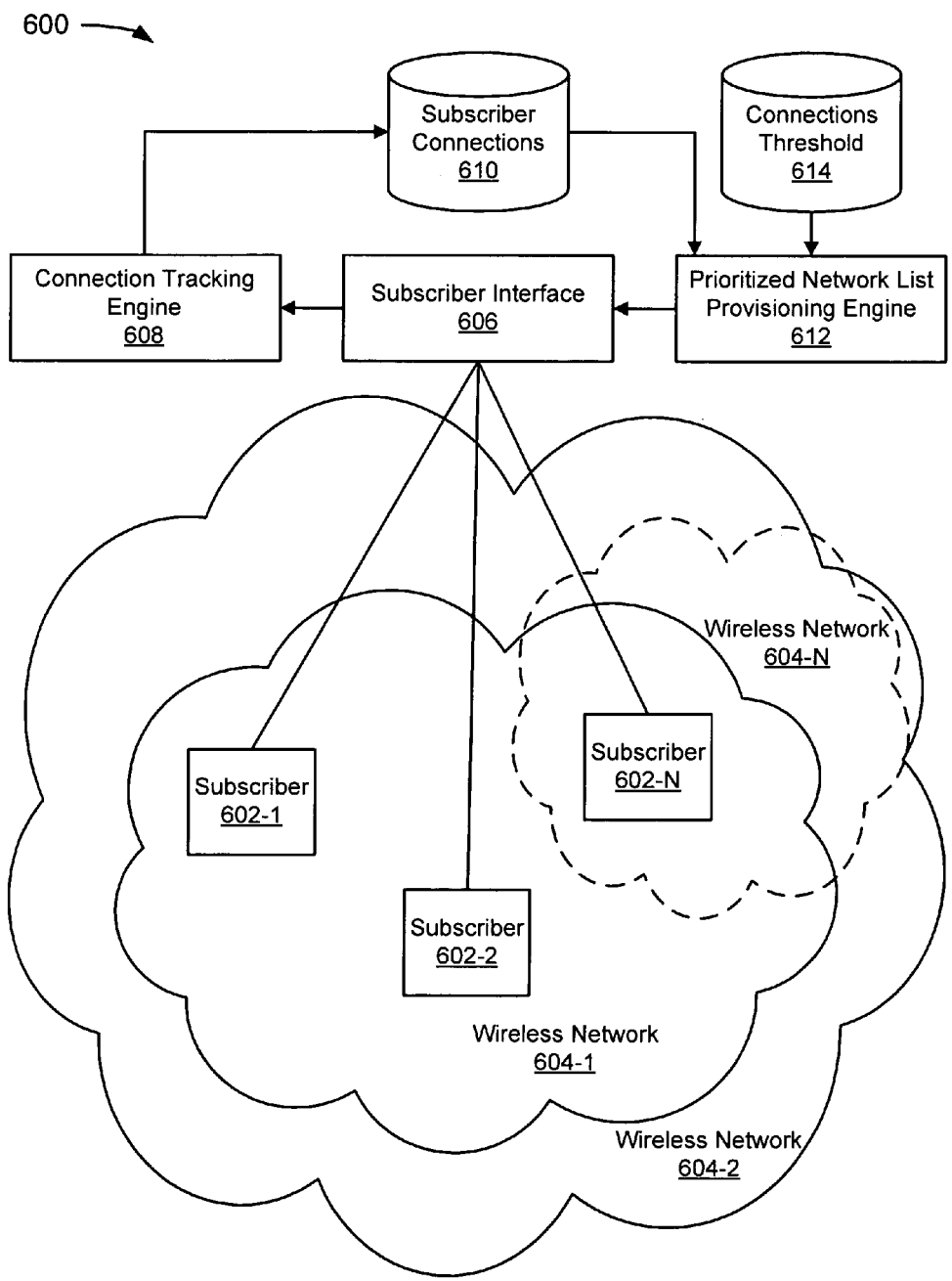
FIG. 6 depicts a diagram of an example of a system for using knowledge of subscriber network connections to prioritize network lists for subscribers.

FIG. 6 depicts a diagram of an example of a system 600 for using knowledge of subscriber network connections to prioritize network lists for subscribers. In the example of FIG. 6, the system 600 includes subscribers 602-1 to 602-N (collectively, subscribers 602), wireless networks 604-1 to 604-N (collectively, wireless networks 604), a subscriber interface 606, a connection tracking engine 608, a subscriber connections datastore 610, and a prioritized network list provisioning engine 612.

In the example of FIG. 6, the subscribers 602 can include stations that are capable of connecting to wireless networks. Depending upon the context, a subscriber can refer to a device or a person using the device. It is occasionally expedient for illustrative purposes to refer to subscriber data, which can include data about the user of the device, and the existence of a subscriber record is not necessarily indicative of the existence of a device. However, the techniques described in this paper are generally applicable to a subscriber who can connect to a wireless network. Thus, the subscriber will, at least as used in the description of operation, always include a device.

In the example of FIG. 6, the wireless networks 604 can include a variety of different types of networks. For example, the wireless network 604-1 could be a Wi-Fi network and the wireless network 604-2 could be a 3G (cellular) network.

In the example of FIG. 6, the subscriber interface 606 is assumed to be on a server. It should be noted that details regarding how the subscribers 602 connect to the subscriber interface 606 are omitted. For example, the connection between the subscribers 602 can be through intervening networks including the Internet and/or a PSTN. In order for the subscribers 602 to connect to one of the wireless networks 604, the subscribers 602 may also have to connect through a WAP or base station. In an alternative, the subscriber interface 606 could be on a peer device (e.g., a station in an IBSS).

In the example of FIG. 6, the connection tracking engine 608 can receive data from the subscribers 602. The data can include ANCS reports and authentication data, but for the purpose of this example, the data includes data sufficient to identify the wireless networks 604 to which the subscribers 602 are connected. For example, subscribers 602-1 and 602-2 may indicate that they are connected to the wireless network 604-1, a Wi-Fi network in this example. Some of the subscribers 602 may not be connected with any of the wireless networks 604 at a given point in time, but are nevertheless known to the server due to authentication attempts, wireless transmissions, a wired connection, or for other applicable reasons.

In the example of FIG. 6, the subscriber connections datastore 610 stores a data structure that includes data sufficient to identify the wireless networks 604 with which the subscribers 602 are connected. The connection tracking engine 608 can modify the relevant data structure when one of the subscribers 602 disconnects from or connects to one of the wireless networks 604. The data structure may or may not also include data associated with networks for which the subscribers are within range, though this information could also be derived from knowledge of a subscriber's location and a network map.

In the example of FIG. 6, the prioritized network list provisioning engine 612 can use data from the subscriber connections datastore 610 to determine, for example, how many of the subscribers 602 are connected to a given network, such as the wireless network 604-1. When generating a prioritized network list the prioritized network list provisioning engine 612 can use this information to steer subscribers away from wireless networks that have a relatively large number of connections and/or toward wireless networks that have a relatively small number of connections. A technique of a similar type is often refereed as network load balancing.

For example, assume subscribers 602-1 to 602-2 are connected to the wireless network 604-1 (a Wi-Fi network in this example) and the subscriber 602-N can be offloaded to the wireless network 604-1 from the wireless network 604-2 (a cellular network in this example). The prioritized network list provisioning engine 612 can use the knowledge of the number of devices 602-1 to 602-2 to prioritize the wireless network 604-1 in a prioritized network list that is to be provided to the subscriber 602-N. For the purposes of this example, the subscriber 602-N is in the service area of each of the wireless networks 604; so the prioritized network list can potentially include any or all of the wireless networks 604. If the prioritized network list provisioning engine 612 determines that the number of devices connected to the wireless network 604-1 exceeds an optimal number of connections threshold, the wireless network 604-1 can have a reduced priority in the prioritized list that is provided to the subscriber 602-N (or the wireless network 604-1 could be omitted from the prioritized list). In this way, the server can effectively advise devices contemplating a connection to a first network based upon the number of devices connected to the first network.

In the example of FIG. 6, the connections threshold 614 includes a data structure indicative of the number of connections that are acceptable. The number of connections that are acceptable may or may not vary by network. For example, some networks may be capable of supporting a larger number of connections. Also, some networks might be more predictably impacted by subscriber connections (e.g., a network that services a relatively large number of subscribers can improve predictability for a server that only receives connection information for the subscribers and not for other wireless devices on the network), making connection data more useful to the prioritized network list provisioning engine 612 when weighting the various factors used to determine priority for networks.

Figure 7:
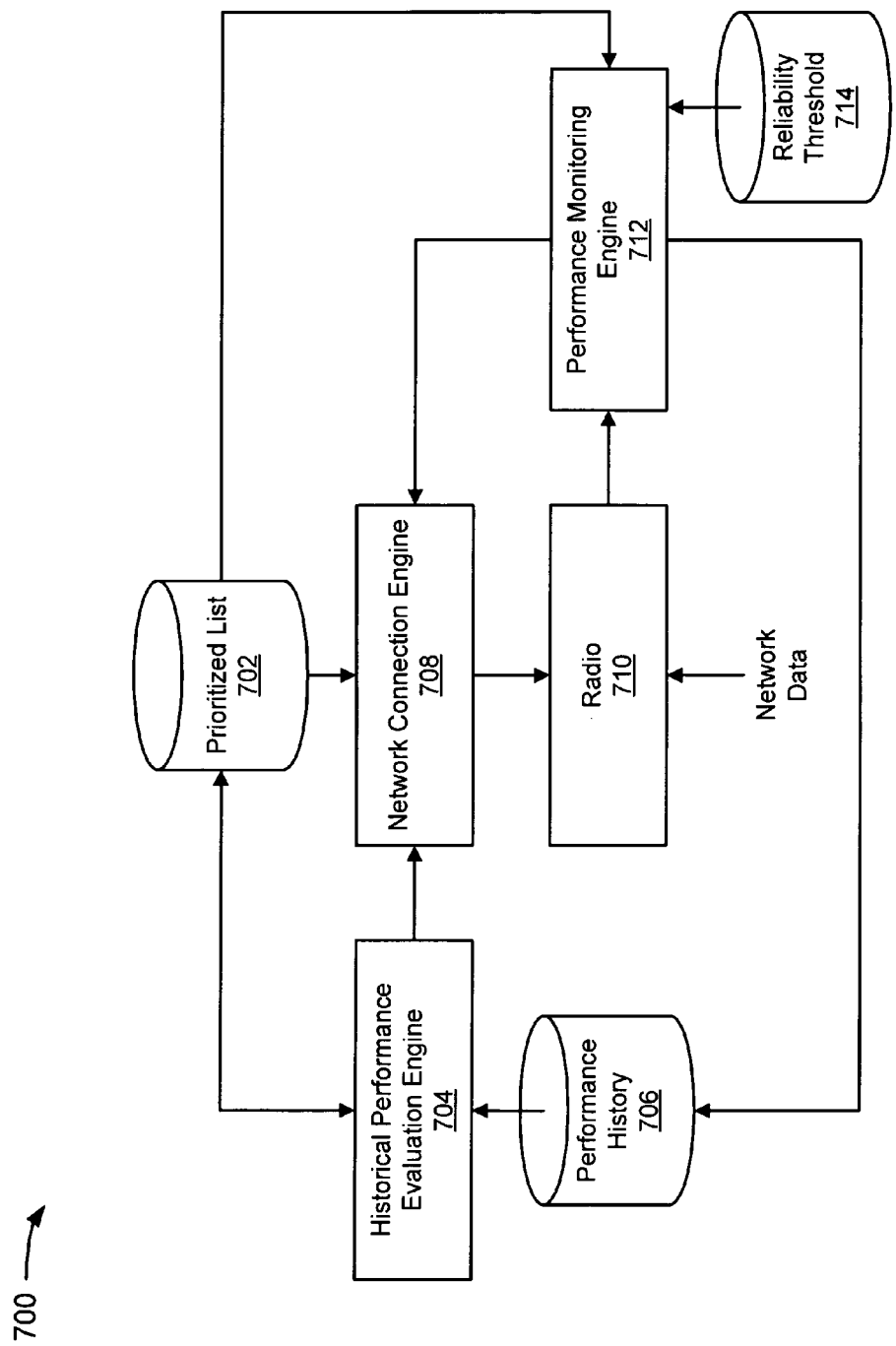
FIG. 7 depicts a diagram of an example of a system for using performance history to customize, a prioritized network list.

FIG. 7 depicts a diagram of an example of a system 700 for using performance history to customize a prioritized network list. In the example of FIG. 7, the system 700 includes a prioritized list datastore 702, a historical performance evaluation engine 704, a performance history engine 706, a network connection engine 708, a radio 710, a performance monitoring engine 712, and a reliability threshold datastore 714.

In the example of FIG. 7, the prioritized list datastore 702 includes a prioritized network data structures. For the purposes of this example, the prioritized list datastore 702 is treated as including data structures with data sufficient to identify networks having service areas in which a device having the system 700 at least partially implemented is located and the priority of the networks. Of course, an actual implementation of the prioritized list datastore 702 could include additional data. The prioritized list datastore 702 can be populated by a server that sends a prioritized network list (not shown), the prioritized list could be generated at the device, or the prioritized list could be obtained in some other manner.

In the example of FIG. 7, the historical performance evaluation engine 704 can customize the prioritized list in the prioritized list datastore 702. In this way, in addition to using a prioritized list that has been prioritized based on reliability, location, time of day, or other factors that are described elsewhere in this paper, the device is capable of fine-tuning the prioritized list using on-device data.

In the example of FIG. 7, the performance history datastore 706 includes a data structure that is instructive regarding past performance for a given network. To the extent a network data structure exists in both the prioritized list datastore 702 and the performance history datastore 706, the historical performance evaluation engine 704 can compare the priority of the network to an actual performance history. Other networks in the prioritized list datastore 702 and the performance history datastore 706 can be similarly compared. Depending upon the implementation, the prioritized list datastore 702 can be updated with a customized prioritized list that adjusts networks in the prioritized list based upon past performance. It is not necessarily the case that a network having superior network performance will have the highest priority (e.g., superior economic performance could be more important), and depending on the implementation, the subscriber may be able to adjust performance preferences as it relates to changing prioritization of networks.

In the example of FIG. 7, the network connection engine 708 can use the (now) customized prioritized list to select a network. The rules used to make the selection can be as simple as choosing the highest priority network from the customized prioritized network list. However, the network connection engine 708 could also have, e.g., an offload priority threshold that must be met in order to offload to, e.g., a Wi-Fi network from a cellular network. In other words, a cellular network could be a default and other networks would have to have e.g., a performance advantage sufficient to merit offloading, regardless of prioritization. The network connection engine 708 could also be configured to connect to the highest priority network of the prioritized network list (prior to customization) and only use the customized prioritized list after some performance monitoring.

In the example of FIG. 7, the radio 710 is instructed to connect to a network that is selected by the network connection engine. Over time, the radio 710 will receive at least some network data (e.g., from packets received over the wireless medium) that can be used to monitor performance on the selected network. The radio 710 can also be instructed to scan other networks, as is described elsewhere in this paper, and the data obtained can be used to monitor performance on the other networks.

In the example of FIG. 7, the performance monitoring engine 712 at least monitors performance on the selected network, and may or may not also monitor performance on other networks. The data obtained can be stored in the performance history datastore 706 and used by the historical performance evaluation engine 704 to customize the prioritized list. The historical performance evaluation engine 704 and the performance monitoring engine 712 can operate in parallel or in some other fashion.

In the example of FIG. 7, the reliability threshold datastore 714 includes a data structure indicative of when the performance monitoring engine 712 will trigger the network connection engine 708 to switch networks. When the performance monitoring engine 712 determines that a network is, for example, sufficiently reliable, the network connection engine 708 can offload from, e.g., a cellular network, to, e.g., a sufficiently reliable Wi-Fi network. What is meant by "sufficiently reliable" is that a reliability threshold is established based upon user preferences for reliability, network configurations, or other factors that, when met, are indicative of sufficient reliability for an offload target. The reliability threshold is described elsewhere in this paper.

Advantageously, the system 700 enables a device to perform a network performance evaluation before deciding to connect to a network. The system 700 can then offload from a first network to a sufficiently reliable second network. The device can then continue to evaluate performance and decide whether to switch to another network based on performance.

Figure 8:
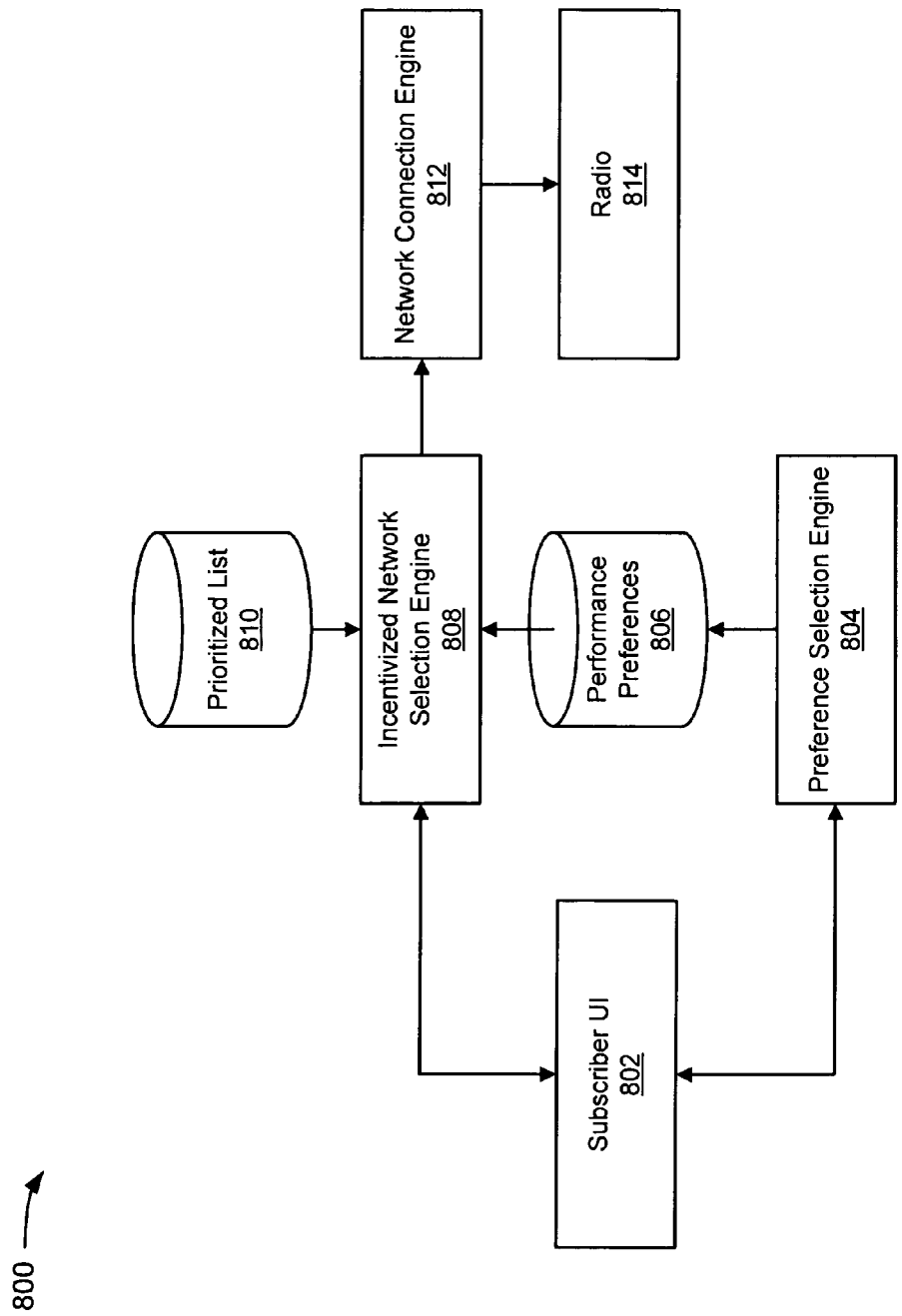
FIG. 8 depicts a diagram of an example of a system for selecting network connections based on network prioritization.

FIG. 8 depicts a diagram of an example of a system 800 for selecting network connections based on network prioritization. In the example of FIG. 8, the system 800 includes a subscriber user interface (UI) 802, a preference selection engine 804, a performance preferences datastore 806, an incentivized network selection engine 808, a prioritized list 810, a network connection engine 812, and a radio 814.

The subscriber UI 802 enables a user to view information about networks, preferences, and incentives, and to input data for use by the device. As such, the UI is presumed to include a display device (with drivers, if applicable) and an input device (with drivers, if applicable). By way of example but not limitation, the subscriber UI 802 could include a touchscreen input/output (I/O) device, a liquid crystal display (LCD) and keypad, or some other applicable known or convenient combination or collection of I/O device(s).

The preference selection engine 804 displays options on the subscriber UI. The options can include, for example, rules that dictate when to switch to or from networks or network types. For example, the user could define reliability, congestion state, QoS, performance, or some other parameter value. The user can also define incentive states. These settings can be in association with a specific network (e.g., a subscriber may have a high preference for offloading to home or office Wi-Fi networks, which can be explicitly identified) or in association with a network type (e.g., a subscriber may have differing preferences for offloading to an 802.11a network or an 802.11b/g/n network).

The performance preferences datastore 806 stores data structures indicative of the performance and/or incentive settings selected at the preference selection engine 804. In a specific implementation, a user can update preferences at any time by, for example, triggering the preference selection engine 804 with a menu selection. Performance preferences can also be dynamic settings that can change in accordance with operational changes. For example, preferences may be different when a device has a full battery relative to when the device is running out of power. Thus, the preferences can by used in conjunction with or stored as rules for controlling operation of the device, specifically in this example, network connection selections by the device.

The incentivized network selection engine 808 uses a prioritized network list, which can be stored in the prioritized list datastore 810, and preferences and/or rules in the performance preferences datastore 806 to select a network and prompt the network connection engine 812 to control the radio 814 to connect to the selected network. In the example of FIG. 8, the subscriber can be provided with options that are displayed at the subscriber UI 802 and the subscriber can input data associated with those options. The amount of information provided to the subscriber can vary with implementation, but can include a list of all available networks, all available reliable networks, one or more aspects of network performance for displayed networks, or the like.

Figure 9:
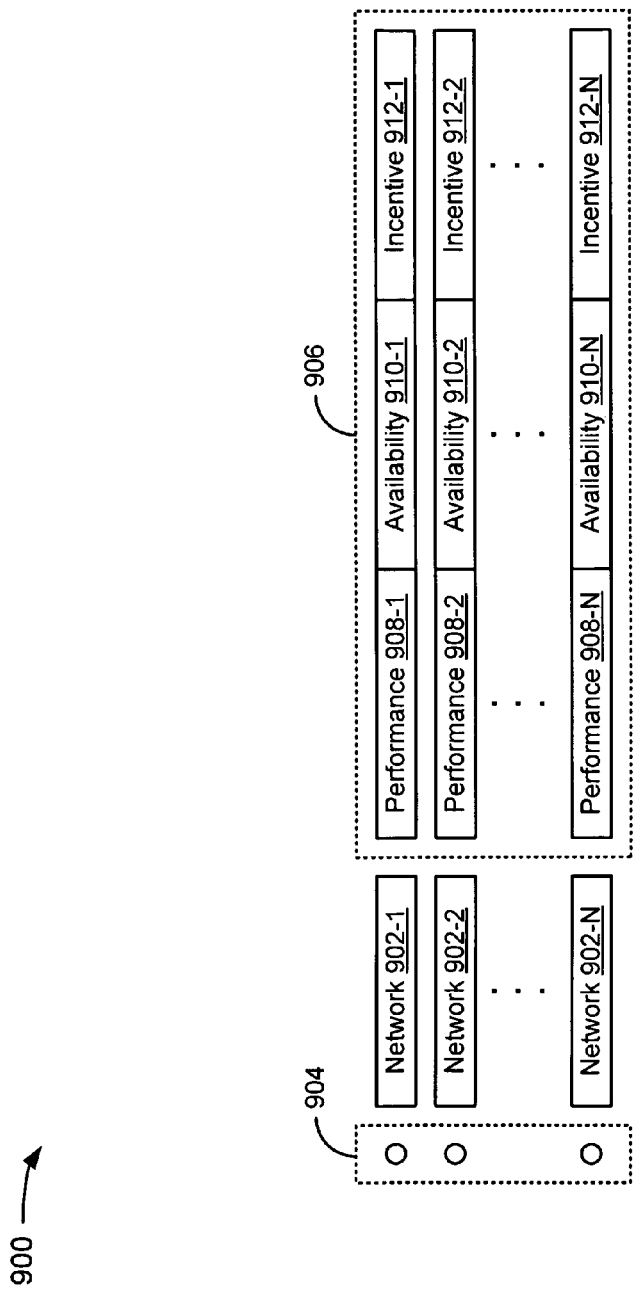
FIG. 9 depicts a conceptual display associated with incentivized network selection.

FIG. 9 depicts a conceptual display 900 associated with incentivized network selection. The display 900 includes a list of prioritized networks 902-1 to 902-N (collectively, prioritized network list 902), radio buttons 904, and state indicators 906. The prioritized network list 902 may or may not include all available networks, depending upon implementation- or configuration-specific parameters. For example, the subscriber may or may not be able to limit the list only to networks that meet certain performance or incentive specifications, or a service provider may or may not have a similar ability to prune the list of available networks. In the example of FIG. 9, the prioritized network list 902 is presumed to be ordered by priority, but a priority indicator other than order could be used instead (e.g., priority could be indicated by a number in a column, text or background color, etc.).

In the example of FIG. 9, the radio buttons 904 are intended to illustrate a network selection mechanism. An applicable known or convenient mechanism for selecting one of the networks of the prioritized network list 902 could be used instead (e.g., the text of the prioritized network list 902 could be selectable such that if a user "clicked" on a network, that network would be selected). It should be noted that in a specific implementation the choice of network can be made by the device based upon a set of rules decided upon by a subscriber regarding when to connect to a network or switch to a new network.

In the example of FIG. 9, the state indicators 906 are intended to illustrate information that could be provided in association with a prioritized network list display. In the example of FIG. 9, the state indicators 906 include a column of performances 908-1 to 908-N (collectively, performance states 908), a column of availabilities 910-1 to 910-N (collectively, network availability states 910), and a column of incentives 912-1 to 912-N (collectively, incentive states 912). The state indicators 906 need not be displayed in a columnar or tabular form (e.g., data could be displayed by hovering over a network in the prioritized network list 902). The data can also be represented by color-coding (e.g., networks in the prioritized network list 902 could be displayed with red text if a corresponding congestion state of the network is high and green text if a corresponding congestion state of the network is low), or using some other applicable known or convenient technique to convey information about the state of a network.

As was mentioned elsewhere in this paper, performance can have many different meanings (e.g., network performance, economic performance, access grant performance, etc.). Thus, although there is one column of performance states 908, there could be several columns to indicate state or estimates for different types of performance. Within each type of performance, there may be additional subcategorizations (e.g., network performance can be measured in more than one way, including throughput, QoS, congestion, etc.) Performance can be summarized for a subscriber and presented as a single value (e.g., a number that is indicative of the relative performance of the network) or more explicit data can be provided (e.g., the basic radio bit rate of the network).

The network availability states 910 are related to performance, but are represented in a separate column due to some distinctions. Performance can be indicative of what can be expected if a connection is established with the corresponding network. Availability can be indicative of the likelihood with which a connection can be established. Reliability (not shown) can also be distinguished because it is indicative of the likelihood that performance will be consistent or a connection can be maintained over time (e.g., in consideration of a motion trace or zone of reliability based on time of day), which is somewhat different from both performance and availability. Reliability can be obviated as an indicator in an implementation in which only reliable networks are in the prioritized network list 902.

The incentive states 912 can indicate to a subscriber an "incentive offer" that may entice the subscriber to choose one network over another, regardless of prioritization.

Figure 10:
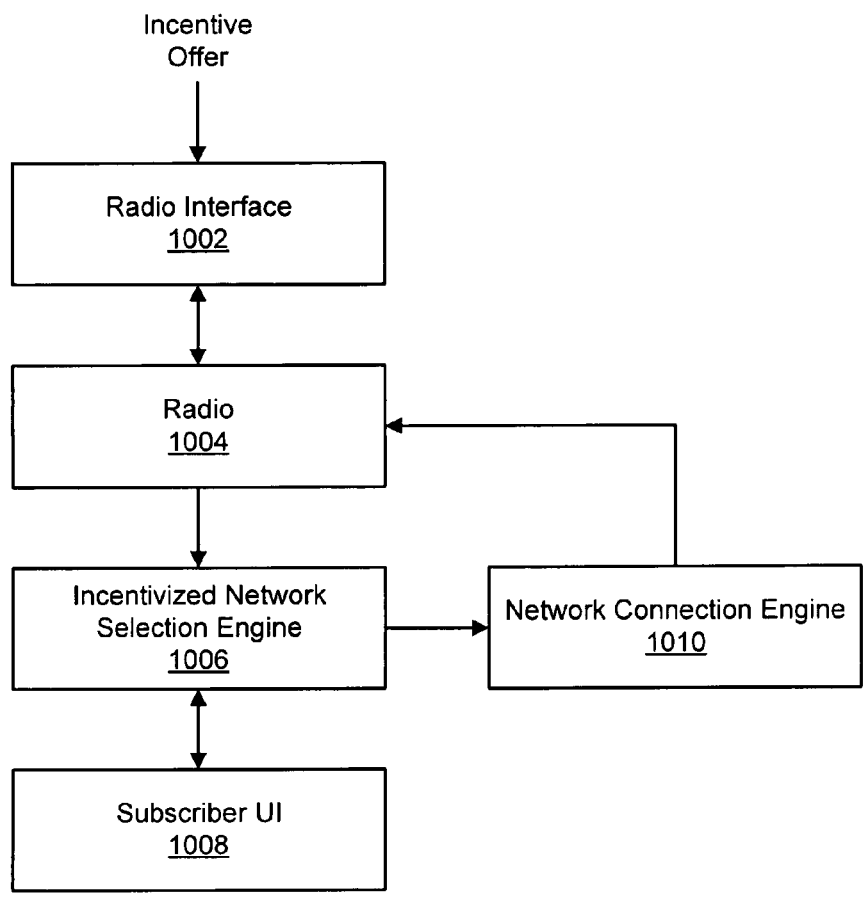
FIG. 10 depicts a diagram of an example of a system for offering incentives to a subscriber to connect to a network.

FIG. 10 depicts a diagram of an example of a system 1000 for offering incentives to a subscriber to connect to a network. In the example of FIG. 10, the system 1000 includes a radio interface 1002, a radio 1004, an incentivized network selection engine 1006, a subscriber UI 1008, and a network connection engine 1010.

The radio 1004 receives an incentive offer from or on behalf of a network through the radio interface 1002. The incentive offer can be provided in a number of different ways, such as in beacon frames, in frames identifiable as "incentive frames," in the body or header of a message, etc. It will typically be more valuable to send incentives to devices that are in a service area of a network, but depending upon implementation, incentives could be sent based upon predicted movement, probably in the immediate future, based upon connection history or a motion trace. In an alternative, the incentive offer is not received over the radio interface 1002, and is instead generated at the system 1000 in the incentivized network selection engine 1006 (or in an incentive offer generation engine, not shown).

The incentivized network selection engine 1006 enables a user to select the incentivized network through the subscriber UI 1008. The selection could also be made based upon rules or preferences that were previously input by the subscriber or a service provider. The network selection option could be presented as a pop-up window prompting a user to select whether to connect to the applicable network in exchange for the incentive offer. Alternatively, the incentive offer could trigger a display similar to the display depicted by way of example in FIG. 9. Regardless of the mechanism used to provide the choice to the subscriber, the network connection engine 1010 can connect to the network in accordance with the subscriber's choice.

Advantageously, a service provider can identify one or more networks (e.g., Wi-Fi networks) that the service provider would like a subscriber to offload to. In the case of a cellular provider, this can enable the service provider to reduce load on the cellular network. By incentivizing the offloading, the service provider can expect a larger number of subscribers to offload than if no incentive was offered. The incentive offer can explain advantages of switching networks to the subscriber, which can include, for example, traffic charges are free or less expensive, one or more service capabilities or activities are available on, e.g., Wi-Fi that are not available or have a lower performance on, e.g., cellular, the subscriber gets a discount or credit for switching, etc.

Figure 11:
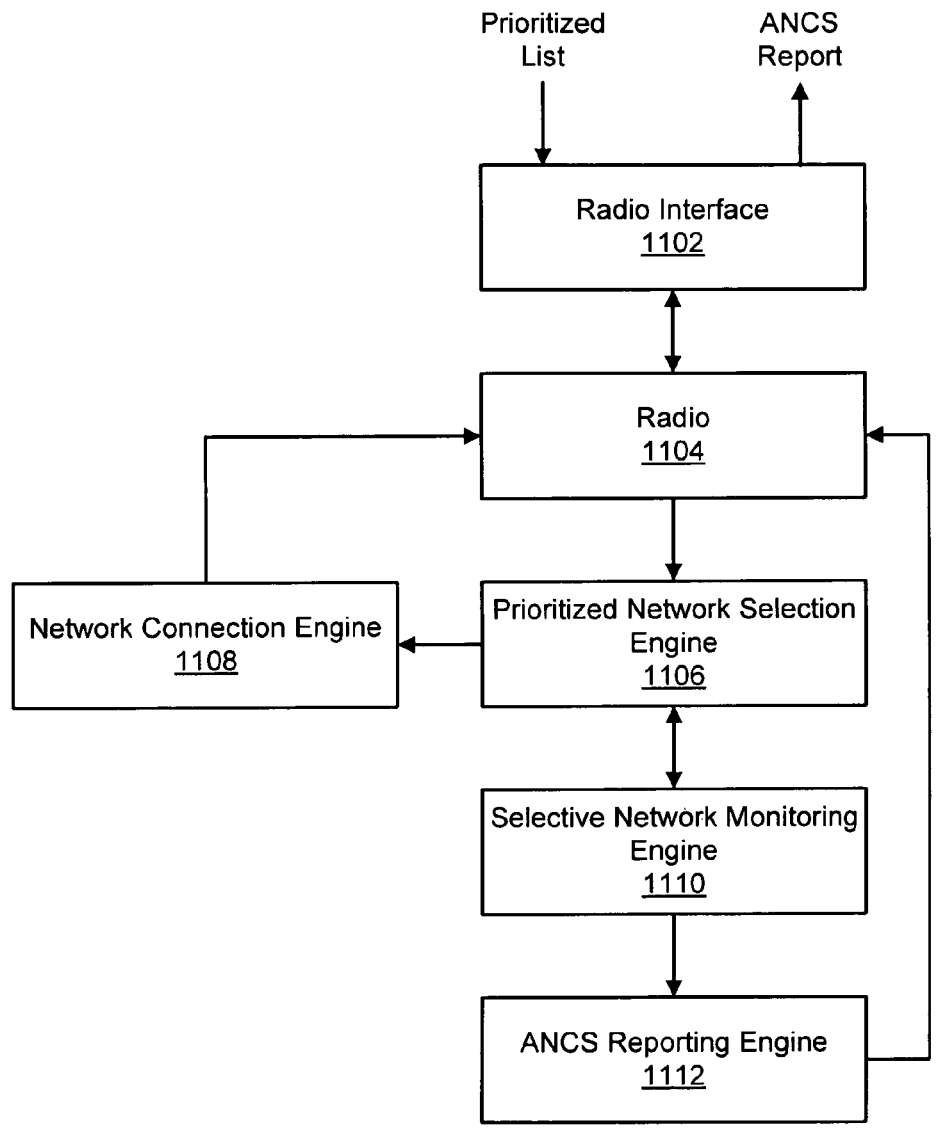
FIG. 11 depicts a diagram of an example of a system for repeatedly cycling through performance tests.

FIG. 11 depicts a diagram of an example of a system 1100 for repeatedly cycling through performance tests. In the example of FIG. 11, the system 1100 includes a radio interface 1102, a radio 1104, a prioritized network selection engine 1106, a network connection engine 1108, a selective network monitoring engine 1110, and an ANCS reporting engine 1112.

The radio 1104 receives a prioritized list from a server through the radio interface 1102. The prioritized list could alternatively be generated at least in part at a device one which the system 1100 is implemented.

The prioritized network selection engine 1106 selects a priority network in accordance with any techniques described previously in this paper. The network connection engine 1108 controls the radio 1104 to connect to the applicable network. The network connection engine 1108 can perform a scan to determine available networks before or after obtaining the prioritized list.

The selective network monitoring engine 1110 can cycle through one or more network performance tests for a subset of the available networks. The ANCS reporting engine 1112 can report the results of the tests to a server through the radio 1104 and radio interface 1102. The server could then perform a selection algorithm to select the network that best meets a network selection cost function and prioritize the network accordingly and provide another prioritized list. Alternatively, the device implementing the system 1100 can use the ANCS to customize the prioritized list. If the prioritized network selection engine 1106 selects a new network, the network connection engine 1108 can control the radio 1104 to connect to the selected network.

The selective network monitoring engine 1110 can repeatedly generate ANCS such that the prioritized list is continuously updated. In an alternative, the ANCS reports can be uploaded to a service controller function.

The embodiments illustrated in FIGS. 1-11 include components that can be selectively combined with one another. The cost functions of the various embodiments can include such parameters as signal strength, channel strength, basic radio bit rate, network speed, network throughput, speed jitter, throughput jitter, network delay, delay jitter, network availability, network reliability in successful network access grant percentage, delay in access grant, variation in performance as a function of performance, to name several.

Figure 12:
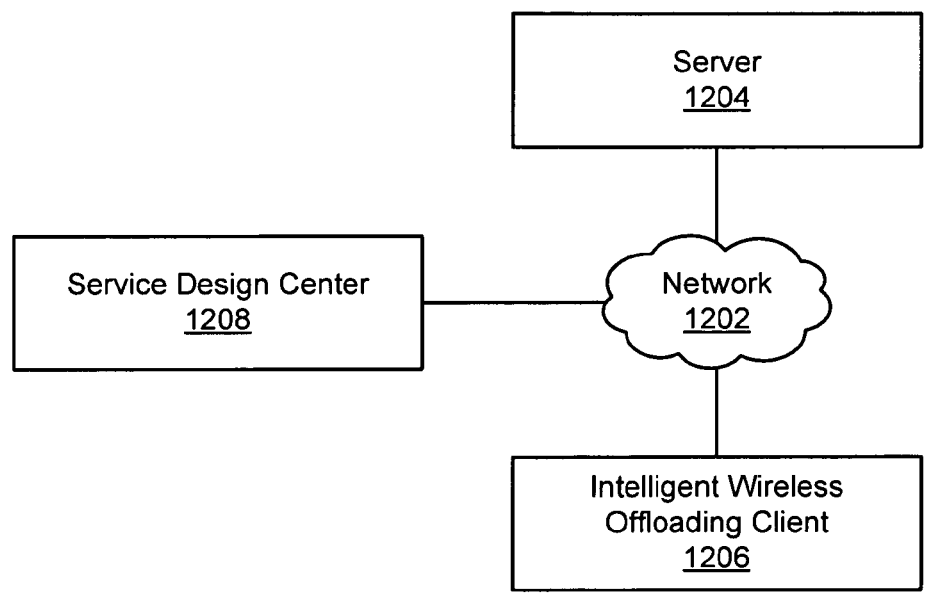
FIG. 12 depicts a diagram of an example of a system capable of wireless network offloading.

FIG. 12 depicts a diagram of an example of a system 1200 capable of wireless network offloading and of enabling carriers to establish the wireless network offloading service. In the example of FIG. 12, the system 1200 includes a network 1202, a server 1204, an intelligent wireless offloading client 1206, and a service design center (SDC) 1208. The network 1202 will include a wireless network to which the intelligent wireless offloading client 1206 is connected, but can otherwise include any applicable known or convenient network suitable for linking the components of the system 1200. The server 1204 can be a server of a CSP or other service provider. The intelligent wireless offloading client 1206 can include capabilities of a wireless device and can include an implementation of any subset of the techniques described in this paper.

In one embodiment, the SDC 1208 acts as the portal to enable the service providers to set service plan parameters for the wireless networking offloading functionality. The SDC 1208 can enable the service providers to set charging rates for each of the different wireless network connections, such as a charging rate for Wi-Fi networks, a charging rate for 3G networks, a charging rate for 4G networks, etc. Each service provider may set different charging rates for the same or different network connections. Each service provider may establish different service plans, each having different charging rates for the different wireless connections. For example, a service provider may have a service plan that benefits the highly mobile user, charging less for cell connections. A service provider may have a service plan that benefits those who anticipate reduced usage of cell connections.

In one embodiment, the SDC 1208 acts as the portal to enable the service providers to set notification parameters. For example, each service provider can set different notifications to motivate users to switch between wireless connections. These notifications and incentives can be temporal, geo-specific, service plan specific, etc.

In one embodiment, the SDC 1208 acts as the portal to enable the service providers to set access parameters. For example, each service provider can enable the various devices to access only a subset of available network connections, to offload to only certain network connections, etc.

The SDC 1208 further can provide functionality that may not be provided by the server 1204 or the intelligent wireless offloading client 1206. For example, the SDC 1208 can load algorithms for use at the client or server, set periodicity of scans by the client, set matrices, establish geographic boundaries of networks, set periodicity of reporting, etc.

Examples of the SDC 1208 can be found in the following related published applications, which are hereby incorporated by reference: U.S. publication No. 2010/0188975, filed Mar. 2, 2009, entitled "Verifiable Device Assisted Service Policy Implementation," U.S. publication No. 2010/0192170, filed Mar. 2, 2009, entitled "Device Assisted Service Profile Management with User Preference, Adaptive Policy, Network Neutrality, and User Privacy," U.S. publication No. 2010/0191612, filed Mar. 2, 2009, entitled "Verifiable Device Assisted Service Usage Monitoring with Reporting, Synchronization, and Notification," U.S. publication No. 2010/0191576, filed Mar. 2, 2009, entitled "Verifiable Device Assisted Service Usage Billing with Integrated Accounting, Mediation Accounting, and Multi-Account," U.S. publication No. 2010/0188991, filed Mar. 2, 2009, entitled "Network Based Service Policy Implementation with Network Neutrality and User Privacy," U.S. publication No. 2010/0188990, filed Mar. 2, 2009, entitled "Network Based Service Profile Management with User Preference, Adaptive Policy, Network Neutrality and User Privacy," U.S. publication No. 2010/0192212, filed Mar. 2, 2009, entitled "Automated Device Provisioning and Activation," U.S. publication No. 2010/0191604, filed Mar. 2, 2009, entitled "Device Assisted Ambient Services," U.S. publication No. 2010/0191575, filed Mar. 2, 2009, entitled "Network Based Ambient Services," U.S. publication No. 2010/6188993, filed Mar. 2, 2009, entitled "Network Tools for Analysis, Design, Testing, and Production of Services," U.S. publication No. 2010/0190470, filed Mar. 2, 2009, entitled "Roaming Services Network and Overlay Networks," U.S. publication No. 2010/0192120, filed Mar. 2, 2009, entitled "Open Development System for Access Service Providers," U.S. publication No. 2010/

0192207, filed Mar. 2, 2009, entitled "Virtual Service Provider Systems," U.S. publication No. 2010/0191613, filed Mar. 2, 2009, entitled "Open Transaction Central Billing System," U.S. publication No. 2010/0188995, filed Mar. 2, 2009, entitled "Verifiable and Accurate Service Usage Monitoring for Intermediate Networking Devices," U.S. publication No. 2010/0188994, filed Mar. 2, 2009, entitled "Verifiable Service Billing for Intermediate Networking Devices," U.S. publication No. 2010/0191846, filed Mar. 2, 2009, entitled "Verifiable Service Policy Implementation for Intermediate Networking Devices," U.S. publication No. 2010/0188992, filed Mar. 2, 2009, entitled "Service Profile Management with User Preference, Adaptive Policy, Network Neutrality and User Privacy for Intermediate Networking Devices," U.S. publication No. 2010/0191847, filed Mar. 2, 2009, entitled "Simplified Service Network Architecture," U.S. publication No. 2010/0197266, filed Jan. 27, 2010, entitled "Device Assisted CDR Creation, Aggregation, Mediation, and Billing," U.S. publication No. 2010/0198698, filed Jan. 27, 2010, entitled "Adaptive Ambient Services," U.S. publication No. 2010/0199325, filed Jan. 27, 2010, entitled "Security Techniques for Device Assisted Services," U.S. publication No. 2010/0197267, filed Jan. 27, 2010, entitled "Device Group Partitions and Settlement Platform," U.S. publication No. 2010/0198939, filed Jan. 27, 2010, entitled "Device Assisted Services Install," U.S. publication No. 2010/0195503, filed Jan. 27, 2010, entitled "Quality of Service for Device Assisted Services," and U.S. publication No. 2010/0197268, filed Jan. 28, 2010, entitled "Enhanced Roaming Services and Converged Carrier Networks with Device Assisted Services and a Proxy."

Figure 13:
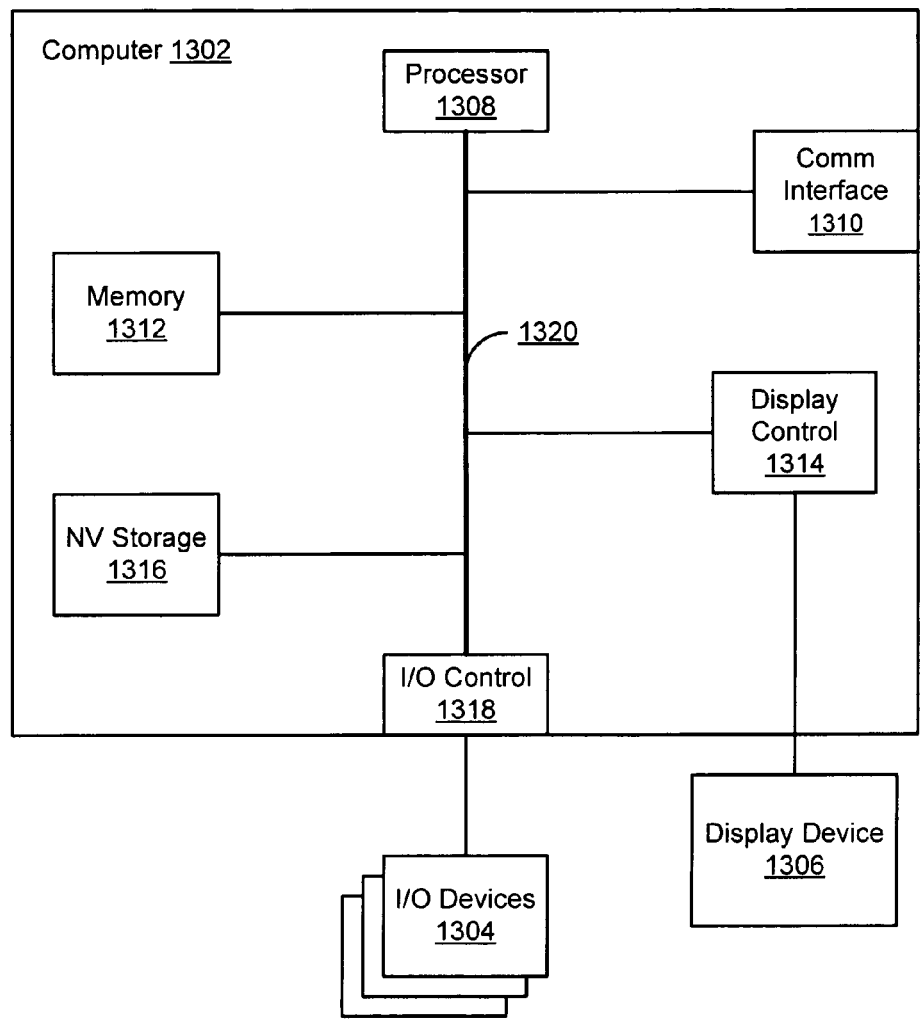
FIG. 13 depicts an example of a computer system on which techniques described in this paper can be implemented.

FIG. 13 depicts an example of a computer system 1300 on which techniques described in this paper can be implemented. The computer system 1300 may be a conventional computer system that can be used as a client computer system, such as a wireless client or a workstation, or a server computer system. The computer system 1300 includes a computer 1302, I/O devices 1304, and a display device 1306. The computer 1302 includes a processor 1308, a communications interface 1310, memory 1312, display controller 1314, non-volatile storage 1316, and I/O controller 1318. The computer 1302 may be coupled to or include the I/O devices 1304 and display device 1306.

The computer 1302 interfaces to external systems through the communications interface 1310, which may include a modem or network interface. It will be appreciated that the communications interface 1310 can be considered to be part of the computer system 1300 or a part of the computer 1302. The communications interface 1310 can be an analog modem, ISDN modem, cable modem, token ring interface, satellite transmission interface (e.g. "direct PC"), or other interfaces for coupling a computer system to other computer systems.

The processor 1308 may be, for example, a conventional microprocessor such as an Intel Pentium microprocessor or Motorola power PC microprocessor. The memory 1312 is coupled to the processor 1308 by a bus 1370. The memory 1312 can be Dynamic Random Access Memory (DRAM) and can also include Static RAM (SRAM). The bus 1370 couples the processor 1308 to the memory 1312, also to the non-volatile storage 1316, to the display controller 1314, and to the I/O controller 1318.

The I/O devices 1304 can include a keyboard, disk drives, printers, a scanner, and other input and output devices, including a mouse or other pointing device. The display controller 1314 may control in the conventional manner a display on the display device 1306, which can be, for example, a cathode ray tube (CRT) or liquid crystal display (LCD). The display controller 1314 and the I/O controller 1318 can be implemented with conventional well known technology.

The non-volatile storage 1316 is often a magnetic hard disk, an optical disk, or another form of storage for large amounts of data. Some of this data is often written, by a direct memory access process, into memory 1312 during execution of software in the computer 1302. One of skill in the art will immediately recognize that the terms "machine-readable medium" or "computer-readable medium" includes any type of storage device that is accessible by the processor 1308 and also encompasses a carrier wave that encodes a data signal.

The computer system 1300 is one example of many possible computer systems which have different architectures. For example, personal computers based on an Intel microprocessor often have multiple buses, one of which can be an I/O bus for the peripherals and one that directly connects the processor 1308 and the memory 1312 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1312 for execution by the processor 1308. A Web TV system, which is known in the art, is also considered to be a computer system, but it may lack some of the features shown in FIG. 13, such as certain input or output devices. A typical computer system will usually include at least a processor, memory, and a bus coupling the memory to the processor.

In addition, the computer system 1300 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1316 and causes the processor 1308 to execute the various acts required by the operating system to input and output data and to store data in memory, including storing files on the non-volatile storage 1316.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

One skilled in the art should recognize that terms used are to be associated with the appropriate physical quantities and are merely convenient labels applied to these quantities.

Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 14:
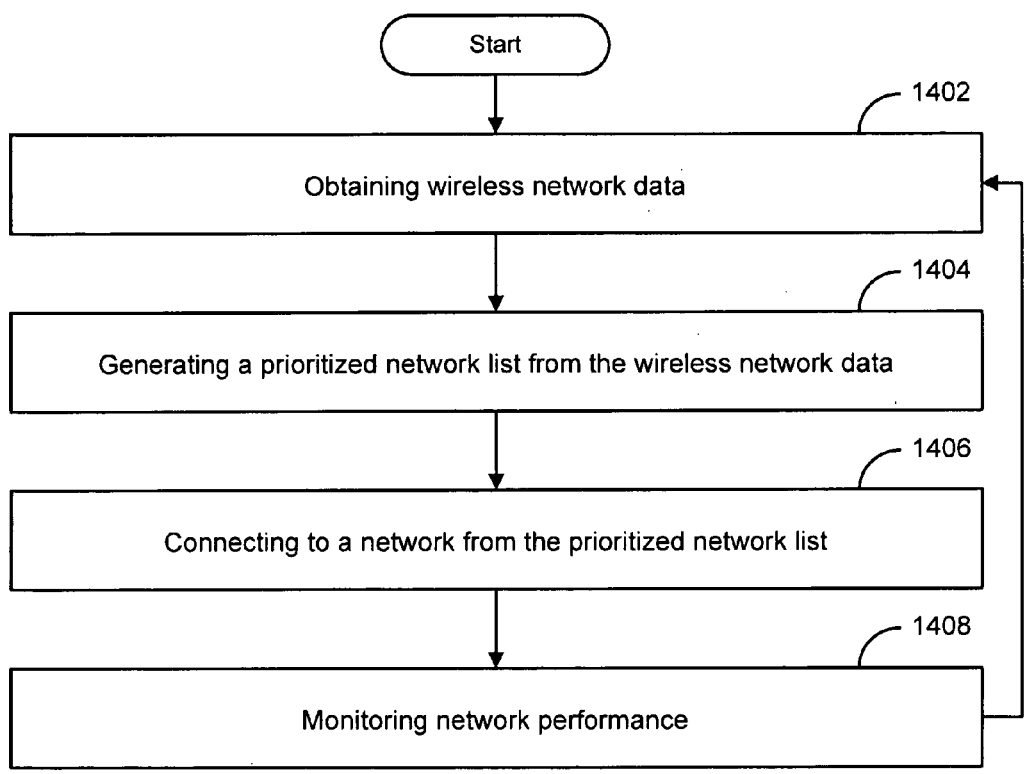
FIG. 14 depicts a flowchart of an example of a method for prioritized wireless offloading.

FIG. 14 depicts a flowchart 1400 of an example of a method for prioritized wireless offloading. The method is organized as a sequence of modules in the flowchart 1400. However, it should be understood that these and other modules associated with other methods described herein may be reordered for parallel execution or into different sequences of modules.

In the example of FIG. 14, the flowchart 1400 starts at module 1402 with obtaining wireless network data. The wireless network data can be obtained through ANCS at a wireless device. The ANCS can be used at the wireless device and/or can be provided to a server in an ANCS report. In an implementation that makes use of a server, the server can receive ANCS reports from multiple wireless devices. This can enable the server to generate prioritized lists for subscribers making use of network data that is remotely obtained relative to a subscriber.

In the example of FIG. 14, the flowchart 1400 continues to module 1404 with generating a prioritized network list from the wireless network data. In an implementation that makes use of a server, the server can perform an algorithm in memory to optimize capacity to a group of subscribers of a service provider associated with the server. The optimization can take into account network loading, wireless device location, wireless device connections, performance history (including, e.g., a time of day associated with a particular performance for a network), a network map over a geographic area, motion traces of wireless devices, subscriber preferences, incentives, and cost functions to name several. The prioritized list can take the form of a network map, which can be treated as a subset of prioritized list (with an added geo-location component).

In the example of FIG. 14, the flowchart 1400 continues to module 1406 with connecting to a network from the prioritized network list. A device may or may not customize a prioritized network list that is provided from a server in accordance with device-specific parameters. Where customization does not occur, the server may take into account the device-specific parameters (as well as, e.g., account-specific parameters) when generating the prioritized list. Where customization does occur, in an implementation that includes a server, the prioritized list can still be partially customized at the server. Customization can be in accordance with monitored performance of networks within range of the device, subscriber-specified rules, service provider-specified rules, a location trace, performance history, environmental conditions, cost function, or incentives, to name several.

In the example of FIG. 14, the flowchart 1400 continues to module 1408 with monitoring network performance. The monitoring can be of the network to which the device is connected. The device can also monitor other networks, either passively or actively, in accordance with network monitoring rules. The rules can be provided by a service provider, SDC, or input directly.

In the example of FIG. 14, the flowchart 1400 returns to module 1402 and continues as described previously. It is not necessary that the same elements perform the same tasks described. For example, a server could initially generate a prioritized network list (1404), but on a second iteration, a wireless device could generate a (customized) prioritized network list without receiving a new prioritized list from the server. Also, there may be additional or fewer actions or determinations on a second iteration. For example, when a device first connects to a network (1406), it may be unnecessary to compare performance or some other parameter of a network with a threshold value to determine whether to switch to another network, but when the device considers switching from one network to another, it may be desirable to compare current performance with a threshold value to ensure it is "worth it" to switch to a (currently) more highly prioritized network.

Figure 15:
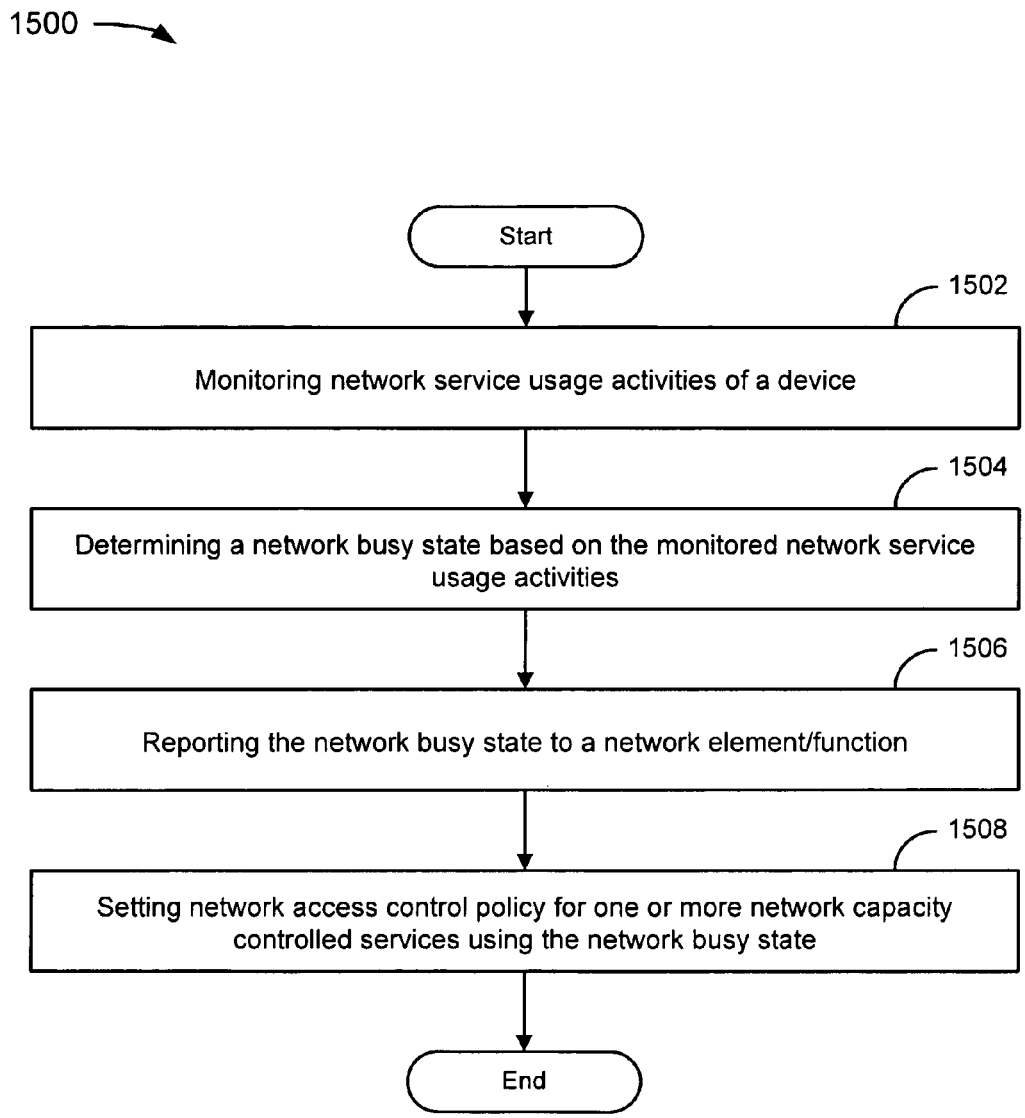
FIG. 15 depicts a flowchart of an example of a method for using device assisted services to facilitate wireless offloading.

FIG. 15 depicts a flowchart 1500 of an example of a method for using device assisted services (DAS) to facilitate wireless offloading. In the example of FIG. 15, the flowchart 1500 starts at module 1402 with monitoring network service usage activities of a device. The network service usage activities can be monitored with a verified/verifiable network performance characterization software (implemented in hardware) or hardware agent. The agent can be implemented on the device in question, on a different device, or can have components that are implemented on more than one device. The monitoring can be accomplished using a radio and can be selective. An example of an agent that performs selective monitoring is the selective network monitoring engine 414 or the selective network monitoring engine 1110, respectively described by way of example with reference to FIGS. 4 and 11, or the performance monitoring engine 712 described by way of example with reference to FIG. 7.

In the example of FIG. 15, the flowchart 1500 continues to module 1504 with determining a network busy state based on the monitored network service usage activities. Network statistics can be stored in a network statistics datastore, such as the network statistics datastore 304 described by way of example with reference to FIG. 3. The network busy state can also be stored in a network statistics datastore or can be derived from statistics that are stored in the network statistics datastore. The network busy state can include a measure of network capacity, availability, and/or performance, and can be derived using techniques described in this paper. The network busy state can be determined with a network performance characterization software (implemented in hardware) or hardware agent, which can measure and/or characterize a network busy state experienced by a device. An example of an agent that performs network busy state determination is the network statistics characterization engine 306, such as is described by way of example with reference to FIG. 3 or the historical performance evaluation engine 704, such as is described by way of example with reference to FIG. 7.

In the example of FIG. 15, the flowchart 1500 continues to module 1506 with reporting the network busy state to a network element/function. The network busy state can be included in any of the reports described in this paper (e.g., a network busy state report, ANCS report, etc.). Depending on the implementation, the network busy state can be used by a network element/function on a wireless device, such as the wireless device that at least in part monitored network service usage activities and/or determined a network busy state, on a server, or on some other applicable device. An example of such a network element/function includes the wireless network offloading engine 106, such as is described by way of example with reference to FIG. 1.

In the example of FIG. 15, the flowchart 1500 continues to module 1508 with setting network access control policy for one or more network capacity controlled services using the network busy state. The network access control policy can be acted upon by the geo-analysis connection engine 410, the network connection engine 708, the incentivized network selection engine 808 and/or the network connection engine 812, the incentivized network selection engine 1006 and/or the network connection engine 1010, the prioritized network selection engine 1106 and/or the network connection engine 1108, such as are respectively described by way of example with reference to FIGS. 4, 7, 8, 10, and 11.

Data on a wireless network is often encrypted. However, data may also be sent in the clear, if desired. With encrypted data, a rogue device will have a very difficult time learning any information (such as passwords, etc.) from clients before countermeasures are taken to deal with the rogue. The rogue may be able to confuse the client, and perhaps obtain some encrypted data, but the risk is minimal (even less than for some wired networks).

The following example illustrates possible benefits of this system. In one embodiment, a subscriber turns on a smart phone, the smart phone notices that the subscriber's home network is available. Assuming that the subscriber is connected to the cellular network and not connected to the home network, the cellular service provider sends the subscriber an incentive offer: a reduction in service fees if the subscriber offloads from the cellular network to his home network.

Upon traveling to work, the smart phone recognizes that the subscriber is no longer in the service area of his home network, but is within the service area of three of his neighbors' home networks and the cellular network. The smart phone recognizes that his motion trace (velocity) indicates movement that will move the subscriber out of the range of all three of his neighbors' home networks quickly. Thus, the smart phone may be configured to connect to the cellular network. Upon recognizing that the smart phone is stationary, e.g., at a stoplight, the smart phone may be configured to wait a predetermined period of time before considering to offload to a Wi-Fi network (especially if the smart phone knows the subscriber was moving). Accordingly, the smart phone may be configured to remain connected to the cellular network.

Upon reaching a destination, the smart phone recognizes that the motion trace becomes stationary or relatively slow and that the smart phone is proximate to two local Wi-Fi networks. In one embodiment, the beacon frames of the first Wi-Fi network may have higher received signal strength indicators (RSSI). However, other subscribers may have provided network data about the first network that indicate the first network is typically severely congested at this time. Thus, the smart phone may be configured to indicate that the second network has a higher priority than the first network, despite the high RSSI.

In some embodiments, the smart phone receives a prioritized network list that indicates the second network as having a higher priority than the first network. In some embodiments, the smart phone is configured to connect to a wireless network in accordance with an incentive offer, to connect based on preferences set by the subscriber, or to wait for the subscriber to select a network from the prioritized network list.

To assist with information gathering, the smart phone may be configured to gather information about another local wireless network, e.g., about the first wireless network, and may report the information to the cellular service provider. While the smart phone is in range of the other local wireless network, the smart phone may passively or actively scan the other network. In some embodiments, the smart phone is configured to perform active scans only when the smart phone is plugged into a power source.

The invention claimed is:

1. A method for reducing congestion on a wireless cellular network, the method comprising:
communicating a first set of one or more data communications over a wireless cellular connection of the wireless cellular network to or from an end user device, the first set of one or more data communications associated with one or more service activities the end user device is capable of supporting;
identifying an alternative wireless network that can be used to communicate a second set of one or more data communications to or from the end user device, the second set of one or more data communications comprising (i) a subset of data traffic associated with the one or more service activities the end user device is capable of supporting, or (ii) all of the data traffic associated with the one or more service activities the end user device is capable of supporting;
based on electronically processing an instruction set for offloading from the wireless cellular network to the alternative wireless network, determining whether to communicate the second set of one or more data communications to or from the end user device over the alternative wireless network or over the wireless cellular connection, wherein the instruction set for offloading from the wireless cellular network to the alternative wireless network specifies one or more conditions under which to communicate the second set of one or more data communications to or from the end user device over the alternative wireless network, and wherein the instruction set for offloading from the wireless cellular network to the alternative wireless network comprises at least one rule that takes into account at least one state associated with the wireless cellular connection.

2. The method of claim 1, wherein the alternative wireless network comprises a WiFi network or an 802.11 network.

3. The method of claim 1, further comprising:
recommending, to a user of the end user device, to communicate the second set of one or more data communications to or from the end user device over the alternative wireless network; and
receiving a switch request from the user, the switch request authorizing communication of the second set of one or more data communications to or from the end user device over the alternative wireless network.

4. The method of claim 1, further comprising modifying a first charging rate associated with using the wireless cellular connection or a second charging rate associated with using the alternative wireless network.

5. The method of claim 1, further comprising:
obtaining a user preference; and
determining, based on the user preference, whether to communicate the second set of one or more data communications to or from the end user device over the alternative wireless network.

6. The method of claim 1, further comprising controlling at least a portion of the first set of one or more data communications or at least a portion of the second set of one or more data communications.

7. The method of claim 1, further comprising:
the end user device obtaining current performance data characterizing the wireless cellular connection or the alternative wireless network; and
the end user device sending the current performance data to a network element.

8. The method of claim 7, further comprising the network element using the current performance data to generate historical performance data.

9. The method of claim 8, further comprising network element maintaining a database of performance data entries from a plurality of end user devices, the plurality of end user devices including the end user device.

10. The method of claim 8, wherein the current performance data or the historical performance data includes a time stamp.

11. The method of claim 8, wherein the current performance data or the historical performance data includes geolocation data.

12. The method of claim 1, further comprising network element characterizing the at least one state associated with the wireless cellular connection.

13. The method of claim 1, further comprising end user device characterizing the at least one state associated with the wireless cellular connection.

14. The method of claim 1, further comprising end user device electronically processing the instruction set for offloading from the wireless cellular network to the alternative wireless network.

15. The method of claim 1, further comprising a network element electronically processing the instruction set for offloading from the wireless cellular network to the alternative wireless network.

16. The method of claim 1, wherein the at least one state associated with the wireless cellular connection comprises a performance state associated with the wireless cellular network.

17. The method of claim 1, wherein determining whether to communicate the second set of one or more data communications to or from the end user device over the alternative wireless network or over the wireless cellular connection comprises determining whether a performance state of the wireless cellular connection exceeds a minimum performance level.

18. The method of claim 17, wherein the minimum performance level is based on a service need of the end user device.

19. The method of claim 1, wherein the at least one state associated with the wireless cellular connection comprises an historical performance of the wireless cellular network.

20. The method of claim 1, wherein the at least one state associated with the wireless cellular connection comprises or is based on a location of the end user device.

21. The method of claim 1, wherein the at least one state associated with the wireless cellular connection comprises or is based on a velocity of the end user device.

22. The method of claim 1, wherein the at least one state associated with the wireless cellular connection comprises or is based on a service category.

23. The method of claim 1, wherein the at least one state associated with the wireless cellular connection comprises or is based on a particular service used by the end user device.

24. The method of claim 1, wherein the determining whether to communicate the second set of one or more data communications to or from the end user device over the alternative wireless network or over the wireless cellular connection comprises comparing a performance state of the alternative wireless network to a performance state of the wireless cellular connection.

25. The method of claim 1, wherein identifying an alternative wireless network is performed by a persistent end user device on the alternative wireless network.

26. The method of claim 1, further comprising the end user device obtaining the instruction set for offloading from the wireless cellular network to the alternative wireless network from a network element.

27. The method of claim 1, further comprising providing an indication of a performance state of the alternative wireless network to a user of the end user device.

28. The method of claim 19, wherein the historical performance comprises historical outage data.

29. The method of claim 1, further comprising a network element sending an incentive offer associated with the alternative wireless network to a user of the end user device.

30. The method of claim 1, further comprising the end user device characterizing the alternative wireless network based on historical performance data.

31. The method of claim 1, further comprising:
if it is determined to communicate the second set of one or more data communications to or from the end user device over the alternative wireless network, communicating the second set of one or more data communications to or from the end user device over the alternative wireless network; and
if it is determined to communicate the second set of one or more data communications to or from the end user device over the wireless cellular connection, communicating the second set of one or more data communications to or from the end user device over the wireless cellular connection.

32. The method of claim 31, wherein it is determined to communicate the second set of one or more data communications to or from the end user device over the alternative wireless network, and further comprising:
after communicating the second set of one or more data communications over the alternative wireless network, based on an indication or anticipation that a performance of the wireless cellular network is above a first level or a congestion of the wireless cellular network is below a second level, communicating a third set of one or more data communications to or from the end user device over the wireless cellular connection, the third set of one or more data communications comprising some or all data traffic to or from the end user device.

33. The method of claim 1, wherein the at least one state associated with the wireless cellular connection is that the wireless cellular network is a roaming network.

34. The method of claim 1, wherein the at least one state associated with the wireless cellular connection is that the wireless cellular network is associated with a cost.

35. The method of claim 1, wherein the at least one state associated with the wireless cellular connection comprises: a current or historical congestion state of the wireless cellular connection, a current or historical performance level of the wireless cellular connection, or a current or historical performance of a portion of the wireless cellular network that supports the wireless cellular connection.

36. The method of claim 1, wherein the at least one state associated with the wireless cellular connection comprises: a time of day, a geographic location of the end user device, or an identifier or geographic location of a portion of the wireless cellular network.

37. The method of claim 1, wherein the at least one state associated with the wireless cellular connection comprises a historical congestion metric associated with a time of day.

38. The method of claim 37, wherein the historical congestion metric associated with a time of day is based at least in part by a location of the end user device or a location of a portion of a wireless cellular network that supports the wireless cellular connection.

39. The method of claim 1, wherein the alternative wireless network comprises a WiMAX network or an 802.16 network.

40. The method of claim 1, wherein determining whether to communicate the second set of one or more data communications to or from the end user device over the alternative wireless network or over the wireless cellular connection is further based on a movement of the end user device.

41. The method of claim 1, wherein determining whether to communicate the second set of one or more data communications to or from the end user device over the alternative wireless network or over the wireless cellular connection is further based on a rate of movement of the end user device, an amount of time the end user device is or will be in range of one or more access points or one or more base stations of the alternative wireless network, or a combination of these, and wherein it is determined to communicate the second set of one or more data communications to or from the end user device over the wireless cellular connection when: (a) the rate of movement of the end user device is above a pre-determined rate, (b) the amount of time the end user device will be in range of the one or more access points or one or more base stations of the alternative network is less than a pre-determined time, or (c) both (a) and (b).

42. The method of claim 1, wherein determining whether to communicate the second set of one or more data communications to or from the end user device over the alternative wireless network or over the wireless cellular connection is further based on a threshold condition for preventing switching back and forth between the wireless cellular connection and the alternative wireless network, the threshold condition comprising a first threshold for assisting in deciding when to begin using the alternative wireless network instead of the wireless cellular connection for communicating the second set of one or more data communications, and a second threshold that differs in at least one aspect from the first threshold for deciding when to stop using the alternative wireless network instead of the wireless cellular connection for communicating the second set of one or more data communications.

43. The method of claim 1, wherein the at least one state associated with the wireless cellular connection comprises an indication of a type of the wireless cellular network.

44. The method of claim 43, wherein the type of the wireless cellular network comprises: 2G, 3G or 4G.

45. The method of claim 43, wherein the type of the cellular wireless network is a roaming cellular wireless network, and wherein the alternative wireless network comprises a Wi-Fi network, an 802.11 network, a Wi-Max network, or an 802.16 network, and wherein the instruction set for offloading from the wireless cellular network to the alternative wireless network further comprises at least one alternative wireless network-dependent offload rule that considers at least one state associated with the alternative wireless network in determining whether to communicate the second set of one or more data communications to or from the end user device over the alternative wireless network or over the wireless cellular connection, and wherein the at least one state associated with the alternative wireless network comprises: a quality state associated with an available connection to the alternative wireless network, a performance state associated with the available connection to the alternative wireless network, a congestion state associated with the alternative wireless network, a time of day, a geographic location associated with a portion of the wireless cellular network that supports the wireless cellular connection, or a geographic location associated with the end user device.

46. The method of claim 43, wherein the type of the cellular wireless network is a roaming cellular wireless network, and wherein the alternative wireless network comprises a Wi-Fi network, an 802.11 network, a Wi-Max network, or an 802.16 network, and wherein the instruction set for offloading from the wireless cellular network to the alternative wireless network further comprises at least one alternative wireless network-dependent offload rule that considers at least one state associated with the alternative wireless network in determining whether to communicate the second set of one or more data communications to or from the end user device over the alternative wireless network or over the wireless cellular connection, and wherein the at least one state associated with the alternative wireless network comprises an indication of whether the alternative wireless network is a member of a list of potential alternative wireless networks derived at least in part by an alternative wireless connection history associated with the end user device.

47. The method of claim 46, wherein the list of potential alternative wireless networks is based at least in part on information provided by a network element that maintains at least a portion of the list of potential alternative wireless networks.

48. The method of claim 46, wherein the list of potential alternative wireless networks is based at least in part on a user input to the end user device.

49. The method of claim 46, wherein the list of potential alternative wireless networks is an ordered list.

50. The method of claim 1, further comprising an agent on the end user device determining the at least one state associated with the wireless cellular connection.

51. The method of claim 50, wherein determining the at least one state associated with the wireless cellular connection comprises determining a performance metric or a congestion metric.

52. The method of claim 51, wherein determining a performance metric or a congestion metric comprises:
monitoring data communicated to or from the end user device, and
characterizing (a) a level of communication performance, (b) a level of network congestion, or (c) both (a) and (b).

53. The method of claim 51, wherein determining a performance metric or a congestion metric comprises the agent sending information to one or more network elements, the one or more network elements comprising a network test server or a network test element, and further comprising:

characterizing, based on the information sent to the one or more network elements, (a) a level of communication performance, (b) a level of network congestion, or (c) both (a) and (b).

54. The method of claim 1, wherein the at least one state associated with the wireless cellular connection comprises a performance metric or a congestion metric determined by obtaining a report from a network element, wherein the report comprises information about a performance of the wireless cellular connection or a congestion of the wireless cellular connection.

55. The method of claim 1, wherein determining whether to communicate the second set of one or more data communications to or from the end user device over the alternative wireless network or over the wireless cellular connection comprises:
   determining, based on the at least one state associated with the wireless cellular network, that it is desirable to communicate the second set of one or more data communications to or from the end user device over the alternative wireless network;
   based on determining, based on the at least one state associated with the wireless cellular network, that it is desirable to communicate the second set of one or more data communications to or from the end user device over the alternative wireless network, presenting, to a user of the end user device, an opportunity to switch to the alternative wireless network;
   receiving, from the user of the end user device, a response to the opportunity to switch to the alternative wireless network;
   determining if the response indicates the user desire to switch to the alternative wireless network; and
   if the response indicates a user desire to switch to the alternative wireless network, communicating the second set of one or more data communications to or from the end user device over the alternative wireless network.

56. The method of claim 1, wherein the one or more service activities the end user device is capable of supporting are associated with a subset of all applications capable of running on the end user device, and wherein the second set of one or more data communications comprises the subset of data traffic associated with the one or more service activities the end user device is capable of supporting.

57. The method of claim 1, wherein determining whether to communicate the second set of one or more data communications to or from the end user device over the alternative wireless network or over the wireless cellular connection is further based on one or more characteristics of an application on the end user device.

58. The method of claim 1, wherein determining whether to communicate the second set of one or more data communications to or from the end user device over the alternative wireless network or over the wireless cellular connection is further based on a user preference.

59. The method of claim 1, further comprising a network element or the end user device providing or obtaining information to determine the at least one state associated with the wireless cellular connection.

60. The method of claim 1, wherein determining whether to communicate the second set of one or more data communications to or from the end user device over the alternative wireless network or over the wireless cellular connection is further based on: (a) a historical performance of the alternative wireless network, (b) a time of day, (c) a device location, (d) an identifier of or a location of one or more network elements supporting the wireless cellular connection, or (e) a combination of two or more of (a) through (d).

61. The method of claim 1, wherein determining whether to communicate the second set of one or more data communications to or from the end user device over the alternative wireless network or over the wireless cellular connection is performed by the end user device.

62. The method of claim 1, wherein determining whether to communicate the second set of one or more data communications to or from the end user device over the alternative wireless network or over the wireless cellular connection is further based on at least one state associated with the alternative wireless network.

63. The method of claim 62, wherein the at least one state associated with the alternative wireless network comprises: a current or historical quality state associated with the alternative wireless network, a current or historical performance state associated with the alternative wireless network, a current or historical congestion state associated with the alternative wireless network, a time of day, a location of the end user device, or an identifier or location of a portion of the alternative wireless network.

64. The method of claim 62, wherein the at least one state associated with the alternative wireless network is whether the alternative wireless network is a member of a priority list of potential alternative wireless networks.

65. The method of claim 64, wherein the list of potential alternative wireless networks is based at least in part on an alternative wireless connection history associated with the end user device.

66. The method of claim 64, wherein the list of potential alternative wireless networks is based at least in part on information provided by a network element that maintains at least a portion of the priority list of potential alternative wireless networks.

67. The method of claim 64, wherein the list of potential alternative wireless networks is based at least in part on a user input to the end user device.

68. The method of claim 64, wherein the list of potential alternative wireless networks is an ordered list.

69. The method of claim 1, further comprising generating a report comprising an indication of a performance or a congestion of the wireless cellular network.

70. The method of claim 69, wherein the report provides information about two or more types of networks.

71. The method of claim 69, wherein the indication is a first indication, and wherein the report further comprises a second indication indicating (a) a time, (b) a geographic location of the end user device, (c) an identifier or geographic location of a portion of the wireless cellular network, or (d) a combination of two or more of (a) through (c).

72. The method of claim 1, further comprising applying a first control to the first set of one or more data communications, and applying a second control to the second set of one or more data communications, the first control being different from the second control.

73. The method of claim 1, wherein the at least one state associated with the wireless cellular connection comprises a time of day.

74. The method of claim 1, wherein the at least one state associated with the wireless cellular connection comprises an aspect of an element of the wireless cellular network.

75. The method of claim 74, wherein the element comprises: a base station, an access point, a cell sector, a wireless cellular network type, a channel, a particular portion of the over a wireless cellular network, a particular communication path of the over the wireless cellular network, or a particular set of one or more equipment elements of the wireless cellular network.

76. The method of claim 1, wherein the at least one state associated with the wireless cellular connection comprises an aspect of the wireless cellular network.

77. The method of claim 76, wherein the aspect of the wireless cellular network comprises: a base station identifier, an access point identifier, a cell sector identifier, a wireless cellular network type identifier, a channel identifier, an identifier associated with a particular portion of the wireless cellular network, an identifier associated with a particular communication path of the wireless cellular network, or an identifier associated with a particular set of one or more equipment elements of the wireless cellular network.

78. The method of claim 1, wherein the second set of one or more data communications comprises the subset of data traffic associated with the one or more service activities the end user device is capable of supporting, and wherein the subset of data traffic associated with the one or more service activities the end user device is capable of supporting comprises a subset of a plurality of services operating on the end user device.

79. The method of claim 1, further comprising:
the end user device obtaining first network performance or congestion data, and
the end user device sending the first network performance or congestion data to a network element.

80. The method of claim 79, wherein the end user device is a first end user device, and further comprising:
the network element storing the first network performance or congestion data;
the network element receiving additional network performance or congestion data from one or more second end user devices; and
the network element maintaining a database for storing a plurality of network performance or congestion data entries from the first end user device and from the one or more second end user devices.

81. The method of claim 80, wherein at least one of the plurality of network performance or congestion data entries is associated with (a) a time stamp, (b) location data, or (c) both (a) and (b).

82. The method of claim 1, wherein the at least one state associated with the wireless cellular connection comprises a performance measure or congestion measure associated with the wireless cellular connection, and wherein processing the instruction set for offloading from the wireless cellular network to the alternative wireless network comprises determining whether the performance measure or congestion measure satisfies a criterion.

83. The method of claim 1, wherein the at least one state associated with the wireless cellular connection is based on: (a) an historical performance or congestion of a portion of the wireless cellular network that supports the wireless cellular connection, (b) a time of day, or (c) a device location.

84. The method of claim 1, wherein determining whether to communicate the second set of one or more data communications to or from the end user device over the alternative wireless network or over the wireless cellular connection comprises determining whether: (a) a first performance state or congestion state of the alternative wireless network satisfies a first criterion, or (b) a second performance state or congestion state of the wireless cellular connection satisfies a second criterion.

85. The method of claim 1, wherein the end user device is a first end user device, and wherein the at least one state associated with the wireless cellular connection is based on an observation by a second end user device connected to the wireless cellular connection, wherein the second end user device is configured to monitor the at least one state associated with the wireless cellular connection.

86. The method of claim 1, further comprising a network element providing the instruction set for offloading from the wireless cellular network to the alternative wireless network to the end user device.

87. The method of claim 1, further comprising providing, to a user of the end user device, information about the alternative wireless network.

88. The method of claim 1, further comprising the end user device providing one or more reports to a network element, the one or more reports being associated with (a) the wireless cellular network, (b) the alternative wireless network, or (c) both (a) and (b).

89. The method of claim 88, wherein the one or more reports are categorized by one or more network types, the one or more network types comprising 2G, 3G, or 4G.

90. The method of claim 1, wherein determining whether to communicate the second set of one or more data communications to or from the end user device over the alternative wireless network or over the wireless cellular connection is performed by a network server.

91. The method of claim 1, wherein the one or more conditions under which to communicate the second set of one or more data communications to or from the end user device over the alternative wireless network comprise: (a) a performance or quality state associated with the wireless cellular connection is at or is expected to be below a first level, (b) a congestion state associated with the wireless cellular connection is at or is expected to be above a second level, or (c) both (a) and (b).

92. The method of claim 91, wherein (i) the first level is based at least in part on a time of day and an historical record of performance of the wireless cellular connection as a function of the time of day, (ii) the second level is based at least in part on the time of day and an historical record of congestion of the wireless cellular connection as a function of the time of day, or (iii) both (i) and (ii).

93. The method of claim 91, wherein (i) the first level is based at least in part on a current measure of performance of the wireless cellular connection, (ii) the second level is based at least in part on a current measure of congestion of the wireless cellular connection, or (iii) both (i) and (ii).

94. The method of claim 91, wherein (i) the first level is based at least in part on an historical measure of performance of the wireless cellular connection, (ii) the second level is based at least in part on an historical measure of congestion of the wireless cellular connection, or (iii) both (i) and (ii).

95. The method of claim 91, wherein the instruction set for offloading from the wireless cellular network to the alternative wireless network further comprises at least one alternative wireless network-dependent offload rule that takes into account at least one state associated with the alternative wireless network in determining whether to communicate the second set of one or more data communications to or from the end user device over the alternative wireless network or over the wireless cellular connection.

96. The method of claim 95, wherein the at least one state associated with the alternative wireless network comprises: a quality state associated with an available connection to the alternative wireless network, a performance state associated with the available connection to the alternative wireless network, or a congestion state associated with the alternative wireless network.

97. The method of claim 95, wherein the at least one state associated with the alternative wireless network is whether the alternative wireless network is a member of a priority list of potential alternative wireless networks.

* * * * *